Feb. 28, 1967 G. C. DEVOL 3,306,471
PROGRAMMED APPARATUS
Filed May 19, 1964
9 Sheets-Sheet 3
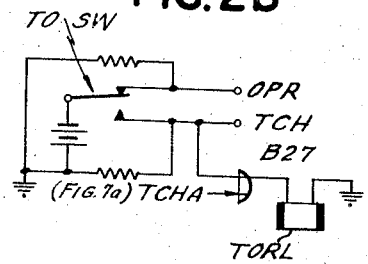
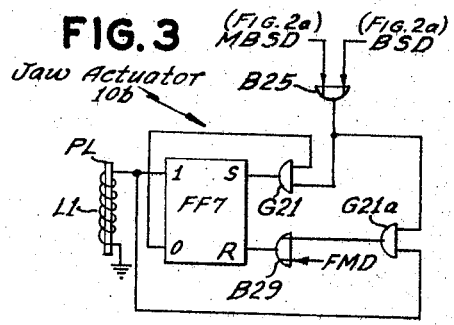
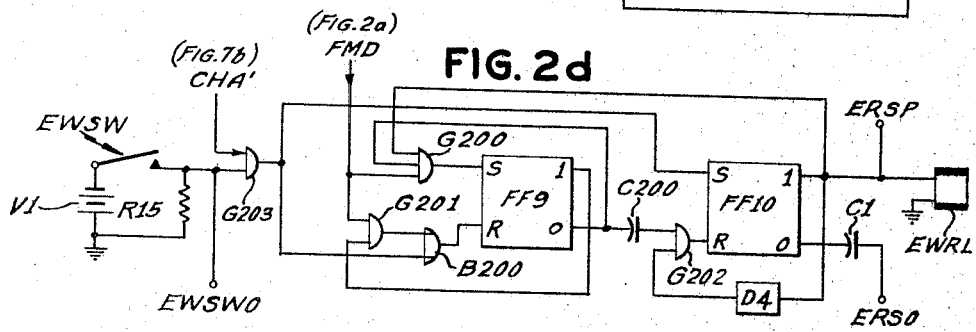
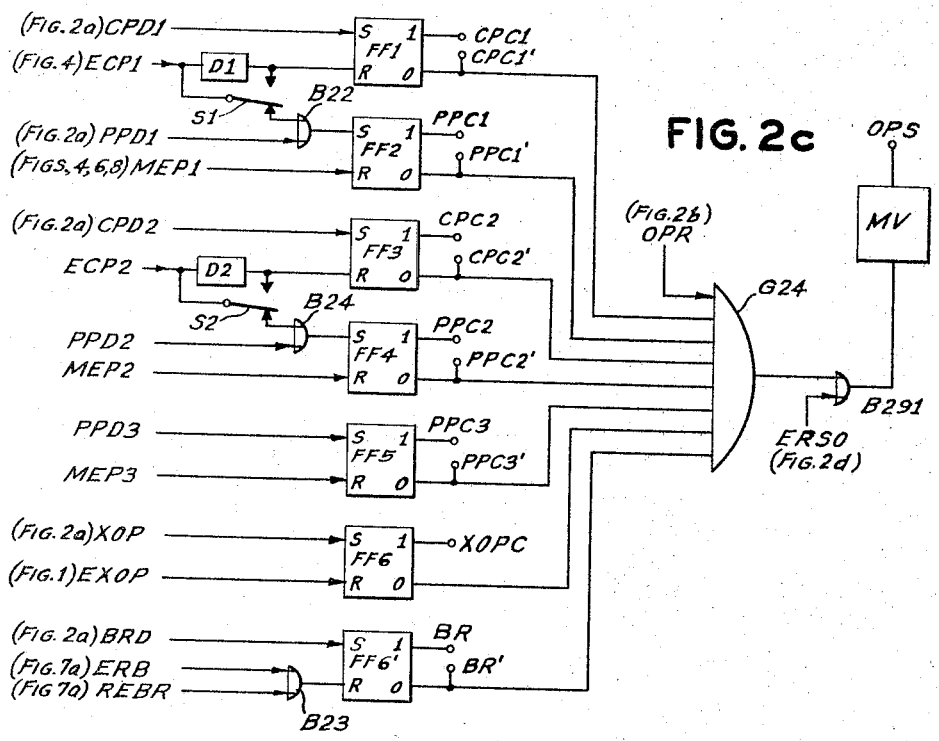

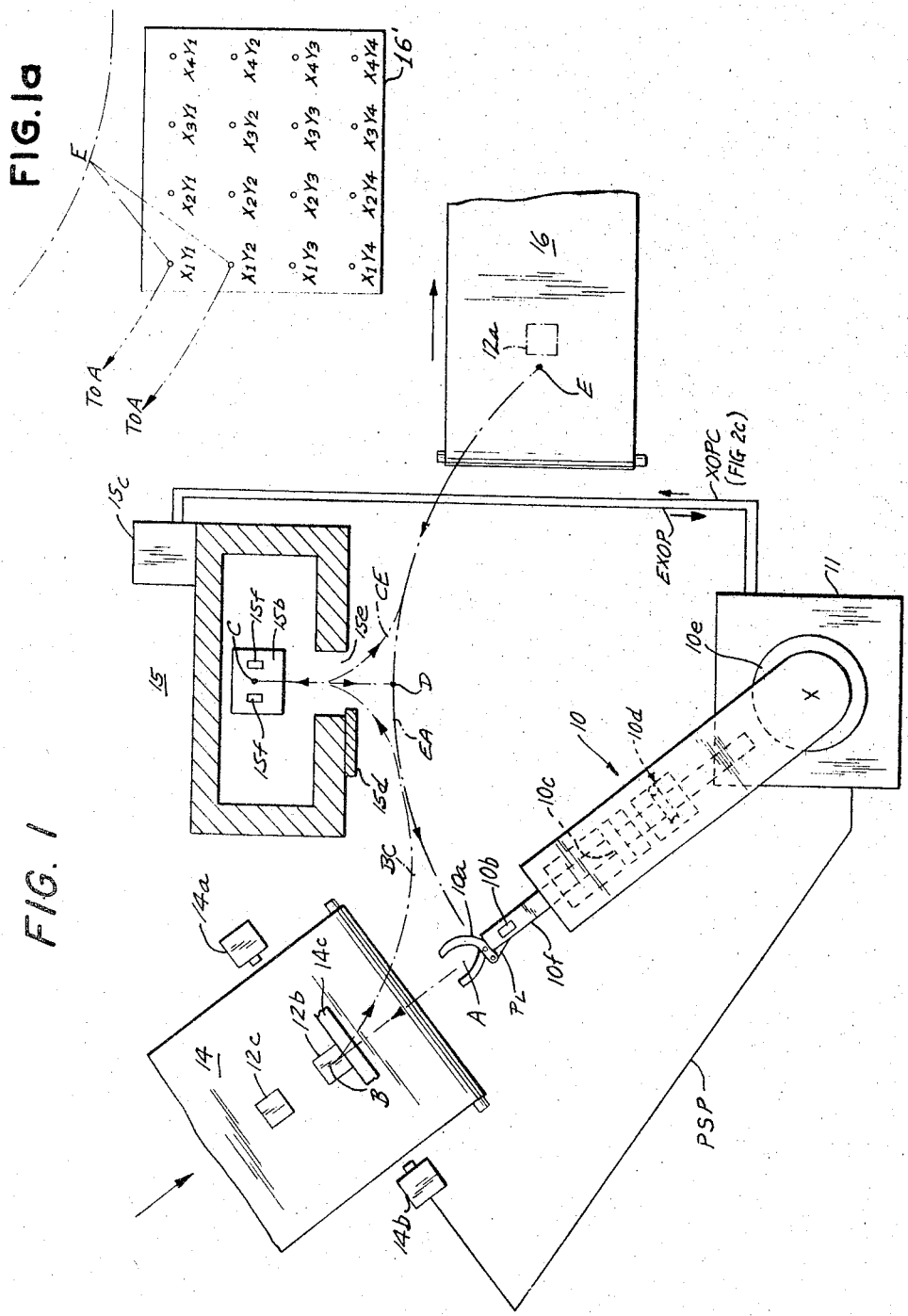

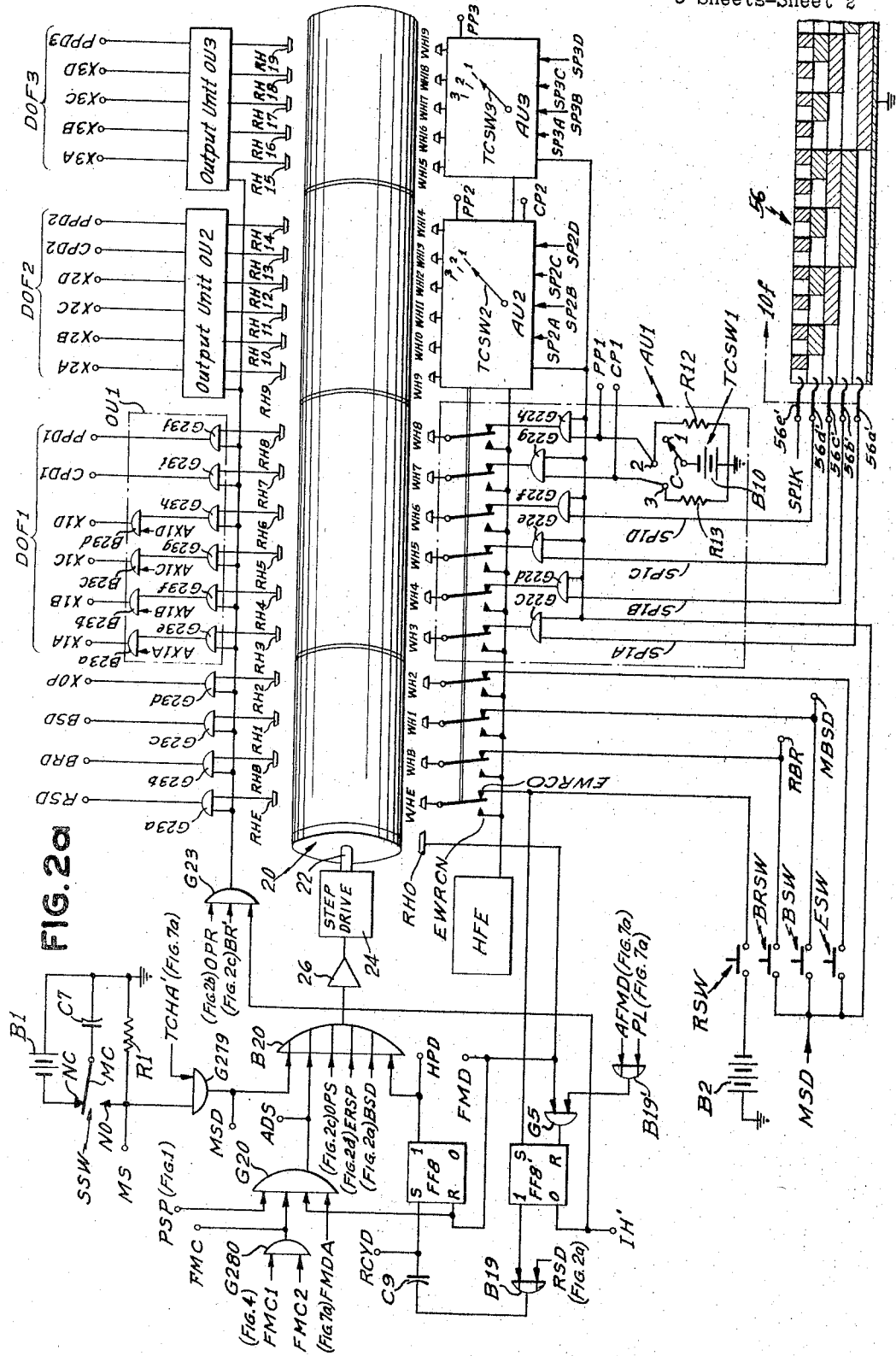

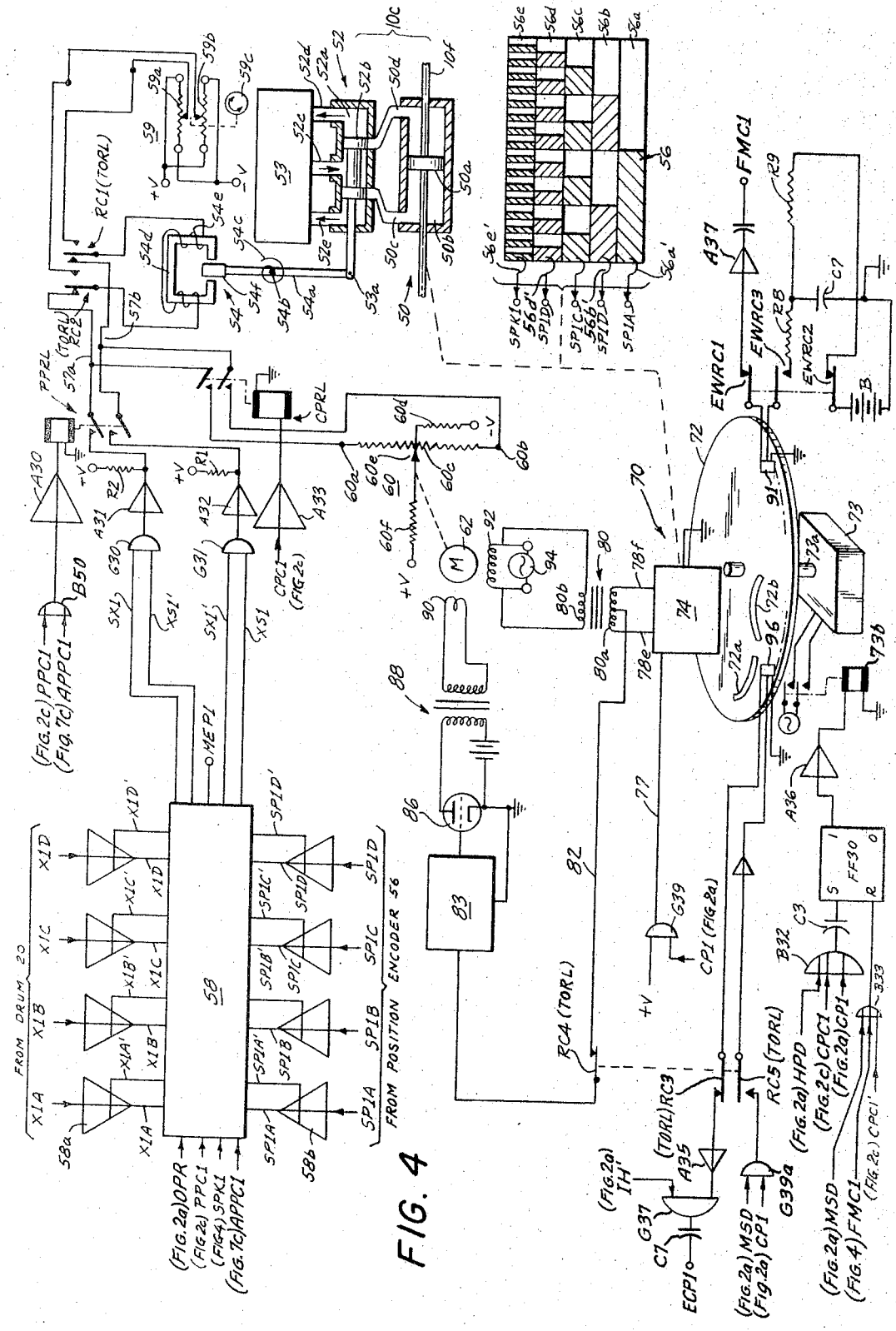

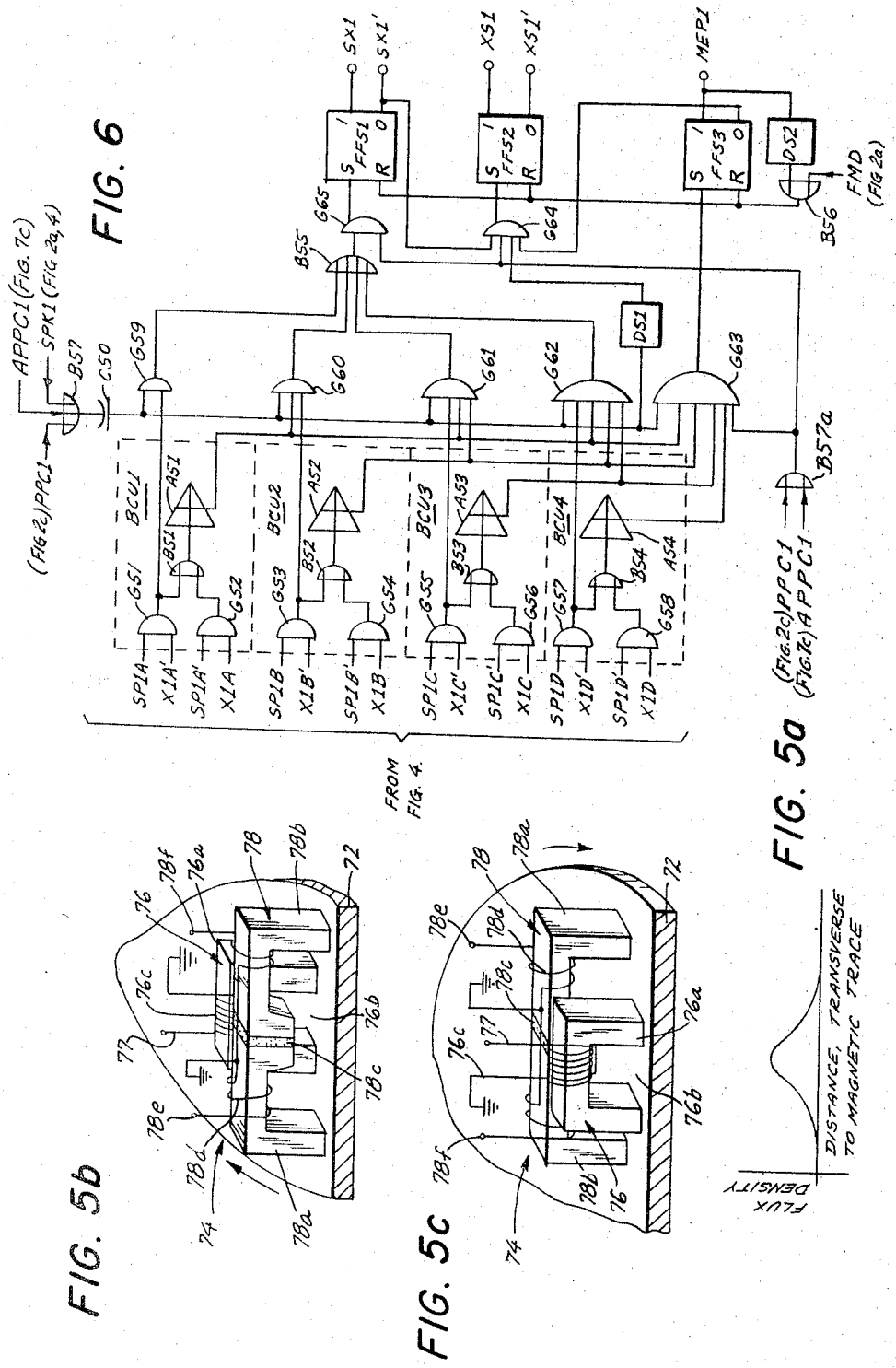

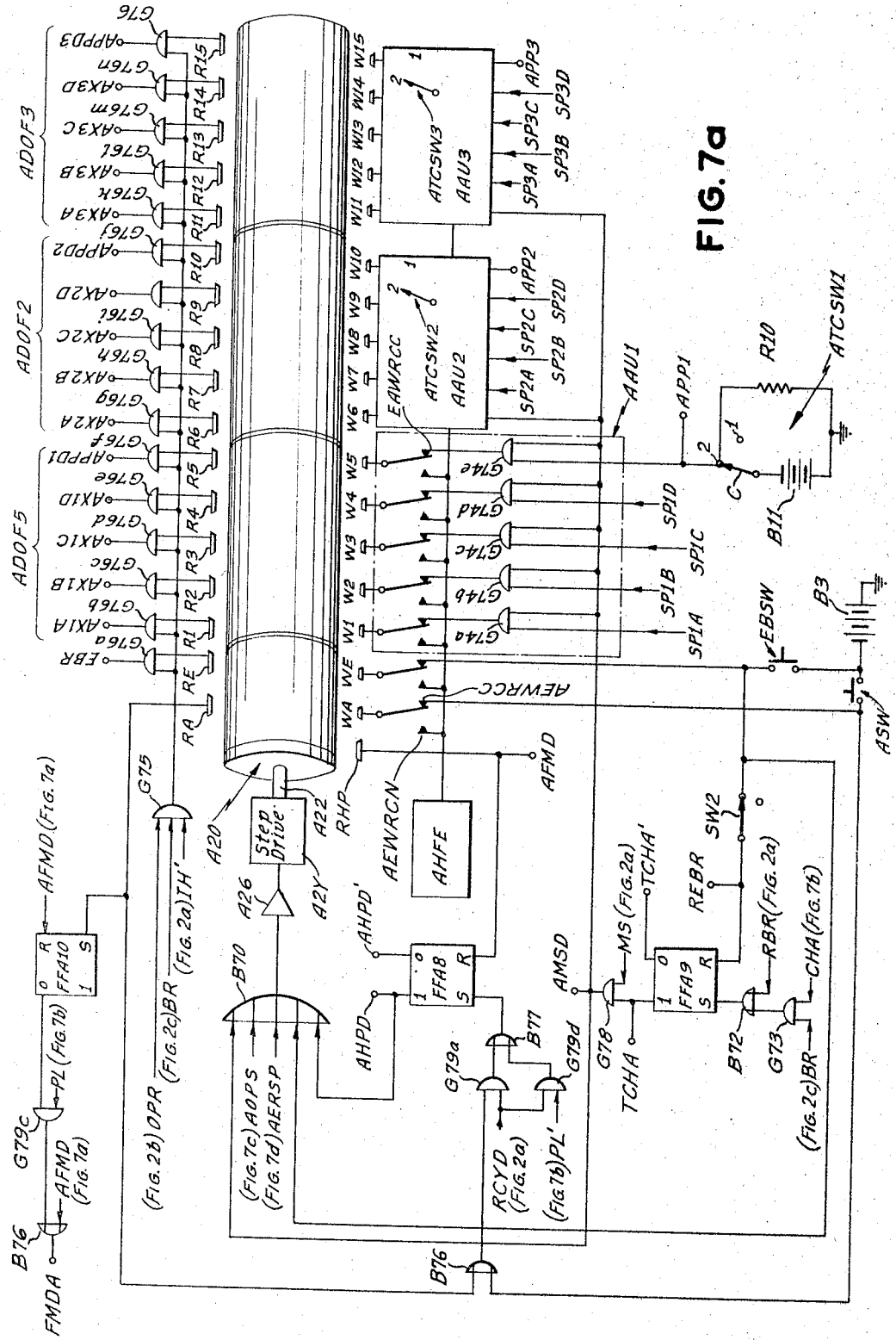

Feb. 28, 1967 G. C. DEVOL 3,306,471
PROGRAMMED APPARATUS
Filed May 19, 1964
9 Sheets-Sheet 7

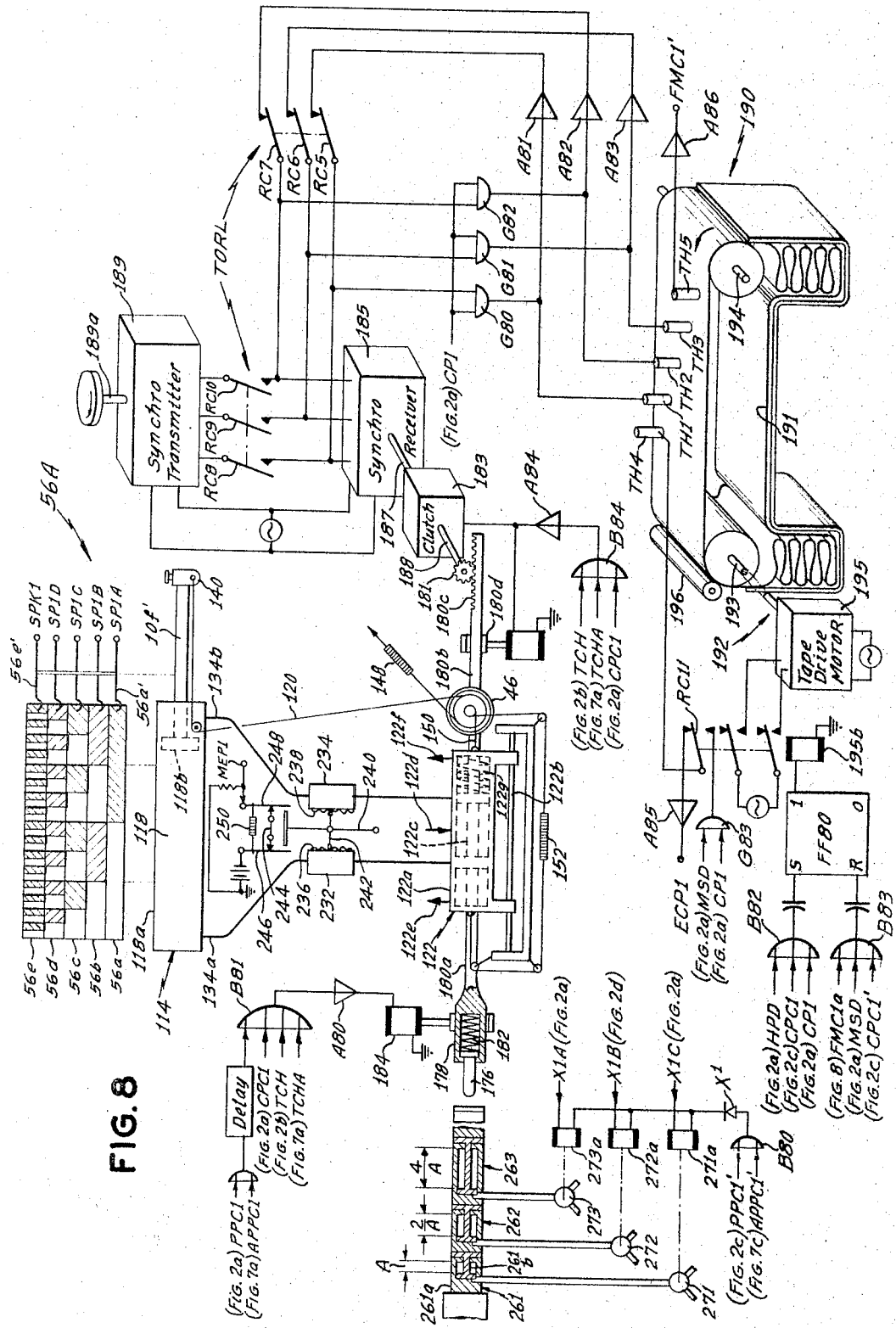

Feb. 28, 1967   G. C. DEVOL   3,306,471
PROGRAMMED APPARATUS
Filed May 19, 1964   9 Sheets-Sheet 9
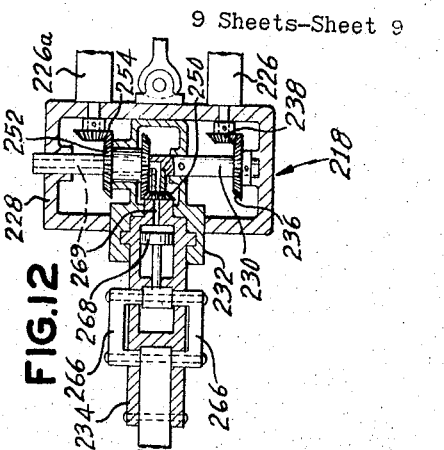
FIG.12
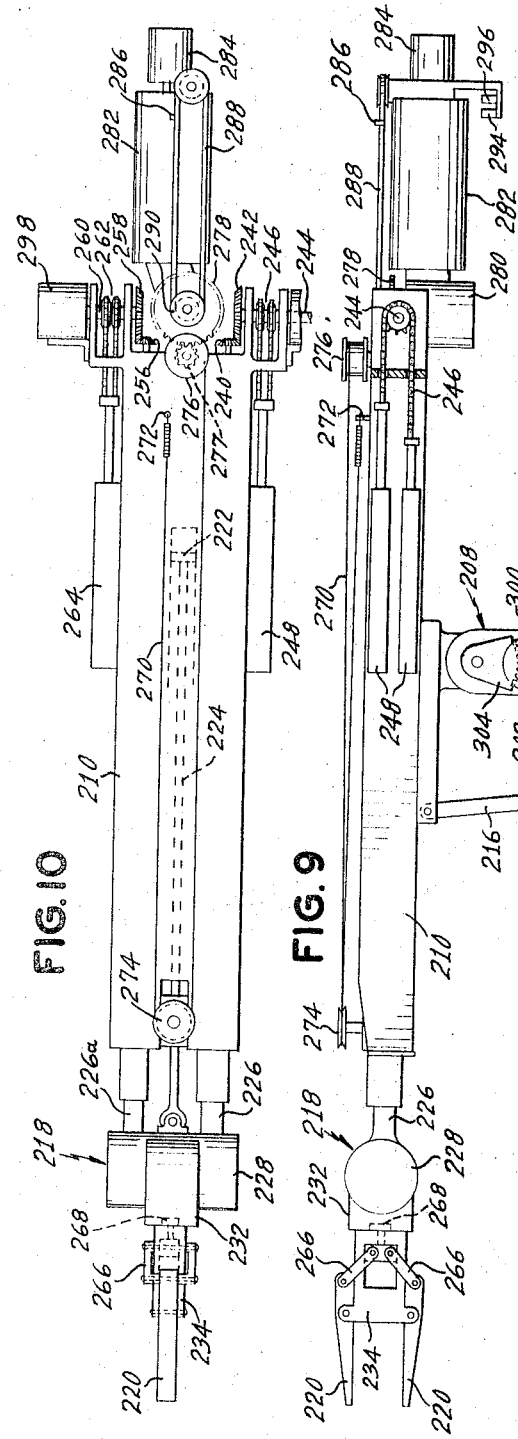
FIG.10
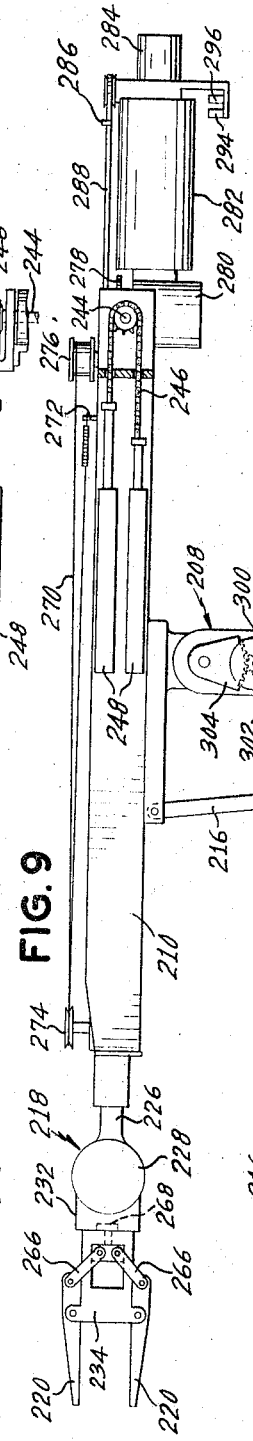
FIG.9
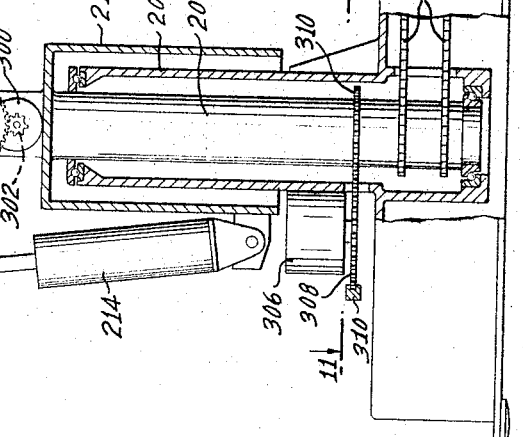
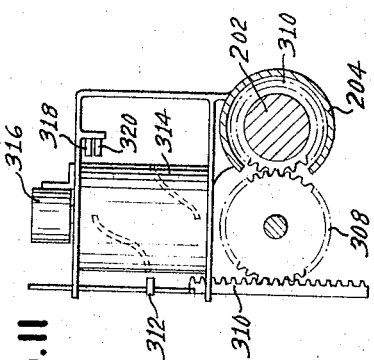
FIG.11

United States Patent Office 3,306,471
Patented Feb. 28, 1967

3,306,471
PROGRAMMED APPARATUS
George C. Devol, Brookside Drive,
Greenwich, Conn. 06830
Filed May 19, 1964, Ser. No. 368,550
30 Claims. (Cl. 214—1)

This is a continuation-in-part of my application Ser. No. 321,644, filed Nov. 3, 1963, now abandoned.

This invention relates to apparatus for moving a member to different positions and, more particularly, to programmed apparatus for moving a member to different positions in response to various types of controls.

In some aspects the present invention involves improvements over the apparatus in my Patent No. 2,590,091, issued March 25, 1952, in my Patent No. 2,988,237, issued June 13, 1961, and in my pending application for "Programmed Article Handling," Serial No. 226,203 filed September 26, 1962 now Patent No. 3,279,624. In other aspects the present invention is concerned with novel concepts for achieving new results. While other applications of the novel concepts are contemplated, this invention is primarily concerned with apparatus that can be "taught" the desired programs by operating the apparatus under manual control and concurrently recording the programs.

Presently known programmed apparatus of one broad class for moving a work member to different positions in space involves what may be termed "point-to-point" control. In one form of such control, a series of points are given which establish the path of motion. With the work member starting at a first position, the coordinates of a second position are presented to control means which directs driving means to move the work member to the second position. In some systems the coordinates are represented by numerically coded indicia on a record medium such as punched paper tape or cards, or as recordings on magnetic media. The above Patent No. 2,988,237 discloses such a system. In another form of digital point-to-point control, the program is made up of digital values representing the distance the work member is to move from any one position to the next. This program is a sequence of increments, rather than a sequence of absolute coordinates. In other point-to-point systems the coordinates are represented by analogue quantities wherein the magnitude of the analogue quantity represents the desired position. A drum having a sequence of control pins is an example of the program control unit in such a system. My application Serial No. 226,203 discloses both analogue and digital point-to-point systems. In each case, the programmed member moves to the indicated point via a path whose intermediate points are not represented in the stored programs. The control means is presented with the representation of a new point after each given point has been reached, and the driving cycle is repeated.

Such "point-to-point" control systems have many disadvantages. Notably, they can only cause the member to trace out an approximation of a curvilinear path and this is executed in the form of a sequence of strokes and stops.

The increments of movement can be made very short so that for any desired tolerance the path traced out by the member is a close approximation of a continuous contour. While in theory such an approach is feasible, in practice it is often not economically practicable. First, in approximating a complex curved path, a considerable number of incremental steps are necessary and, since the coordinates of at least one end point of each incremental step must be presented to the control means, the required capacity for coordinate storage tends to become excessive. Even when the coordinate storage capacity is not overtaxed by virtue of the type of storage, the time required for the member to trace out such a complex curved path is greatly protracted. It takes time to set up the coordinates of each new point and energize the control means to intermittently step the driving means through the increment of path to the next point in the path. As applied to article transferring apparatus, point-to-point control is suitable where there is no need for executing complex curvilinear motions rapidly or for repeating smoothly curved motions with reasonable speed. Hence, it should be apparent that "point-to-point" control wherein the coordinates are represented by either digital quantities or by analogue quantities has serious limitations for directing a member through a complex curvilinear path. "Point-to-point" control also involves problems of moving the work member at optimum speeds at different times in each stroke.

In contrast to the "point-to-point" class of programmed apparatus, there is the "continuous" form of programmed control. In "continuous" control, the drive means continuously receives instruction as to how and where to move. In other words, the drive means is not told merely the end-points of a series of strokes, but it is constantly told its direction and rate of travel at each instant during the movement. Template followers are one example of continuous-control apparatus. Continuous-control programmed apparatus is also disclosed in my Patent No. 2,590,091, mentioned above. Complex curved motions can readily be executed by continuous-control apparatus.

Continuous control has its important limitations. For reasonable proportions of control records, accuracy is limited. Conversely, for a high order of accuracy, an enormous-capacity control record is needed. Moreover, in certain types of continuous control there is often a danger that the apparatus may have dropped out of coordination with the program, i.e., that a random error has been introduced.

An object of the present invention resides in providing novel program-controlled apparatus that includes both point-to-point control and continuous-path control for the actuator of a work member, together with means for selecting which program shall be in control at any given time.

A further object resides in provision of program-controlled apparatus in which an actuator of a work member is subject to control by multiple program-storage devices, and in which control is transferred from one such device after one pattern of movement is complete to another such device to execute a following pattern of programmed operations.

An additional object relates to novel apparatus comprising both continuous-path program control means and digital-coordinate program control means, further including automatic control means for at times causing operation under continuous-path control to be transferred to digital control for correcting errors and improving accuracy of position at such times.

It is another object of the invention to obtain the capability of complex movement inherent in "continuous" control and the precision inherent in "point-to-point" control.

Briefly, according to this aspect of the invention, apparatus is contemplated which includes means for moving a work member through programmed motions. The moving means is controlled by first programmed means for directing the work member to move in accordance with a prescribed type of motion, e.g., continuous path control, and by second means for directing the member to move to a specific position, e.g., point-to-point control.

Programmed means is also provided to select the first or the second means to control the movement of the work member at different times in a program.

In one application of this concept, the type of control can be selected and changed automatically at different portions of the path of travel to achieve optimum performance characteristics at each part of a whole programmed sequence of motions. In a modified form of this, continuous control is employed until the member is within a predetermined range of the desired position and then point-to-point control is automatically called into operation. In this way, the work member is moved through a complex path at optimum speeds at different parts of the path, and the work member is positioned accurately at certain critical points along such path.

In another application of this concept, the continuous type of control is the primary control used, and at intervals the point-to-point type of control is brought into effect to preclude the possibility of the apparatus having dropped out of coordination with its continuous-control.

A broader aspect of this concept resides in the provision of multiple program control means, together with means for subjecting the actuator of the work member to control by selected ones of the program control means in programmed sequence. Specifically, a first program control means may control a series of point-to-point or even continuous path control steps followed by a shift to a second program control means which controls a second series of point-to-point control steps which is then followed by a return of control to the first program control means. It should be apparent that such a concept is useful when only a limited portion of a control program is subject to frequent change. Therefore, it is only necessary to change the program of the second program control means and not the entire program. It is also useful where a brief sequence of motions is repeated many times between steps of a much longer program, as in pallet-loading or unloading.

Other features of the invention are concerned with moving the work member through various degrees of freedom. Still other features of the invention are concerned with the control means for causing actuators to perform the point-to-point and continuous path motions.

The nature of the various aspects of the invention, including the foregoing and other objects and novel features, will be more fully appreciated from the following detailed description of the illustrative embodiment of the invention shown in the accompanying drawings, this embodiment being presently preferred but being nevertheless given by way of example and illustrative of the novel concepts involved.

In the drawings:

FIGURE 1 is a top view of a system incorporating the invention for moving work pieces from a first conveyor belt via an operation station to a second conveyor belt;

FIGURE 1a is a top view of a pallet which may be substituted for the second conveyor belt of FIG. 1;

FIGURES 2a, 2b, 2c, and 2d are diagrams of the central control of the work-member moving apparatus of FIG. 1 wherein—

FIG. 2a schematically shows digital and function program storage apparatus,

FIG. 2b shows schematically the teach-operate mode of control,

FIG. 2c shows sequence controls in schematic form, and

FIG. 2d shows the erase-write controls.

Figure 7B:
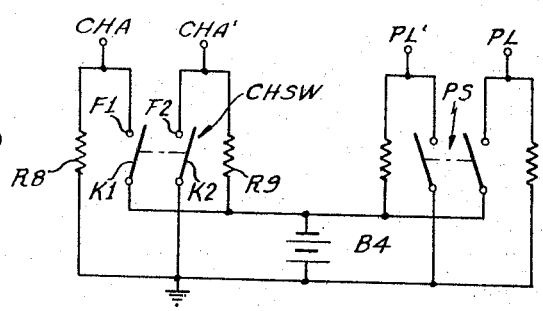
Figure 7D:
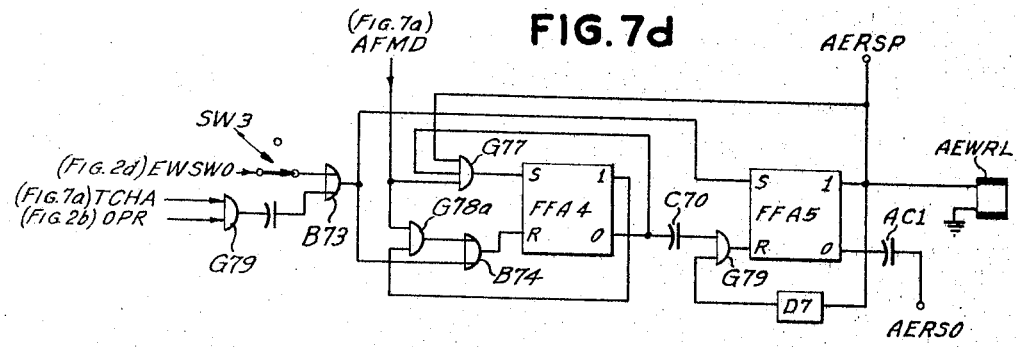
Figure 7C:
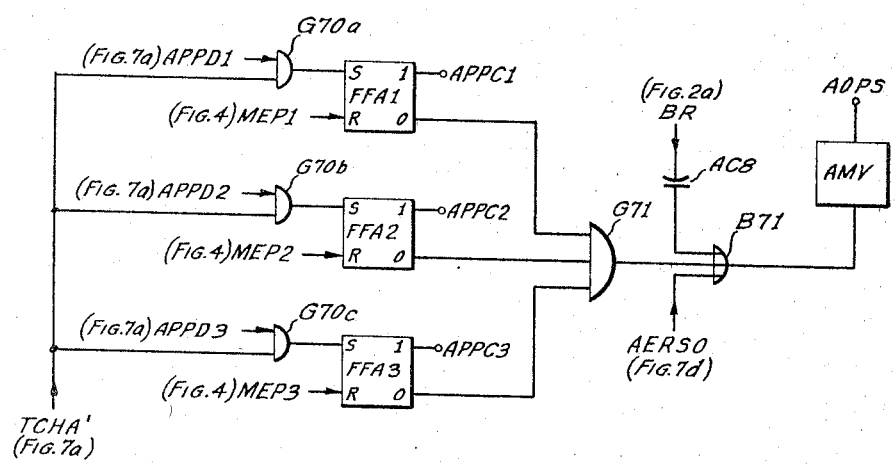

FIGURE 3 is a schematic of jaw control means;

FIGURE 4 is a diagram representing point-to-point and continuous controls and the drive means associated with one degree of freedom of the programmed member;

FIGURE 5a is a curve showing the variation of flux density of the magnetic recording on the recording means of FIG. 5b;

FIGURE 5b shows a front view of the transducer means associated with the continuous controls of FIG. 4;

FIGURE 5c shows a rear view of the transducer means of FIG. 5b;

FIGURE 6 shows a digital comparator employed by the point-to-point controls of FIG. 4;

FIGURES 7a, 7b, 7c and 7d are diagrams of auxiliary central controls of the work-member moving apparatus of FIG. 1 which are employed during portions of a work-member moving program which may be periodically changed (modified) wherein FIGURE 7a shows digital and function program storage apparatus, FIGURE 7b shows schematically the modify mode control apparatus, FIGURE 7c shows sequence controls in schematic form, and FIGURE 7d shows the erase controls;

FIGURE 8 is a diagram representing an alternate embodiment of point-to-point and continuous controls and the drive means associated with one degree of freedom of the programmed member.

FIGURE 9 is a lateral view, partly in cross-section, of an article transfer unit incorporating control apparatus of FIGS. 1–7, inclusive;

FIGURE 10 is a plan view, partly in cross-section, of the apparatus of FIG. 9;

FIGURE 11 is a plan view, partly in cross-section, at the plane 11—11 of FIG. 9, showing a detail of the apparatus of FIG. 9; and FIGURE 12 is an enlarged cross-section of the left-hand end of FIG. 10.

In FIG. 1 a teachable program controlling article transfer apparatus is shown diagrammatically. Details of such apparatus are more fully shown in FIGS. 9–12. In FIG. 1, jaw-carrying arm 10 constitutes a work-member that transfers workpieces 12 from a first conveyor belt 14 to a paint or chemical spraying station 15. This station represents any of a wide range of work operations, and includes internal means (not shown) that initiates a work cycle of operations in response to an impressed signal and emits a signal upon completion of its own cycle, as in application Serial No. 226,203, mentioned above. After the spraying operation, arm 10 moves the workpiece 12 to the conveyor belt 16. Prior to the actual repetitive transfer of the workpiece 12, the arm 10 had been taught to carry out this program of operations. The arm 10 can perform several types of movement, including a radial traverse wherein the arm either extends or retracts, i.e., in an "in-and-out" movement; a twist or swivel motion wherein the jaws 10a can rotate about the major axis of the arm; a rotational traverse wherein the arm can sweep about the vertical axis X of FIG. 1, i.e., a horizontal sweep or azimuth movement; and a jaw gripping movement wherein the jaws 10a can be opened and closed. Other types of movement such as vertical movement and "wrist bend" movement can be incorporated in the mechanical arm 10, as will be seen in FIGS. 9–12. However, for simplicity, the mechanical arm 10 will here be described for executing the above specifically mentioned movements. Each of the movements can be considered as a degree of freedom of the arm 10. Each position in the range of movement of any degree of freedom can be considered as a coordinate of that degree of freedom. Furthermore, the position of the jaws 10a at any time will be considered as the position of the arm 10. An illustrative sequence of motions is as follows.

Initially, the jaws 10a are open and are at the position A. The first step of the program causes the radial actuator 10c (shown as a hydraulic actuator) to move the jaws 10a to position B. Under program control, jaws 10a are caused to close by virtue of the solenoid actuator 10b, so as to grasp a workpiece 12. During the next step of the program, the radial actuator 10c and the rotational actuator 10e cooperate to move the mechanical arm 10 such that a workpiece 12 which is now held by the jaws 10a travels along the indicated path BC from point B to point C. During this combined radial and sweeping traverse, the jaw supporting member 10f may be caused to swivel 90 degrees by actuator 10d (shown as a controlled drive element and a gear on a splined shaft) so that a desired face of the workpiece 12a is positioned upward on the work support 15b of the work station 15. When the workpiece 12 rests on the support 15b the jaw actuator 10b causes jaws 10a to open. Radial actuator 10c then takes over to retract the mechanical arm 10 to the position D. When the mechanical arm 10 reaches the position D, the master control 11 of the article transfer apparatus sends a signal via the XOPC line to the control unit 15c of the spraying station 15. The door 15d of spraying station 15 closes and the spraying process begins. The spraying process may involve, for example, first masking portions of the workpiece 12 followed by spraying and quick-dry operations.

At the end of the spraying operation, the control 15c sends a signal via the EXOP signal line to the master control 11 of the transfer apparatus. Upon receipt of this signal, master control 11 alerts the radial actuator 10c to direct the arm 10 back to the position C. The jaw actuator 10b again operates, causing the jaws 10a to grasp the workpiece 12 followed by operation of radial actuator 10c and sweep actuator 10e which direct the mechanical arm 10 along the path CE to the point E. When the mechanical arm 10 reaches the point E, jaw actuator 10b again operates causing jaws 10a to open, depositing the workpiece 12 on the conveyor belt 16. Finally, actuator 10e sweeps the mechanical arm 10 back via path EA to the position A which is the starting position of an article transfer operation.

Following return of arm 10 to position A, the article transfer operation will be repeated when a succeeding workpiece such as workpiece 12b interrupts the light beam from the light source 14a to the photocell 14b. At that time the response of photocell 14b will send a control signal via the PSP signal line to master control 11. Member 14c supported clear of conveyor belt 14 provides a "back stop" for the workpiece 12.

The article transfer operation will now be analyzed in greater detail, particularly pointing out the features of the operation. It should first be noted that the operation starts in response to an external control signal, namely the PSP signal from the photocell 14b, when a workpiece 12 interrupts the light beam transmitted by the light source 14a to the photocell 14b. The radial movement from the point A to the point B is a point-to-point control operation wherein the final coordinate, i.e., point B, is presented to the radial actuator 10c by master control 11. This operation is here considered to involve only one degree of freedom, the "in-out" motion of the mechanical arm 10, although a concurrent or subsequent downward motion might also be used. At the point B, the jaw actuator 10b is activated to cause the jaws 10a to grasp the workpiece 12. The next step of the operation causes the tracing out of a complex path of motion, from the point B around the obstacle represented by the walls of the spraying station 15 via the narrow access port 15e of the spraying enclosure and onto the spraying support 15b. Furthermore, superimposed upon this motion is a rotation of the workpiece by 90 degrees.

The basic motion between the points B and C involves first the continuous control of motion with two degrees of freedom, namely the in-out or radial motion and the sweeping motion of the mechanical arm 10. Accordingly, during the traverse along this path, the radial actuator 10c and the sweep actuator 10e simultaneously operate under control of continuous-path control means described below, following recorded control contours. The jaws 10a follow the path designated by the line BC. Furthermore, superimposed upon this continuous control is a point-to-point control function performed by the swivel actuator 10d which causes the jaw support member 10f to rotate 90 degrees. That is, during the motion of arm 10 from point B to point C, the swivel actuator 10d is presented by master control 11 with a coordinate indicating a final swivel position for jaws 10a. At the point C, the workpiece is deposited on the blocks 15f. Generally the signals representing the path contour will direct the mechanical arm 10 to a close approximation of the point C. Then the radial actuator 10c and sweeping actuator 10e are switched to point-to-point control by being fed signals from master control 11 representing the precise coordinates of the point C with respect to these two degrees of freedom. The mechanical arm 10 is then directed to these precise coordinates from whatever point it was left by the continuous-control operation. The workpiece may have locating holes to be precisely aligned with corresponding pins in the spraying apparatus, or the workpiece may require precise orientation relative to a mask forming part of the spraying apparatus. These are examples illustrating possible need for precise positioning of the workpiece, the details of the spraying apparatus forming no part of the present invention.

The jaws 10a are opened in response to a signal received by jaw actuator 10b from master control 11. The travel from point C to D is a point-to-point control operation of the radial actuator 10c. When the jaws 10a first reach the point D, the master control 11 emits a control signal to an external device, that is, spraying station 15, causing it to perform a cycle of operations. At the end of the spray cycle of operations, the spraying apparatus transmits a control signal to master control 11 which causes the mechanical arm 10 to resume its transfer operation by executing the stroke DC under point-to-point control. The next movement of the jaws 10a, from the point C to the point E, is another complex curved motion such as the motion between the points B and C. This is executed by the simultaneous application of two continuous controls to carry out most of the motion. The motion is completed under point-to-point control. In particular, the radial actuator 10c and the sweep actuator 10e cooperate to cause the jaws 10a to move in the path indicated by the line CE. During the first part of this motion, the swivel actuator 10d operates under point-to-point control to direct the jaw support 10f to rotate back 90 degrees to its initial position, to orient the workpiece correctly for deposit on conveyor 16. It should be noted that if there is any uncertainty as to when the swivel motion actually occurs during the path indicated by the line CE and there is the possibility of workpiece 12 in its rotated position not clearing the access path 15e, the control for the path indicated by line CE can be divided into different steps. For example, a point-to-point swivel movement can first be performed and then followed by a continuous path control of radial actuator 10c and sweeping actuator 10e. Furthermore, it is possible to divide the continuous control path into two separate increments with the point-to-point swivel movement occurring as a separate step at the end of travel through the first path increment.

When the workpiece 12 reaches the point E, another operation is called for wherein the jaw actuator 10b merely opens the jaws 10a, depositing the workpiece on the conveyor belt 16. The last step of the program of operations is readily executed under point-to-point control, wherein sweep actuator 10e swings the arm 10 so that the jaws 10a return to the initial position A. In the above-described operation, the conveyor belts 14 and 16 and the spraying station 15 were all considered to be at the same level. If they were at different levels, a program-controlled vertical actuator (not shown) would execute vertical motions.

Before proceeding with the detailed description of the apparatus, several conventions will be established.

(1) Quite often a signal and the line carrying the signal will have the same reference designation, for example, the FMD signal is carried by the line FMD. In some instances, for the sake of simplicity, a single signal lead will be shown whereas, in fact, the signal lead may be a two-conductor cable.

(2) Several logical elements are used extensively in the apparatus. These include an "or" circuit, and an "and" circuit, and a "flip-flop."

The "or" circuit will transmit a signal from its output whenever a signal is present at any one of its inputs. The "and" circuit will transmit a signal from its output if and only if a signal is present at each of its inputs. In the description, a signal is considered present when it is at a negative potential and absent when it is at a positive or ground potential. If a signal is designated as an inhibiting signal, it will be present when it is at a positive or ground potential. Typical "and" and "or" circuits may be found at page 32 of "Arithmetic Operations in Digital Computers," by R. K. Richards (D. Van Nostrand Company, Inc., New York, 1955).

The "flip-flop" is a bistable device having a "set" input S and a "reset" input R, a "1" output 1, and a "0" output 0, which is the logical inverse of the "1" input. The signal lead from the "1" output employs an unprimed reference character and the signal lead from the "0" output has a primed reference character. When the "flip-flop" receives a signal at its set input it "sets" and a signal is present at its "1" output. When the "flip-flop" receives a signal at its reset input, it is "unset" and a signal is present at its "0" output. Typical flip-flops can be found starting at page 160 of "Digital Computer Components and Circuits" by R. K. Richards (D. Van Nostrand Company, Inc., New York, 1957).

In the control circuits to be described, a number of signals are utilized that are given alphabetic designations. The following is an index of most of these signals the figure in the drawings where each signal is generated, and a brief identification of the signal.

ADS; FIG. 2a; signal indicating both drums and all continuous-path control memories have returned to "home" position, and a new workpiece is available for transfer. It steps the master drum 20 to the first program slot.

AERSO; FIG. 7d; steps auxiliary drum one slot away from "home" at end of an "erase" rotation of auxiliary drum A20.

AERSP; FIG. 7d; return auxiliary drum A20 to home position at end of recording sequence; energizes erase-write relay AEWRL.

AFMD; FIG. 7a; auxiliary-drum home-position signal from auxiliary drum A20.

AHPD; FIG. 7a; returns the auxiliary drum A20 to home position.

AMSD; FIG. 7a; auxiliary drum stepping signal, used during recording operations to index auxiliary drum A20.

AOPS; FIG. 7c; auxiliary drum-stepping signal at completion of programmed and recording operations associated with auxiliary drum.

APP1, APP2, APP3; FIG. 7a; point-to-point signals, used in program-recording operations of auxiliary drum.

APPC1, APPC2, APPC3; FIG. 7c; point-to-point signals, in effect during point-to-point programmed operations involving the auxiliary drum.

APPD1, APPD2, APPD3; FIG. 7a; point-to-point program selecting signals derived from auxiliary drum A20.

AX1A, B, C, D; FIG. 7a; point-to-point digital coordinate signals for radial arm control, derived from point-to-point portion of auxiliary drum A20.

BR; FIG. 2c; signal indicating transfer of program control to auxiliary drum.

BRD; FIG. 2a; signal initiating transfer of program control to auxiliary drum.

BSD; FIG. 2a; jaw-operating signal, derived from master drum 20.

CHA; FIG. 7b; switch signal indicating only auxiliary drum information is to be changed.

CP1, CP2; FIG. 2a; continuous-path signal, used in program-recording operations.

CPC1, CPC2; FIG. 2c; continuous-path control signals, in effect during continuous-path programmed operation.

CPC1', CPC2'; FIG. 2c; signal developed at the end of a continuous-path programmed operation.

CPCD1, CPD2; FIG. 2a; continuous-path program-selecting signals, derived from master drum 20.

EBR; FIG. 7a; control signal indicating transfer of control from the auxiliary drum A20 to master drum 20.

ECP1; FIG. 4 or 8; end-of-continuous-path signal for radial arm movement, derived from continuous-path record 72 or 191.

ERSO; FIG. 2d; steps master drum one slot away from "home" at end of an "erase" rotation of master drum 20.

ERSP; FIG. 2d; returns master drum 20 to home position at end of recording sequence; energizes erase-write relay EWRL.

EWSWO; FIG. 2d; switch signal initiating erasure of drums when new information is to be recorded on the drums.

EXOP; FIG. 1; operating signal to programmed apparatus, from external apparatus.

FMC; FIG. 2a; Signal indicating all continuous-path control memories or records are at home positions.

FMC1; FIG. 4 or 8; "Home" signal for terminating the return operation of continuous-path control memory.

FMD; FIG. 2a; Master-drum home-position signal from master drum 20. Signals FMC and FMD also have many reset functions).

FMDA; FIG. 7a; Signal which is interpreted as an auxiliary-drum home-position signal.

HPD; FIG. 2a; Returns the master drum 20 and discs 72 to home position.

IH'; FIG. 2a; an inhibiting signal preventing the spurious transfer of control signals recorded on the drums when they are being returned to the home positions.

MBSD; FIG. 2a; switch signal for recording jaw-control pulse on drum 20.

MEP1, 2, 3; FIGS. 4, 6; end of path signal in point-to-point operations.

MS; FIG. 2a; manual stepping signal used during recording operations to index either of the drums 20 or A20.

MSD; FIG. 2a; master drum stepping signal, used during recording operations to index drum 20 and to record end-of-path spots on continuous-path control memory.

OPR; FIG. 2b; operate signal in effect at all times during "operate" mode.

OPS; FIG. 2c; master drum stepping signal at completion of most programmed operations, and after each recording operation.

PL and PL'; FIG. 7b; concurrent switch signal and its inverse indicating a pallet loading routine.

PP1, PP2, PP3; FIG. 2a; point-to-point signals, used in program-recording operations of master drum.

PPC1, PPC2, PPC3; FIG. 2c; point-to-point signals in effect during point-to-point programmed operations involving master drum 20.

PPC1', PPC2', PPC3'; FIG. 2c; signals developed at the end of each point-to-point operation controlled by master drum 20.

PPD1, PPD2, PPD3; FIG. 2a; point-to-point program selecting signals derived from master drum 20.

PSP; FIG. 1; photocell signal, present when article is in pick-up position of supply conveyor.

RBR; FIG. 2a; switch signal for recording transfer of control to auxiliary drum signal on master drum 20.

RCYD; FIG. 2a; signal initiating the return of both drums to home position.

REBR; FIG. 7a; switch signal for recording transfer of control back to master drum signal on auxiliary drum.

RSD; FIG. 2a; return-step signal from drum 20 at end of program, causing drum 20 to be returned to home position.

SP1A, B, C, D; FIG. 4; position-code signals from encoder.

SP1A′, B′, C′, D′; FIG. 4; complement of signals SP1A, B, C, D.

SPK1; FIG. 4; sampling-pulse signal, used in comparing point-to-point control and position signals.

TCH; FIG. 2b; teach signal in effect at all times during "teach" mode.

TCHA; FIG. 7a; signal present during changing of information on auxiliary drum.

TCHA′; FIG. 7a; signal inhibiting point-to-point operation under auxiliary-drum control.

X1A, B, C, D; FIG. 2a; point-to-point digital coordinate signals from drum 20 for radial arm control.

X1A′, B′, C′, D′; FIG. 4; complement of signals X1A, B, C, D.

XOP, XOPC; FIGS. 2a and 2c respectively; operating signals for external apparatus, derived from master drum 20 and flip-flop FF6.

The master control 11 in FIGS. 2a, 2b, 2c and 2d is used to control the mechanical arm 10 through its sequence of operations. The sequence of operations is stored as a plurality of program steps in a memory. The program steps are sequentially read and are used to direct the subordinate controls to perform the desired operations such as particular movements of the mechanical arm 10.

The memory in FIG. 2a is shown, by way of example, as magnetic drum 20 having a plurality of tracks circumferentially disposed about its outer periphery. Drum 20 includes both point-to-point program recordings and master-drum recordings for coordination and special functions. Reading heads RH are disposed opposite the tracks and are positioned to sense magnetic spots or areas of magnetization on the tracks and to provide an output depending upon the state of magnetization of the portion of the track that is opposite the reading head.

These areas or spots positioned opposite the reading heads RH at any one time form a control or program "slot." The reading heads RH in this embodiment are of a well-known type that is capable of sensing areas or spots of magnetization when there is no relative motion between the magnetic drum 20 and the reading head RH. Such heads have been conveniently called "at rest" reading heads. Although many embodiments of these reading heads are well known in the art, such a reading head may be of the form shown in my Patent No. 2,988,237, issued June 13, 1961, for Programmed Article Transfer. For convenience it will be assumed that the tracks on magnetic drum 20 are either magnetized or unmagnetized to distinguish "on" and "off" conditions. When there is a magnetic spot under this assumption it will be understood that the magnetic reading heads RH provide an output, and they do not provide an output when the area under the associated reading head RH is not magnetized. Another series of heads, writing heads WH, are disposed opposite all but the left-most track of the magnetic drum 20. The read heads RH and the write heads WH may include conventional signal amplifiers if required.

The tracks are divided in the following manner. The track opposite the reading head RHO has permanently recorded thereon a single magnetic spot which when sensed results in the generation of an FMD signal to indicate a "home" position or slot for the magnetic drum 20. The track opposite reading head RHE is associated with an end-of-program control circuit for indexing the drum to its "home" position. The output of reading head RHE is connected via the "and" circuit G23a to the RSD signal line. The track opposite reading head RHB is associated with circuitry for switching the program control to the auxiliary drum. That is, whenever a signal is sensed on this track, program control is shifted for a series of program steps to a second drum which stores program steps which may be frequently altered. The output of reading head RHB is connected via "and" circuit G23b to the BRD signal line. The track opposite the reading head RH1 is associated with the control of the jaws 10a. Magnetic spots sensed therein generate pulses which pass via "and" circuit G23c to the BSD line. The track opposite the reading head RH2 is associated with generating external control signals XOP for initiating the energization of the spraying station 15. In particular, the output of reading head RH2 is connected via "and" circuit G23d to the XOP signal line. The tracks opposite the reading heads RH3 to RH8 inclusive form a band DOF1 of tracks associated with the radial actuator 10c. The four tracks opposite reading heads RH3 to RH6 inclusive are provided to store digitally (in binary form or in Gray code, for example) the coded representation of a coordinate to which the mechanical arm 10 is to move radially. The coded combination of spots causes the generation of coded combinations of signals by the read heads RH3 to RH6. These signals are coupled via "and" circuits G23e to G23h and "or" circuits B23a to B23d to the X1A to X1D signal lines. The track opposite the reading head RH7 has recorded thereon continuous-path control signals to indicate that whenever such a signal is read, the radial movement to be performed by actuator 10c is under continuous control. The output of reading head RH7 is connected via "and" circuit G23i to the CPD1 signal line. The track opposite the reading head RH8 is provided to store point-to-point control signals. That is, whenever one of these signals is read, it indicates that the control exercised by the radial actuator 10c will be to direct the arm 10 to proceed to a given point indicated by the coordinates being read at that time by the reading heads RH3 to RH6 inclusive. Reading head RH8 is coupled via "and" circuit G23j to the PPD1 signal line. The next band of tracks or channel DOF2 is similar to the band of tracks DOF1 and is associated with the sweep actuator 10e. The third band of tracks or channel DOF3 is similar to the other bands except that it is associated with the swivel actuator 10d and does not include a continuous path control track. It should be noted that the X1A to X1D signals are generated by two sources, i.e., the AX1A to AX1D signal lines from auxiliary control memory (FIG. 7a) or the outputs of "and" circuit G23e to G23h which feed respective inputs of "or" circuits B23a to B23d. When master drum 20 is to supply the point-to-point coordinates "and" circuits G23e to G23h are operative, and when the auxiliary drum A20 (FIG. 7a) is to supply the point-to-point coordinates, signals from the auxiliary drum A20 are on the lines AX1A to AX1D, as is hereinafter described. It should be noted that one input of each of the "and" circuits G23a to G23j is connected to the output of "and" circuit G23 which receives at respective inputs the OPR, BR′ and IH′ signals. "And" circuit G23 controls the times when information can be read from master drum 20. In particular, "and" circuit G23 opens "and" circuits G23a to G23j when the OPR signal is present and the BR′ and IH′ inhibiting signals are absent. The OPR signal is generated by the teach-operate switch TOSW (FIG. 2b). The IH′ signal is generated by flip-flop FF8′ (FIG. 2a). And the BR′ signal is generated by flip-flop FF6′ (FIG. 2c).

It should also be noted that "or" circuits B23a to B23d, and "and" circuits G23e to G23j form output unit OU1. Similar circuits form output unit OU2 and output unit OU3 for the second and third channels DOF2 and DOF3, respectively.

Master drum 20 is connected via a shaft 22 to a conventional step drive 24, such shown in my pending application, Serial No. 226,203 cited above. Step drive 24, when energized, will cause the master drum 20 to step to the next slot. If the step drive 24 is continuously energized, the master drum 20 will rotate, step-by-step, until the energization is terminated. If, however, the step drive 24 is energized by a pulse, the master drum 20 will be only driven to the next step. Step drive 24 is energized via amplifier 26 which receives signals from the "or" circuit B20.

The first input to "or" circuit B20 is the MSD signal line which is the output of "and" circuit G279. The MSD pulse steps the master drum 20 one program slot. One input of "and" circuit G279 is the TCHA' inhibiting signal which blocks this circuit during the time program information is being recorded on auxiliary drum A20 as is hereinafter more fully described. The second input of "and" circuit G279 is the MS signal line connected to the normally open contact NO of spring return step switch SSW and via differentiating resistor R1 to ground. The normally closed contact NC is connected via source of current B1 to ground; and the moving contact MC is connected via storage capacitor C7 to ground. Thus, when step switch SSW is in its normally open state, charge accumulates on capacitor C1. When the switch is closed, the charge is discharged by resistor R1 and a pulse is generated on the MS signal line. This pulse will pass through "and" circuit G279 if the TCHA' inhibiting signal is absent to become the MSD pulse.

The second input to "or" circuit B20 is the ADS signal line which is connected to the output of "and" circuit G20 which transmits a pulse generally after both drums and all continuous-path control memories have returned to the "home" position and a new workpiece is available for transfer. It steps the master drum 20 to the first program slot. The circuitry associated with the generation of the ADS signal is hereinafter more fully described. The third input to "or" circuit is the OPS pulse which occurs at the end of each master drum program step. The ERSP signal feeds the next input of "or" circuit B20 to insure continuous stepping of master drum 20 during the erase cycle prior to the recording of a new program thereon. The BSD pulse which feeds the next input of "or" circuit B20 occurs whenever the jaw actuator 10b (FIG. 3) is triggered. The last input is the HPD signal from flip-flop FF8, which is used to drive master drum 20 to the home position generally after the end of a completed program routine. The set input of flip-flop FF8 is connected to the RCYD signal line, which is connected via differentiating capacitor C9 to the output of "or" circuit B19. The differentiating capacitor C9 insures that only the leading edge of the signal from "or" circuit B19 can trigger the flip-flop FF8 to the set state. The inputs to "or" circuit B19 are the RSD signal line and the "1" output of flip-flop FF8'. The "0" output of flip-flop FF8' transmits the IH' inhibiting signal, which is only present during the return of the drums to the home position at the end of the teach mode. Flip-flop FF8' has its set input connected to the RSW switch. This switch is only closed to record the return to home position control spot in last used program slot. It should be noted that the FMD signal line is connected to the reset input of flip-flop FF8 to terminate the HPD signal when master drum 20 reaches the home position. The FMD signal line and the output of "or" circuit B19' are fed to inputs of "and" circuit G5 whose output is connected to the reset input of flip-flop FF8' to terminate the IH' signal generally when both drums reach their home positions as is hereinafter more fully explained. The AFMD and PL signals feed inputs to "or" circuit B19'.

The circuits feeding the write heads WH will now be described. Each of the write heads WH is connected to a movable contact of a single-pole, double-throw relay contact set EWRC of an Erase-Write Relay EWRL (FIG. 2d). All the left-hand contacts EWRCN, as shown in FIG. 2a (considered to be the normally open contacts) are connected to a High-Frequency Erase Current source HFE. When the erase-write relay EWRL (FIG. 2d) is energized, the movable contacts are thrown to the erase position. The movable contacts engage the respective left-hand contacts (normally open) and erase current is fed to all the write heads WH so that any information previously recorded on the tracks is erased preparatory to the recording of new information.

When new information is to be recorded the erase-write relay EWRL is not energized and the movable contacts engage the right hand fixed contacts (the normally closed contacts) EWRCO.

In particular the write head WHE for the end-of-program recording is connected via the switch RSW to the current source B2. The write head WHB is connected via the RBR line and the BRSW switch to the MSD signal line. When the BRSW switch is manually closed by the setup man, and when the MSD signal occurs, a control spot is recorded on a track of master drum 20 which when read during the operate mode will cause transfer of control to the auxiliary drum as is hereinafter more fully described. The write head WH1 is connected to signal line MSD via the MBSD signal line and switch BSW. When the switch BSW is manually closed by the setup man, and when the MSD signal occurs, a control spot is recorded on the magnetic track of the drum associated with the control of jaws 10a. The write head WH2 is connected to signal line MSD through manual switch ESW. Switch ESW is manually closed whenever it is desired to record a control spot during the teach mode related to the energization of the controls in spraying station 15. The write heads WH3 to WH6 inclusive are respectively connected to outputs of "and" circuits G22c to G22f inclusive, whose second inputs are respectively connected to the SP1A to SP1D signal lines. As is hereinafter more fully described, the SP1A to SP1D signals are a binary coded representation of the actual radial coordinates of the mechanical arm 10 at every instant of time. The write head WH7 is connected to the output of "and" circuit G22g whose second input is connected to fixed contact 3 of type of Control Switch TCSW1 which then also transmits the CP1 signal. The write head WH8 is connected to the output of "and" circuit G22h whose second input is connected to the fixed contact 2 of the TCSW1 switch. When a point-to-point control pulse is to be recorded, the moving contact C is connected to fixed contact 2 of switch TCSW1 which also generates the PP1 signal in addition to causing the recording of a point-to-point control pulse. Fixed contacts 2 and 3 of switch TCSW1 are connected via resistors R12 and R13 to ground; and moving contact C is connected to the negative terminal of voltage source B10.

The circuitry including the contact sets of the erase-write relay contacts EWRCN and EWRCO associated with the write heads WH3 to WH8, the "and" circuits G22c to G22h, and the switch TCSW1 comprise the Access Unit AU1 for the first degree of freedom, that is, for the radial movement of the mechanical arm 10. Access unit AU2 associated with the second degree of feedom (sweep movement of the mechanical arm 10) includes similar circuitry as does the access unit AU3 of the third digitally controlled degree of freedom.

Included in master control 11 is a Teach-Operate switch TOSW which is of the single-pole, double-throw type. When the teach-operate switch TOSW is in the up position, as shown in FIG. 2b, the system is in the operate mode and the OPR signal is transmitted from the upper fixed contact. When the switch TOSW is thrown to the down position, the system is in the teach mode characterized by the TCH signal which passes through "or" circuit B27 to the Teach-Operate Relay TORL. The TCHA signal, when present, also energizes the Teach-Operate Relay TORL. The teach-operate relay TORL has a plurality of Relay Contacts sets RC disposed throughout the system.

The next major element of master control unit 11 is the master sequence control which centers around the circuitry feeding the conventional one-shot multivibrator MV (FIG. 2c) which when triggered transmits a master drum indexing pulse via the OPS line. This pulse is used to energize the step drive 24 usually upon the completion of a program step generally during the operate mode. The input of the one-shot multivibrator MV is connected to the output of "or" circuit B291. One input of "or" circuit B291 is connected to the ERSO signal line and the other input to the output of "and" circuit G24 which transmits a signal at the end of a program step during the operate mode. A first input to "and" circuit G24 is connected to the OPR signal line to insure that the "and" circuit only operates during the operate mode. The remaining inputs to the "and" circuit G24 are from the "0" outputs of the flip-flops FF1 to FF6', inclusive. Accordingly, the "and" circuit G24 will only transmit a pulse after the last of these flip-flops has been unset during the operate mode for insuring that the drum advances, and a new program step is read from the master drum 20, only after all the different types of control operations have been performed for the previous program step. The flip-flop FF1 is concerned with the continuous control of the first degree of freedom and is set by a signal on the CPD1 signal line which is connected to its set input. Flip-flop FF1 is unset by a signal on the ECP1 signal line which passes via delay line D1 to its reset input as hereinafter more fully described. The flip-flop FF2 is concerned with a point-to-point control of the first degree of freedom and is set by a signal from the output of "or" circuit B22. One input of "or" circuit B22 is connected to the PPD1 signal line and the other input to the lower contact of switch S1 as shown in FIG. 2c. The moving contact of switch S1 is connected to the ECP1 signal line and the upper contact to the reset input of flip-flop FF1. When switch S1 is in the down position, the ECP1 signal will unset flip-flop FF1 and set flip-flop FF2 to automatically introduce a point-to-point control at the end of a continuous control. When the switch S1 is in the up position, the ECP1 signal only unsets flip-flop FF1 and there is no automatic initiation of point-to-point control. Flip-flop FF2 is unset by a signal on the MEP1 signal line. The flip-flop FF3 is concerned with the continuous control of the second degree of freedom and is set by a signal on the GPD2 signal line and unset by an ECP2 signal fed via delay line D2. The flip-flop FF4 is concerned with point-to-point control of the second degree of freedom and is set by a signal from the output of "or" circuit B24. One input of "or" circuit B24 is the PPD2 signal line and the other input to the lower contact of switch S2 as shown in FIG. 2c. The moving contact of switch S2 is connected to the ECP2 signal line and the upper contact to the unit input of flip-flop FF3. When switch S2 is in the down position, the ECP2 signal unsets flip-flop FF3 and sets flip-flop FF4 causing an automatic point-to-point control to follow a continuous control. When the switch S2 is in the up position, the ECP2 signal only unsets flip-flop FF3 and there is no automatic changeover of control. The flip-flop FF5 is concerned with point-to-point control of the third degree of freedom and is set by a PPD3 signal and unset by an MEP3 signal. The flip-flop FF6 is concerned with controls associated with the spraying station 15 and is set by a signal on the XOP signal line and unset by a signal on the EXOP signal line. The flip-flop FF6' associated with transfer of control to the auxiliary drum is set by a BRD signal and unset by either an EBR or REBR signal fed to "or" circuit B23. It should be noted that the flip-flops FF1 to FF6', inclusive, cannot be set by the CPD, PPD, XOP and BRD signals during the teach mode because of the control exercised on the "and" circuit G23 (FIG. 2a) by the OPR signal.

It should also be noted that the set input of the flip-flop FF2 is connected to the output of "or" circuit B22 so that in addition to being set by the PPD1 signal, it can also be set by an ECP1 signal. Similarly, the set terminal of the flip-flop FF4 is connected to the output of "or" circuit B24 so that it can also be set by either the PPD2 signal or by the ECP2 signal. As will hereinafter become apparent, this permits a continuous control of a degree of freedom to be immediately followed by a point-to-point control in a single program step.

FIG. 2d shows the circuitry for controlling the erasing of master drum 20 and centers around flip-flops FF9 and FF10. The erase-write relay EWRL is energized by flip-flop FF10 whose "1" output is connected to the ERSP signal line and the coil of relay EWRL, and whose "0" output is connected via differentiating capacitor C1 to the ERSO signal line. The set input of flip-flop FF10 is connected to the output of "and" circuit G203, and the reset input is connected to the output of "and" circuit G202. The inputs to "and" circuit G202 are from the "0" output of flip-flop FF9 via differentiating capacitor C200, and from the "1" output of flip-flop FF10 via conventional lumped-constant delay line D4.

The set input of flip-flop FF9 is connected to the output of "and" circuit G200 whose first input is connected to the "1" output of flip-flop FF10, whose second input is connected to the FMD signal line, and whose third input is connected to the "0" output of flip-flop FF9. The reset input of flip-flop FF9 is connected to the output of "or" circuit B200 whose first input is connected to the output of "and" circuit G201, and whose second input is connected to the output of "and" circuit G203. "And" circuit G201 has a first input connected to the FMD signal line and a second input connected to the "1" output of flip-flop FF9. "And" circuit G203 has a first input connected to the CHA' signal line and a second input connected to the fixed contact of switch EWSW. As will hereinafter become apparent, the CHA' signal controls when the action of switch EWSW can initiate operation of the circuitry. The fixed contact of said switch is connected to the EWSWO line and via a "hold down" resistor R15 to ground. The moving contact of switch EWSW is connected to the negative terminal of voltage source V1 whose other terminal is grounded.

The circuit generally operates in the following manner. When the switch EWSW is momentarily closed, provided the CHA' inhibiting signal is absent, a signal passes via "and" circuit G203 to the set input of flip-flop FF10 setting this flip-flop, and via "or" circuit B200 to the unset input of flip-flop FF9 unsetting this flip-flop. Differentiating capacitor C200 and delay line D4 cooperate to insure that flip-flop FF10 is not immediately unset again. Capacitor 200 allows only the leading edge of the signal from the "0" output of flip-flop FF9 to reach "and" circuit G202, and delay line D4 introduces just enough delay in the arrival of the signal from the "1" output of flip-flop FF10 at the second input of "and" circuit G202 so that the leading edge of the signal passed by capacitor C200 is no longer present at the first input of "and" circuit G202. With the flip-flip FF10 set and flip-flop FF9 unset, the following conditions exits: the ERSP signal is being generated; the relay EWRL is energized; "and" circuits G202 and G200 are alerted to pass signals; and "and" circuit G201 is blocked. As will hereinafter become apparent, two FMD signals are received by the circuitry. The first FMD signal passes through "and" circuit G200 setting flip-flop FF9 which starts generating a signal from its "1" output and stops generating a signal from its "0" output. Accordingly, "and" circuit G201 is alerted to pass signals and "and" circuit G200 is blocked. The second FMD signal, therefore, passes via "and" circuit G201 and "or" circuit B200 to unset flip-flop FF9. When flip-flop FF9 unsets the leading edge of the signal from its "0" output passes via differentiating capacitor C200 and "and" circuit G202 to unset flip-flop FF10. When flip-flop FF10 unsets the ERSP signal terminates, the relay EWRL deenergizes and an ERSO pulse is transmitted by the differentiating capacitor C1 which is the leading edge of the signal now being transmitted from the "0" output of flip-flop FF10. The foregoing operation first provides for application of erase current to all the erase-write heads in FIG. 2a and at the same time provides control for advancing drum 20 continuously from any position it may be in when switch EWSW is operated to the home position of the drum and then during a further complete rotation of drum 20 to its home position.

The erase operation and the continuous advance of drum 20 are ended, and drum 20 then advances one more step from its home position to its first control "slot." This results from unsetting of flip-flop FF10, which generates an ERSO signal that is fed via "or" circuit B291 to multivibrator MV which produces an OPS pulse for advancing drum 20 one step.

FIGURE 3 shows the circuitry for controlling the opening and closing of jaws 10a. Jaw actuator 10b comprises flip-flop FF7 whose "1" output is connected to one end of the coil of solenoid L1 whose other end is grounded. The set input of flip-flop FF7 is connected to the output of "and" circuit G21 whose first input is connected to the "0" output of flip-flop FF7 and whose second input is connected to the output of "or" circuit B25. The inputs of "or" circuit B25 are connected to the BSD and MBSD signal lines. The reset input of flip-flop FF7 is connected to the output of "or" circuit B29 whose first input is connected to the FMD signal line and whose second input is connected to the output of "and" circuit G21a. The first input of "and" circuit G21a is connected to the "1" output of flip-flop FF7 and the second input is connected to the output of "or" circuit B25. Initially an FMD signal will unset flip-flop FF7 deenergized solenoid L1 causing jaws 10a to open. The first signal from the output of "or" circuit B25 passes through "and" circuit G21 setting flip-flop FF7 which energizes jaws 10a. The signal does not pass through "and" circuit G21a for when flip-flop FF7 is unset, the signal from its "1" output acts as an inhibiitng signal. The second signal from the output of "or" circuit B25 passes through "and" circuit G21a (flip-flop FF7 is now set) and via "or" circuit B29 to unset flip-flop FF7, deenergizing solenoid L1. Jaws 10a open. The second signal does not pass through "and" circuit G21 since the signal from the "0" output when the flip-flop FF7 is set acts as an inhibiting signal. The third signal from "or" circuit B25 will cause the same action as the first signal, etc. Thus the circuitry acts as a bistable device in response to received signals for alternately opening and closing jaws 10a.

FIG. 4 shows primarily the radial control 10c. The jaw support member 10f and consequently the jaws 10a are driven by a slave hydraulic actuator 50 comprising a piston 50a in a cylinder 50b having ports at each end which are connected to hydraulic fluid conduits 50c and 50d, respectively. When the pressure in the conduit 50c exceeds the pressure in the conduit 50d, the piston 50a is urged to the right, causing the jaws 10a connected to the jaw support 10f to move radially outward. When the pressure in the conduit 50d exceeds the pressure in the conduit 50c the piston 50a is urged to the left, causing the radial retraction of the jaws 10a. The pressure in the hydraulic conduits 50c and 50d is controlled by the master valve 52 having a cylinder 52a and a so-called spool 52b. Spool 52b is appropriately shaped to deliver unbalanced hydraulic pressure to either of the hydraulic conduits 50c and 50d when the spool is not centered. A central inlet in the cylinder 52a is connected via a pressure source conduit 52c to the high pressure line of hydraulic pressure supply 53. Openings at either end of the cylinder 52a are connected via conduits 52d and 52e to the sump end of the hydraulic pressure supply 53. When the spool 52b is moved to the right, the pressure source conduit 52c is connected to the conduit 50d and the conduit 52e is connected to the conduit 50c, so that the piston 50a is urged to the left. Similarly, if the spool 52b is moved to the left, pressure source conduit 52c is connected to the hydraulic conduit 50c and conduit 52d is connected to conduit 50d, causing the piston 50a to move to the right.

The movement of spool 52b is controlled by the torque motor 54 which includes a lever arm 54a connected by a pin-and-slot connection 53a to an extension of spool 52b. Lever arm 54a is pivotally mounted by means of a pin 54b which permits the lever arm 54a to rock clockwise or counterclockwise. Spring 54c connected to lever arm 54a is provided to bias the lever arm in a neutral position, this neutral position being the position wherein the spool 52b is centered in body 52a. The remainder of torque motor 54 includes a C-shaped core 54d having a winding developed about it. In the gap of the C-shaped core 54d is disposed the other end of lever 54a, which carries a polarized magnetic member 54f. With no current flowing in the winding 54e the element 54f is in a neutral position midway between the pole pieces of the core 54d by virtue of the biasing action of the spring 54b. Consequently the spool 52b is in a neutral position. However, when current in a first direction flows through winding 54e, the polarized element 54f is attracted towards one of the pole pieces, for example, the left hand pole piece. Accordingly, the lever arm 54a moves the spool 52b to the right. Similarly, if current flows in the winding 54e in the opposite direction, the spool 52b will be moved to the left. The magnitude of the current flow determines the displacement of the spool 52b and consequently the pressure difference in the hydraulic conduits 50c and 50d. The ends of the windings 54e are connected to the moving contacts of the contact sets RC1 and RC2 of the teach-operate relay TORL (FIG. 2). When the teach-operate relay is in the teach mode, the moving contacts of the contact sets RC1 and RC2 are connected to a manually controlled source of current 59.

The manually controlled source of current 59 includes the potentiometers 59a and 59b whose moving contacts are mechanically connected together and ganged to the control knob 59c. The ends of the resistance portions of the potentiometers 59a and 59b are connected to voltage sources plus V and minus V so that current is fed in a push-pull manner to the winding 54e. Displacement of the moving contacts of the potentiometers to either side of a center line of the resistance will cause a change in the direction of current flow. Similarly, as the displacement of the moving contacts of the potentiometer increase with respect to the center or neutral position, the magnitude of the current increases. Thus, during the teach mode a setup man need merely rotate the control knob 59c or similar control device in the desired direction and to the desired amount to move the jaws 10a in a radial direction.

Mechanically connected to the jaw support 10f is the position encoder 56 (see also FIG. 2a) having five tracks in the drawing. The position encoder is shown in both FIG. 4 and FIG. 2a to simplify the description of the system. Each track includes coded combinations of segments wherein, for example, the darkened segments shown in FIG. 4 carry a negative voltage and the other segments are insulated. The coding of the segments 56a to 56d represents digitally the position of the jaw support 10f at each point in its range. While four coded tracks are shown, usually a much larger number are used, and a corresponding number of heads WH and RH are included in each of the related parts of the master control 11 in FIG. 2a. The track 56e contains closely spaced regions of alternate voltage carrying segments and insulated segments, and is used to provide strobe or sampling pulses as is hereinafter more fully described.

Tracks 56a to 56e are fixed in relation to cylinder 50b. Disposed opposite each of the tracks 56a to 56e inclusive are contact brushes 56a' to 56e' inclusive. These contact brushes mechanically coupled to jaw support 10f for corresponding or proportional movements, and the brushes are driven in unison over their respective tracks as the jaw support 10f is moved. Each of the brushes 56a' to 56d' is connected to one of the signal lines SP1A to SP1D, respectively. Consequently, these signal lines carry a coded combination of voltages representative of the radial position of the jaws 10a. The brush 56e' is connected to the SPK1 signal line which will transmit sampling pulses. Accordingly, the lines SP1A to SP1D always carry the digital representation of the radial coordinate of the arm 10a.

During the operate mode, the winding 54e is connected to the lines 57a and 57b via the normally closed contacts of the contact sets RC1 and RC2. If a point-to-point control is called for, the PPC1 signal from main drum 20 (FIG. 2a) or the APPC1 signal from the auxiliary drum A20 (FIG. 7a) will be present at an input to "or" circuit B50 which energizes point-to-point relay PPRL via amplifier A30. With the relay PPRL energized, the relay contacts connect the lines 57a and 57b to the outputs of amplifiers A31 and A32, respectively. By virtue of the action at the "and" circuits G30 and G31, which respectively drive the amplifiers A31 and A32, the only possible condition for these amplifiers is that either one of the amplifiers is active or neither amplifier is active. It is never possible that both amplifiers are active. The activation of the amplifiers A31 and A32 is dependent upon a comparison between the actual radial position of the jaws 10a as indicated by the coded combination of voltages on the SP1A to SP1D signal lines and the desired final radial position for the jaws 10a as indicated by the coordinates recorded in the active drum and represented by a coded combination of signals on the X1A to X1D signal lines. The numbers represented by these coded combinations of signals are compared by the comparator 58 as is hereinafter more fully described.

If the desired final coordinate is greater than the actual presently available coordinate, comparator 58 transmits the SX1 and XS1' signals to the "and" circuit G30 energizing amplifier A31. If the reverse condition is so, then the comparator 58 transmits the SX1' and XS1 signals to the "and" circuit G31 activating the amplifier A32. If the desired and actual coordinates are the same, the comparator 58 transmits the MEP1 signal via the MEP1 signal line and neither of the amplifiers A31 and A32 is energized.

If the amplifier A31 is energized and consequently the amplifier A32 is not energized, there is a conventional current flow from the resistor R1 via the line 57b through the coil 54e to the line 57a and back to the amplifier A31, causing the pivoting of the lever 54a in such a direction that the arm support 10f connected to piston 59a is driven to the right. If the amplifier A32 is energized and the amplifier A31 is not energized, current flow in the opposite direction and the arm support 10f retracts. If neither of the amplifiers A31 and A32 is energized, there is no current flow through the coil 54e and the arm support 10f does not move.

The PPC1 or APPC1 signal, depending on which drum is active, is fed via the PPC1 or APPC1 line to do the first sampling of the comparator 58. Similarly, the SPK1 pulses from brush 56e' are fed to the comparator 58, to permit sampling during the movement of the arm support 10f. The PPC1 and APPC1 signals only permit comparisons during appropriate times of the operate mode.

If a programmed continuous-control motion is called for, the CPC1 signal is generated and fed to amplifier A33 which energizes the continuous control relay CPRL and the lines 57a and 57b are connected to the terminals 60a and 60b of the variable current source 60. Variable current source 60 may be a potentiometer having a resistance element 60c. The mid-point of the resistance element 60c is connected via a resistor 60d to a negative voltage −V. The end points of the resistance element 60c are connected respectively to the terminals 60a and 60b. The moving contact 60e of the potentiometer includes a resistor connected to a source of positive potential +V. Thus, when the moving contact 60e is at the mid-point of the resistor element 60c, no current flows from the terminals 60a and 60b of the variable current source 60. As the moving contact 60e is moved towards the terminal 60a, current flows from terminal 60a via lead 57a through coil 54e back through lead 57b to terminal 60b. Similarly, if the moving contact 60e is moved towards the terminal 60b, current flows from terminal 60b via line 57b in the opposite direction through coil 54e and back to line 57a to terminal 60a.

Accordingly, the displacement of the moving contact 60e on either side of the mid-point determines the direction of current flow and therefore the direction of movement of the jaw support member 10f. The magnitude of the displacement of the moving contact 60e from the center point determines the magnitude of current flow and consequently the magnitude of the displacement of the jaw support 10f. Moving contact 60e is controlled by motor 62 to which it is mechanically connected.

The control of motor 62 is performed by continuous control element 70, which will now be described.

Continuous control element 70 includes a disc 72 of magnetizable material which is supported and rotated by means of a motor and gearing unit 73 to which it is connected by shaft 73a. During the teach mode, as is hereinafter more fully described, magnetic recordings such as 72a and 72b, representing displacements of radial movement, were recorded on the disc 72.

The recordings are transversely recorded with respect to the circumferential direction of motion of the disc 72, that is, along a radius at any given point. The recording is made by a recording head 76 which includes a C-shaped core 76a (see FIGS. 5b and 5c), oriented along a radius vector of the disc 72. The gap 76b of the C-shaped core 76a is disposed opposite the disc 72. The winding 76c disposed about the core 76a has one end grounded and the other end connected to the lead 77 which, during the teach mode, receives current from the source +V.

By virtue of the core geometry, a recording having a transverse flux density such as shown in FIG. 5a is obtained. The recording has a maximum value at the center of the track and tapers off on each side of the track.

Fixed to the recording head 76 (but separated therefrom by a gap) is a reading head 78 which is magnetically insulated therefrom. The reading head 78 includes two U-shaped magnetic cores 78a and 78b that are inverted and secured to each other to form a double U with a magnetic insulator 78c between adjacent arms. The double U is arranged with its magnetic insulator 78c circumferentially aligned with the gap 76b of the recording head. The central legs of cores 78a and 78b extend downward to the level of their outer legs, but they are shown shortened in FIGS. 5b and 5c so that their orientation with respect to gap 76b may be readily seen. A center-tapped coil 78d is disposed about the magnetic cores 78a and 78b. Sensing and recording head 74 (FIG. 4) comprising heads 76 and 78 is mounted for radial movement adjacent disc 72. The outer arms 78e and 78f of the coil 78d are connected to the outer arms of the center-tapped secondary of transformer 80. The primary winding 80b is energized by source of alternating current 94.

The center-tapped secondary 80a and the center-tapped coil 78d form a bridge network. The network is balanced when the magnetic insulator 78c is aligned with the transverse mid-point of the recordings such as 72a and 72b. Whenever the magnetic insulator 78c is transversely displaced with respect to the center of the recording, the bridge becomes unbalanced, resulting in a change of impedance which causes a sharp phase shift in the output of the bridge. At the start of each continuous control program motion reading head 78 is in the required position, being brought there by whatever type of program step had just taken place.

The bridge output is fed via line 82 and relay contacts RC4 to a phase-compensated preamplifier 83 which may optionally include filtering means. The output of phase-compensated amplifier 83 is fed to amplifier 86 where it is applied via a transformer 88 to one phase 90 of the two-phase motor 62. The second phase 92 of the two-phase motor 62 is obtained from the source 94 which is used to energize the transformer 80.

In response to the phase differences, motor 62 drives the moving contact 60e of the variable source of current 60.

In order to close the servo-loop, a mechanical coupling connects the jaw support 10f to unit 74, representing the assembly of heads 76 and 78. Radial actuator shaft 10f is connected directly or through a proportioning coupling to both position encoder 56 and to unit 74. Accordingly, as the unit 74 is displaced with respect to a recorded trace such as recording 72a, an error signal is fed via line 82, amplifiers 83 and 86 and transformer 88 to the motor 62. Motor 62 accordingly rotates, driving the moving contact 60e in an appropriate direction, causing a current to flow in the coil 54e of the torque motor 54. This current displaces the spool 52b of the master hydraulic actuator 52, resulting in a displacement of the jaw support 10f. As jaw support 10f moves, it also drives the unit 74 to minimize the error signal and accordingly follows the contour represented by the recording on the disc 72. In this manner continuous control is obtainable for the radial position of the jaws 10a.

Also included on disc 72 are circular control tracks, including a control track upon which are controllably recorded pulses indicating the end of a continuous-control path. A dual magnetic read-write head 96, including an at-rest sensing portion and a D.-C. recording portion, is disposed opposite a control track of disc 72. The sensing portion of head 96 is normally connected to the moving contact of the contact set RC3 of the teach-operate relay TORL. The normally open contacts of set RC5 are connected through an amplifier to the recording portion of head 96 and to the output of "and" circuit G39a. The inputs to gate G39a are connected to the CP1, and MSD signal lines. During the teach mode, the normally open contacts RC5 are closed. Whenever a pulse is generated at the end of a continuous control recording during the teach mode, a control mark is recorded on the control track. During the operate mode, the recording is sensed and the signal is fed via amplifier A35 and the normally closed contacts of set RC3 to the ECP1 signal line. Amplifier A35 includes a rectifier and filter so that it only transmits a D.-C. pulse in response to A.-C. signals received from head 96.

During the teach mode, the "and" circuit G39 under control of a CP1 signal (FIG. 2a) connects the source +V to the line 77 (FIG. 4) to record the contours. The contact set RC4 of the teach-operate relay TORL are closed during the operate mode and the output of the transducer 74 is disconnected from the amplifier 83 during the teach mode.

The operation of the drive motor 73 is controlled by the relay 73b which, when energized, causes power to be applied to said motor. Relay 73b is energized by amplifier A36.

Flip-flop FF30 has its "1" output connected to the input of amplifier A36. Whenever flip-flop FF30 is set, amplifier A36 energizes relay 73b. The set input of flip-flop FF30 is connected via differentiating capacitor C3 to the output of "or" circuit B32. The signal inputs to "or" circuit B32 indicate when the flip-flop is to be set. The CP1 signal associated with the recording of continuous path control areas for the radial-movement degree of freedom during the teach mode will start the motor 73 so that a continuous path can be recorded on a magnetic recording disc 72. Although a disc is shown, magnetic tapes can be employed, as is hereinafter described, where a larger capacity is needed. Each degree of freedom which is subject to continuous control is equipped with a disc similar to disc 72. All the discs have drives that are synchronized, as by means of separate synchronous motors, and on-off control relays such as relay 73b with a common A.-C. power source, so that the control traces for all the degrees of freedom are functionally related to each other. The CPC1 signal (FIG. 2c) derived from previously recorded continuous path control pulses associated with the first degree of freedom can set the flip-flop FF30 during the operate mode. The HPD signal will set the flip-flop FF30 at the end of a program so that the discs can be driven to the home or start position. With flip-flop FF30 set, the amplifier A36 energizes the relay 73b and drive motor 73 operates. To unset flip-flop FF30, a signal is required from the output of the "or" circuit B33. The MSD signal at one input of the "or" circuit B33 is used to unset the flip-flop during the teach mode after each program step has been recorded. The FMC1 signal fed to the second input of "or" circuit B33 will unset the flip-flop when the disc reaches its home position. The last input of the "or" circuit B33 is the signal CPC1' from flip-flop FF1 in its reset state.

Whenever the program is to be changed, the discs 72 are demagnetized (by means not shown) or replaced by magnetically neutral discs and the old discs are stored in a library for possible use at a later time.

A separate control track on each of the discs is used to indicate the start of a program. Opposite this control track on disc 72 is a magnetic read-write head 91 which will sense a record indicating the home point or the start of the program. Whenever this record is sensed, it is amplified by amplifier A37 which transmits an FMC1 pulse. The pulse is recorded at the start of the teach mode as the old program is erased from the magnetic drum 20 when the erase-write relay EWRL is energized. Head 91 is like head 96, in that it includes an at-rest sensing portion and a D.-C. recording portion. At that time the contact sets EWRC1, EWRC2 and EWRC3 of relay EWRL are moved to the down position in FIG. 4. The charge stored in capacitor C7 passes as a recording pulse into the recording portion of head 91 via resistor R8 and contacts EWRC3. When the relay is returned to the normal position, the sensing portion of head 91 is connected to amplifier A37 and source B recharges capacitor C7 via contacts EWRC2 and resistor R9.

Comparator 58 of FIG. 4 is shown in FIG. 6 as a digital logical network which indicates one of three conditions, namely: (1) whether the desired final coordinate has a digital representation greater than the digital representation of the presently available coordinate, i.e., whether the desired final coordinate is greater than the presently available coordinate; (2) whether the digital representation of the desired final coordinate is less than the digital representation of the presently available coordinate, and (3) whether the digital representations of the desired final coordinate and the presently available coordinate are equal.

The comparator 58 includes four bit comparison units, BCU1 to BCU4, inclusive. Each of these bit comparison units respectively compares a different bit position of the coordinates. Each of the bit comparison units BCU1 and BCU4 includes a pair of "and" circuits which receive at their inputs the signals representing the bits in the positions they are to compare and whose outputs drive an "or" circuit, with the output of the "or" circuit driving a polarity inverting amplifier.

For example, the bit comparison unit BCU1 includes the "and" circuits G51 and G52 wherein the "and" circuit G51 has inputs connected to the SP1A and the X1A' signal lines, and the "and" circuit G52 has a pair of inputs respectively connected to the SP1A' and X1A signal lines. Signal SP1A' is the inverse of signal SP1A, and similarly signal X1A' is the inverse of signal X1A. These inverse signals are provided by the amplifiers 58a and 58b at the input to comparator 58 (FIG. 4). The outputs of the "and" circuits G51 and G52 are respectively connected to inputs of the "or" circuit B51 with the output of the "or" circuit B51 connected to the input of the amplifier A51.

Following the bit comparing units BCU1 to BCU4 are the timed sampling gates, i.e., "and" circuits G59 to G63 inclusive. Each of these "and" circuits has one input connected via a capacitor C50 to the output of "or" circuit B57 which transmits sampling pulses. At the start of operation, the PPC1 signal or APPC1 signal is present at one input of "or" circuit B57 and constitutes the first sampling pulse. The outputs of the "and" circuits G59 to G62 are fed to inputs of "or" circuit B55 whose output is connected to the set input terminal of a flip-flop FF51. When flip-flop FF51 is set, it indicates that the presently available coordinate is greater than the desired final coordinate.

The output of "and" circuit G63 is fed to the set input terminal of flip-flop FF53. When flip-flop FF53 is set, it indicates that the desired final coordinate is equal to the available coordinate. The "0" outputs of the flip-flops FF51 and FF53 feed inputs of "and" circuit G64 whose third input receives a sampling pulse via the delay line D51. The output of "and" circuit G64 feeds the set input terminal of flip-flop FF52 which when set indicates the presently available coordinate is less than the desired final coordinate. The PPC1 and APPC1 signals feed inputs of "or" circuit B57a whose output feeds "and" circuits G63, G64 and G65 to insure that comparator 58 operates during the operate mode only when point-to-point control is called for.

The operation of comparator 58 will now be described. Assume first that the most significant bit of the presently available coordinate is greater than the most significant bit of the desired final coordinate. Accordingly, the signals on the line SP1A will represent binary 1 and the signal on the line X1A will represent binary 0. Then the signal on the line X1A' (its inverse) represents binary 1. Accordingly, a signal representing binary 1 passes through "and" circuit G51 to one input of "and" circuit G59. When "and" circuit G59 is sampled by a sampling pulse from "or" circuit B57, the binary 1 passes the sampling pulse through "and" circuit G59 and "or" circuit B55 to the set input terminal of flip-flop FF51. Flip-flop FF51 accordingly sets and generates the SX1 signal from its "1" output terminal.

The presence of the SX1 signal indicates that the desired final coordinate is less than the presently available coordinate, or that the presently available coordinate is greater than the desired final coordinate. If the most significant bits of the desired and available coordinates are equal, then neither "and" circuit G51 nor "and" circuit G52 passes a binary 1 and consequently the amplifier A51 receives a binary 0 from the "or" circuit B51. However, because the amplifier A51 only has an inverting output, the inverting output transmits a binary 1 to inputs of the "and" circuits G60 to G63, inclusive. These gates are alerted to permit the magnitude comparison to depend on the lower order significant bits of the coordinates.

If an inequality exists, regardless of the direction of inequality, between the most significant bit of the desired final coordinate and the most significant bit of the presently available coordinate, either "and" circuit G51 or G52 will pass a binary 1 and the amplifier A51 will transmit a binary 0 which inhibits the "and" circuits G60 to G63, inclusive.

The binary comparing unit BCU2 operates in a similar manner to compare the second-most significant bits of the desired and available coordinates. The resulting comparison by this unit has no effect unless the most significant bits of the desired and available coordinates are equal because of the control of the output of amplifier A51 on the "and" circuit G60. In particular, only if the most significant bits are equal will the "and" circuit G60 be altered, and if the second-most significant bits of the available coordinate is greater than the second most significant bit of the desired coordinate a binary 1 will pass through the "and" circuit G60 when it is sampled by the sampling pulse. If the "and" circuit G60 passes a binary 1, it is fed via "or" circuit B55 to the set input of flip-flop FF51 which sets (unless it is already set) and starts generating the SX1 signal from its "1" output terminal. If the second-most significant bits are equal, then neither the "and" circuit G53 nor the "and" circuit G54 will pass a binary 1, and consequently the output of amplifier A52 will transmit a binary 1 which alerts the "and" circuits G61 to G63 inclusive to permit the sampling of the lower order bits of the coordinates. However, if the second-most significant bits are different in either direction, the amplifier A52, just as the amplifier A51 operated, will prevent any sampling by the "and" circuits G61 to G63, inclusive. The binary comparing units BCU3 and BCU4 operate in a similar manner to compare the third-most significant and the least significant bit, respectively.

In recapitulation, it is seen that the highest order bit comparing unit which first shows that the associated bit of the presently available coordinate is greater than the associated bit of the desired final coordinate, causes the setting of the flip-flop FF51 and effectively prevents any effect by the comparisons of the lower order bits.

If the bits representing the desired final coordinate are all equal to the bits represented by the presently available coordinate, then all the inputs to the "and" circuit G63 will be at binary 1 and when the sampling pulse occurs a binary 1 is passed to the set input terminal of flip-flop FF53 which starts generating the MEP1 signal from its "1" output terminal. The MEP1 signal indicates that the coordinates are equal.

The "0" output terminals of both the flip-flop FF51 and FF53 are connected to inputs of the "and" circuit G64. If both of these flip-flops are not set, the sampling pulse which passes through delay line D51 causes a binary 1 to pass through "and" circuit G64, setting the flip-flop FF52. When the flip-flop FF52, is set, it generates the XS1 signal which indicates that the desired final coordinate is less than the presently available coordinate.

It will be apparent from the foregoing discussion that only one of the flip-flops FF51 and FF52 can be set at any one time to indicate the sign of the inequality of the coordinates being compared. Furthermore, as soon as the flip-flop FF53 is set and thus represents equality of the coordinates being compared, the MEP1 signal is fed via a delay line D52 to an input of "or" circuit B56 to unset either set flip-flop FF51 or FF52 as well as the flip-flop FF53. The delay introduced by delay line D52 is sufficient to allow the MEP1 signal to be an operative pulse. At the start of operations, the FMD signal (FIG. 2a) passes as a pulse via the "or" circuit B56 to the reset input terminals of the flip-flops FF51 to FF53, inclusive, to initially insure these flip-flops are cleared.

Normally, during operation, the initial comparison of the desired coordinates and the available coordinates results in the setting of either one of the flip-flops FF51 or FF52. If, for example, the flip-flop FF51 is set, then the SX1 signal is generated. The SX1 signal, as seen in FIG. 4, passes through "and" circuit G30 and, as heretofore described, will cause the mechanical arm 10a to move, say, radially backward or retract. As it retracts, further comparisons are performed and finally the available coordinate equals the desired final coordinate. At that time the "and" circuit G63 will pass a binary 1 which sets the flip-flop FF53 generating the MEP1 signal which resets the flip-flop FF51 as previously described. When the MEP1 signal is generated, indicating this equality, the SX1 signal terminates, both outlet sides of valve 52 close, and consequently the radial movement of the mechanical arm 10a stops.

Although a specific example of the comparator 58 has been shown and described in detail, many comparators which perform similar functions may be used. Thus a direction-of-motion function control can be included in the program drum, and then a simple coincidence detector can be used, as in my above-mentioned Patent No. 2,988,237.

The operation of the system will first be described without considering the ability to modify the program. Initially, a new disc is placed on the drive shaft 73a (FIG. 4) and on the synchronized drive shafts of other degrees of freedom by the setup man. The teach-operate switch TOSW is adjusted to the teach position and then erase-write switch EWSW (FIG. 2d) is closed manually for a moment. A signal is sent via "and" circuit G203 and "or" circuit B200 to the reset terminal of flip-flop FF9 (FIG. 2d) and to the set terminal of flip-flop FF10. For the time being it will be assumed that the CHA' inhibiting signal associated with modifying the program is not present. Flip-flop FF9 is unset and FF10 is set. When flip-flop FF10 sets, it generates the ERSP signal which is fed via "or" circuit B20 to amplifier A26 (FIG. 2a), causing the activation of step drive 24 as long as it is present. The ERSP signal also energizes relay EWRL (FIG. 2d). The contacts EWRCN connect the write heads WH to the source of erase current HFE (FIG. 2a) and the contacts EWRC3 operate to record the "home" pulse on disc 72 (FIG. 4) as previously described. When master drum 20 (FIG. 2a) rotates to the program slot where its "home" pulse is recorded, i.e. the "home" program slot, read head RHO transmits an FMD pulse which passes via "and" circuit G200 (FIG. 2d) to set flip-flop FF9. When the master drum 20 again reaches the program slot containing the "home" pulse, the FMD pulse is again generated and this time passes through "and" circuit G201 to unset flip-flop FF9. As flip-flop FF9 unsets, it transmits a signal via capacitor C200 and "and" circuit G202 to the reset terminal of flip-flop FF10 which unsets. Accordingly, the ERSP signal terminates, ending continuous stepping by step drive 24, and the erase-write relay EWRL is deenergized, ending erasing of the tracks on magnetic drum 20. The "0" output of flip-flop FF10 then transmits an ERSO signal which passes via capacitor C1 to "or" circuit B291 (FIG. 2c) to trigger one-shot multivibrator MV. The OPS pulse generated by multivibrator MV passes through "or" circuit B20 (FIG. 2a) to amplifier A26 causing step drive 24 to rotate master drum 20 to the first program slot past the home position. Accordingly, all the program slots of master drum 20 have been erased, the master drum 20 is at rest at the first program slot after the "home" slot, and a "home" pulse has been recorded on disc 72 (FIG. 4).

The setup man positions the type of control switches such as TCSW1 (FIG. 2a) to position 2, and then by means of controls (such as manual control 59, FIG. 4, for the first degree of freedom) moves the jaws 10a to position B (FIG. 1). When he is satisfied with the positioning in all the degrees of freedom, he momentarily depresses step switch SSW (FIG. 2a) which generates an MS signal that is fed via "and" circuit G279 and the MSD signal line to "and" circuits in access units AU1, AU2 and AU3 for all three of the degrees of freedom. The inhibiting TCHA' signal is not present at "and" circuit G279 since it is only present when recordings are to be made on the auxiliary drum. It will be recalled that signal lines SP1A, B, C and D, SP2A, B, C and D, and SP3A, B, C and D at this time carry signals representing digitally the actual coordinates of the mechanical arm 10. The MSD signal gates these coordinates particularly via "and" circuits, such as G22c, G22d, G22e and G22f, to the drive heads such as WH3 to WM6 inclusive. At the same time a point-to-point control pulse is recorded by write heads such as WH8 for the first degree of freedom by virtue of the MSD pulse and the voltage present on the PP1 signal line from the contact 2 of the type of control switch TCSW1. There has thus been recorded in the first program slot a point-to-point control spot and the coded combination of areas of magnetization representing the desired first position of the jaws 10a in the program. The MSD pulse is also fed via "or" circuit B20 to amplifier A26 which energizes step drive 24 causing magnetic drum 20 to step to the next program slot.

For the next step of the program, the setup man merely closes the control switch BSW (FIG. 2a) associated with the opening and closing of jaws 10a and also the step switch SSW. This time a magnetic spot is recorded by write head WH1 in responses to the generated MBSD signal, the magnetic drum 20 is stepped to the next program slot in the usual manner, and the MBSD pulse passing through "or" circuit B25 (FIG. 3) sets flip-flop FF7 closing jaws 10a.

It will be recalled that the next program step calls for the complex movement from point B to point C (FIG. 1). Accordingly, after having released the switches BSW and SSW, the setup man positions the switch TCSW1 (FIG. 2a) and the switch TCSW2 to their "3" position and the switch TCSW3 to the "2" position because continuous path controls are to be provided for the first (radial movement) and second (rotational movement) degrees of freedom and a point-to-point control is to be provided for the third degree of freedom (swivel movement). The switches TCSW1 and TCSW2 respectively generate CP1 and CP2 signals. The CP1 signal is fed via "or" circuit B32 and capacitor C3 to the set input of flip-flop FF30 (FIG. 4) resulting in the rotation of disc 72. The setup man manipulates controls such as controls 59 by means of knobs such as knob 59c or even a "joy" stick coordinating all the controls, to guide the mechanical arm 10 through the path BC including the swivel of the jaws 10a (FIG. 1). The CP1 signal at "and" circuit G39 (FIG. 4) causes current flow via line 77 into the recording head of transducer 74 whereby the recording of the path is made on disc 72 for the first degree of freedom. At the same time the CP2 signal is performing a similar function for the circuitry and disc associated with the second degree of freedom. Discs 72 rotate at a uniform standardized speed, and therefore the contours recorded on discs 72 not only establish the relationships, continuously between the various motions but additionally establish the speeds of the controlled motions at all parts of the resulting operation. During this time the jaws 10a rotate 90° in response to manipulations by the setup man of knobs or the like. When the jaws 10a reach the point C, the setup man again momentarily closes the step switch SSW which generates the MSD pulse in the usual manner. The MSD pulse passes through "or" circuit B33 to the reset input of flip-flop FF30 which unsets, and the rotation of the discs 72 terminates. The MSD pulse also passes, via "and" circuit G39a, through relay contacts RC5 of the teach-operate relay TORL causing the recording by read-write head 96 of an end of continuous-path control pulse. The MSD pulse also gates the digital representation of the coordinates of all the degrees of freedom via "and" circuits such as "and" circuits G22c to G22f for the first degree of freedom (FIG. 2a). In addition, the MSD control pulse causes heads WH7 and WH13 to record continuous-path control-pulses for the first and second degrees of freedom, the CP1 signal and MSD pulse cooperate at "and" circuit G22g to pass a pulse to write head WH7. Finally, the MSD pulse causes the master drum 20 to step to the next program slot in the usual manner.

Next, another jaw-control recording is repeated using switch BSW, and the step switch SSW, causing the jaws to open by virtue of the MBSD signal now unsetting flip-flop FF7, preparatory to retracting arm 10.

The setup man, after returning the TCSW2 and TCSW3 to their neutral positions, i.e., position "1," places the TCSW1 switch to the "2" position and operates control 59 (FIG. 4) causing the mechanical arm 10 to radially retract. When the mechanical arm 10 is at the position D, he momentarily closes the step switch SSW causing, as described above, the recording of the radial coordinate of the point D and the point-to-point control spot, and the stepping of the master drum 20 to the next program slot. The setup man then moves the TCSW1 switch to the neutral position, momentarily closes the switch ESW and then, while switch ESW is closed, momentarily closes the SSW switch. In addition to the recording of the coordinates, which may be of no consequence, the MSD pulse cooperates with switch ESW to cause the recording of an external control pulse by write head WH2.

The remainder of the program is set up in the same manner with the final position of the mechanical arm 10 being the position A. The setup man then momentarily depresses the switch RSW causing write head WHE to record an end-of-program magnetic spot and the setting of flip-flop FF8' which starts generating the IH' inhibiting signal.

The setup man then throws the teach-operate switch TOSW (FIG. 2b) to the operate position, which causes the generation of the OPR signal and the deenergizing of the teach-operate relay TORL. The OPR signal alerts the "and" circuits G24 (FIG. 2c) which will permit automatic stepping of the master drum 20 when required, and also makes "and" circuit G23 (FIG. 2a) dependent on the BR' and IH' inhibiting signals. At this time, the BR' inhibiting signal is absent, it being present only when the auxiliary drum is being accessed as hereinafter described, and the IH' inhibiting signal is present.

The state of the system at the time the flip-flop FF8' sets and starts generating the IH' inhibiting signal is as follows: the write heads WH of master drum 20 are opposite a program slot only containing an end of program signal; the read heads RH can conceivably be opposite a program slot containing control information; discs 72 are stopped with their heads 96 opposite a control pulse; and none of the sequence flip-flops FF1 to FF6' (FIG. 2c) is set. These flip-flops cannot be set until the IH' inhibiting signal disappears at an input to "and" circuit G23 (FIG. 2a) which blocks the "and" circuits G23a to G23j (the absence of the OPR signal at "and" circuit G23 up to this time causing the blocking action). Furthermore an ECP1 signal cannot set the flip-flop FF2 until the IH' inhibiting signal disappears from "and" circuit G37 (FIG. 4) since this "and" circuit controls transmission of the ECP1 signal to flip-flop FF2. Accordingly, the mechanical arm 10 remains at point A, and will remain there at least until the IH' inhibiting signal terminates. In particular, flip-flop FF1 (FIG. 2c) which generates the CPC1 signal can only be set by a CPD1 signal from "and" circuit G23j (FIG. 2a). "And" circuit G23i is blocked during absence of the OPR signal and is now blocked by presence of IH' inhibiting signal at "and" circuit G23. Flip-flop FF2 which generates the PPC1 signal can be set by a PPD1 signal from "and" circuit G23j which was blocked and is now blocked in the same manner as "and" circuit G23i. Flip-flop FF2 can also be set by an ECP1 signal. However, when the OPR signal is absent relay contact RC3 (FIG. 4) of the teach-operate relay is open, and now the IH' inhibiting signal blocks "and" circuit G37. Accordingly, no ECP1 signal has been generated and none will be generated until the IH' signal terminates. A similar analysis holds for the remaining sequence flip-flops FF3 to FF6'. When the teach-operate relay TORL is deenergized, relay contacts RC1 and RC2 (FIG. 4) connect winding 54e to leads 57a and 57b. Since neither flip-flop FF1 nor flip-flop FF2 is set, the PPC1 and CPC1 signals are absent (the APPC1 signal is also absent, as is hereinafter described); therefore, neither relay PPRL nor relay CPRL is energized. Accordingly, no current flows via leads 57a and 57b to winding 54e and the actuator 10f cannot be driven. A similar action takes place for the other degrees of freedom, and mechanical arm 10 is locked at point A.

When the flip-flop FF8' sets, in addition to generating the IH' signal it transmitted a signal from its "1" output via differentiating capacitor C9 to the set input of flip-flop FF8 to set flip-flop FF8 (FIG. 2a) which starts generating the HPD signal that is fed via "or" circuit B20 and amplifier A26 to step drive 24, causing the master drum 20 to rotate in a stepwise manner. The HPD signal is also fed via "or" circuit B32 to set flip-flop FF30 (FIG. 4) causing motors 73 to rotate the discs 72.

When disc 72 reaches the home position, the magnetic head 91 senses the home-indicating pulse which is amplified and transmitted by amplifier A37 as the FMC1 signal (FIG. 4) that is fed to one input of "and" circuit G280 (FIG. 2a). When the second disc 72 reaches the home position, it will generate an FMC2 signal and "and" circuit G280 then generates the FMC signal. When the master drum 20 reaches the home position, read head RHO transmits an FMD signal that is fed via "or" circuit B29 (FIG. 3) to the reset terminal of flip-flop FF7 to insure that the jaws 10a start in the open position. The FMD pulse passes through "and" circuit G5 to unset flip-flop FF8' terminating the IH' inhibiting signal. For the present, it will be assumed that the AFMD signal at the second input of "and" circuit G5 is provided at this time. The FMD signal also is fed to the reset input of flip-flop FF8 to terminate the generation of the HPD signal and the continuous energization of step drive 24. The FMD signal is fed to the second input of "and" circuit G29 (FIG. 2a) where it cooperates with the FMD signal to await the reception of a PSP signal. The FMDA signal associated with the auxiliary drum will be present, as is hereinafter more fully described. The FMD signal is also fed via "or" circuit B56 (FIG. 6) to the reset inputs of flip-flops FF51 to FF53, so that the comparator 58 is initially clear. The master drum is now at the home position, and the system awaits the interruption of the light beam from source 14a (FIG. 1) to photocell 14b by a workpiece 12. When this occurs the PSP signal so generated passes via "and" circuit G20 and "or" circuit B20 to step drive 24 (FIG. 2a), causing master drum 20 to step to the first program slot.

When the first program slot is under the reading heads RH, reading head RH8 senses a point-to-point control pulse that is fed via "and" circuits G23j, the PPD1 signal line and the "or" circuit B22 to set flip-flop FF2 which starts generating the PPC1 signal (FIG. 2c). The PPC1 signal is fed to amplifier A30 which energizes the relay PPRL (FIG. 4) whose contacts connect the lines 57a and 57b to the outputs of amplifiers A31 and A32. At the same time, read heads RH3 to RH6 transmit via "and" circuits G23e to G23h, "or" circuits B23a to B23d and lines X1A to X1D a coded combination of signals representing the radial coordinate of the point B (FIG. 1) to comparator 58 (FIGS. 4 and 6). Concurrently, the position encoder 56 transmits a coded combination of SP1A to SP1D signals to comparator 58 representing the radial coordinate for the position A, the last position in which arm 10 was left. The PPD1 signal sets flip-flop FF2 (FIG. 2c) and the PPC1 signal performs the initial sampling of "and" circuits G59 to G63 (FIG. 6), resulting in the fact, say, that the actual coordinate is less than the final coordinate, causing the flip-flop FF52 to set and the flip-flops FF51 and FF53 to remain unset. The coincidence of the XS1 and SX1' signals at "and" circuit G31 activates amplifier A32, causing current to flow through coil 54e from line 57a to 57b, which results in the moving of piston 50a to the right, as heretofore described. Mechanical arm 10 starts moving radially and the coded combinations of signals SP1A to SP1D change digitally. Sampling of the "and" circuits G59 to G63 (FIG. 6) is now performed by the SPK1 pulses. Finally, the actual and desired final coordinates are equal and the "and" circuit G63 transmits a pulse which sets flip-flop FF53 which generates the MEP1 signal. The MEP1 signal is fed via delay line D52 and "or" circuit B56 to the reset inputs of flip-flops FF51 and FF53. Flip-flop FF52 unsets, deenergizing amplifier A32, ending the radial drive of mechanical arm 10. Just before flip-flop FF53 is unset, the MEP1 unsets flip-flop FF2 (FIG. 2c). Since this was the only control flip-flop that had been set, its unsetting causes the signal generated by its "0" output terminal to pass through "and" circuit G24 and "or" circuit B291 to trigger one shot multivibrator MV which generates an OPS pulse that is fed via "or" circuit B20 (FIG. 2a) and amplifier A26 which energizes step drive 24 to move master drum 20 to the next slot.

It will be recalled that the next program slot merely contained a pulse for closing the jaws 10a. Consequently, the read head RH1 transmits a BSD pulse that is fed to jaw control 10b (FIG. 3) causing the setting of the flip-flop FF7 therein which energizes solenoid L1 whose armature closes the jaws 10a. The BSD pulse is also fed to an input of "or" circuit B20 (FIG. 2a) and the master drum 20 is stepped to the next program slot in the usual manner.

The next program step, it will be recalled, is the complex motion from point B to point C which involves the continuous control of both the radial and sweeping motion, and the point-to-point control of the swivel motion. Accordingly at this program slot the reading heads RH15 to RH18 transmit the coded combination of X3A to X3D signals representing the final position of the swivel motion to the swivel control 10d which is similar to the radial control 10c shown in FIG. 4. In addition, the read head RH19 reads out a point-to-point control signal that is fed as the PPD3 signal to set flip-flop FF5 (FIG. 2c) which generates the PPC3 signal that activates swivel control 10d in the same way that a PPC1 signal activates radial control 10c. At the same time, read heads RH7 and RH13 transmit continuous path control signals that are fed via the CPD1 and CPD2 signal lines respectively, to set the flip-flops FF1 and FF3 which start transmitting the CPC1 and CPC2 signals. The CPC1 signal is fed to amplifier A33 (FIG. 4) to activate the continuous path control apparatus of radial control 10c as hereinbefore described. The CPC2 signal is fed to an equivalent amplifier of rotational control 10e to activate equivalent control apparatus. The CPC1 signal sets flip-flop FF30 via "or" circuit B32 causing motor 73 to rotate the disc 72. By corresponding circuits the CPC2 signal causes synchronous drive of another disc. The magnetic contours recorded on the discs 72 are read and control the radial and sweeping movements of mechanical arm 10 as described above. When the end of the contour for the radial motion is reached, magnetic head 96 reads a pulse which is transmitted by the amplifier A35 as the ECP1 pulse. The disc and associated circuitry of the rotational control 10e will also generate an ECP2 pulse when the end of the contour for the sweeping motion is reached. The ECP1 pulse is fed via "or" circuit B22 to set flip-flop FF2 (FIG. 2c) and via delay line D1 to unset flip-flop FF1 after flip-flop FF2 sets. The ECP2 pulse in a similar manner sets flip-flop FF4 and unsets flip-flop FF3.

When flip-flop FF1 unsets, the CPC1 signal terminates and the continuous path control of the radial motion of mechanical arm 10 ceases. However, radial control of the mechanical arm 10 for the program step is not complete since flip-flop FF2 is set initiating point-to-point control which is used to precisely "Zero" the radial position of the arm 10 at the point C. Similarly, continuous-path control is followed automatically by point-to-point control for the rotational actuator 10e by virtue of the setting of flip-flop FF4 and the unsetting of flip-flop FF3.

It should be noted that when the flip-flop FF1 is unset, it generates the CPC1' signal, and when the flip-flop FF3 is unset, it generates the CPC2' signal. Signal CPC1' fed to "or" circuit B33 (FIG. 4) unsets flip-flop FF30 ending rotation of disc 72. Signal CPC2' similarly ends rotation of its disc corresponding to disc 72.

Since flip-flop FF2 is set, the PPC1 signal is generated and fed to amplifier A30 to activate point-to-point control of radial movement in the same manner as was described for the radial movement from point A to point B. In particular the X1A to X1D signals from read heads RH3 to RH6 are compared with the SP1A to SP1D signals from position encoder 56 by comparator 58 (FIG. 4) to drive torque motor 54 via amplifiers A31 and A32 which controls the hydraulic servo including master valve 52 and slave actuator 50. When equality is reached, comparator 58 generates an MEP1 signal. At the same time, a similar action is occurring in rotational control 10e resulting in the generation of the MEP2 signal.

The MEP1 signal unsets flip-flop FF2 and the MEP2 signal unsets flip-flop FF4. The MEP3 signal from swivel control 10f also unsets flip-flop FF5. Generally the flip-flops will not simultaneously unset. However, when the last unsets, a signal passes via "and" circuit G24 and "or" circuit B291 to trigger monostable multivibrator MV which generates an OPS pulse. The OPS pulse when received at "or" circuit B20 (FIG. 2a) causes the stepping of master drum 20 by step drive 24 in the usual manner.

The next program step merely calls for the opening of jaws 10a. Accordingly read head RH1 transmits a BSD signal that passes through "and" gate G21a (FIG. 3) and "or" circuit B25 to unset flip-flop FF7, deenergizing solenoid L1. The BSD signal is also fed via "or" circuit B20 causing the stepping of the master drum 20 in the usual manner.

The next program slot becomes available and will cause a radial retraction of mechanical arm 10 to the point D. Since this operation is similar to the program step for moving the mechanical arm 10 from point A to point B (a point-to-point control of radial movement) it will not be described.

The next program step is concerned with energizing the spraying operation. Therefore, read head RH2 (FIG. 2a) transmits an XOP signal which set flip-flop FF6 (FIG. 2c). Flip-flop FF6 starts generating the XOPC signal which is fed to the spraying control 15c (FIG. 1). At the end of the spraying operation, spraying control 15c returns an EXOP signal that terminates the XOPC signal by unsetting flip-flop FF6. When flip-flop FF6 unsets "and" circuit G24 passes a signal, since none of the flip-flops FF1 to FF5 is set. The signal triggers one shot multivibrator MV which generates the OPS signal fed to "or" circuits B20. Master drum 20 is thereafter stepped in the usual manner.

The remaining program steps are similar to the above-described program steps, and will not be described for the sake of brevity. At the end of the last program step, the mechanical arm 10 is at point A and the program slot containing the end-of-program signal opposite the reading heads RH.

At this point is should be noted that mechanical arm 10 is locked at position A awaiting the start of a new cycle because none of the sequence flip-flops FF1 to FF6 (FIG. 2c) are set and will not set until the first program slot after the "home" program slot is again reached. It will be recalled that the read heads RH are opposite a program slot only containing the end-of-program signal RSD. It should also be noted that all program slots which will move past the read heads RH when the master drum steps from this program slot to the home program slot had been erased, and the home program slot only contains "home" pulse. Therefore, master drum 20 cannot set any of the sequence flip-flops FF1 to FF6'. It should also be noted that master drum 20 was stepped from the program slot directing the mechanical arm 10 to the program slot containing the end-of-program pulse by virtue of an OPS signal generated by one shot multivibrator MV (FIG. 2c) when the last of the sequence flip-flops was unset in the usual manner. Although the discs 72 are at rest where heads such as head 96 (FIG. 4) had read ECP1 signals, these signals are no longer present, at least by virtue of the effect of differentiating capacitors such as capacitor C7. Accordingly, flip-flops FF2 and FF4 (FIG. 2c) cannot be set.

When the RSD end-of-program signal is read by read head RHE (FIG. 2a) it is fed via "and" circuit G23a, "or" circuit B19 and capacitor C9 to set flip-flop FF8. The HPD signal so generated causes master drum 20 to step to the home position. When the PSP signal from photocell 146 (FIG. 1) is received at "and" circuit G20, the new cycle proceeds as previously described.

It should be noted that the flip-flop FF8' is only employed during the first cycle of operation following the teach mode to set flip-flop FF8 and to prevent spurious setting of the sequence flip-flops. During the remaining cycles, the RSD signal controls the setting of flip-flop FF8 and the absence of indicia in the program slots which move past the read heads RH insures no spurious setting of the sequence flip-flops.

The system, up to this point, has been described that for any modification in the sequence of operation the apparatus is "retaught" the entire program. However, it is possible that only particular point-to-point control steps in the entire program need be changed. For example, it may be that the work-pieces 12 are to be supplied from a differently oriented conveyor 14 and/or delivered to a differently oriented conveyor 16. In the first case the coordinates of point B would be different; and in the second case the coordinates of the point E would be different. To provide for such a possibility, the system includes apparatus for performing a modify mode of operation.

Generally, in a normal operate mode, as heretofore described, a program slot preceding program steps that are contemplated to be modified, includes an instruction which switches program control from master control 11 to an auxiliary control which includes a memory having usable program slots in which are recorded the program steps that are contemplated to be altered. These program slots direct the system through the program steps which may be modified. After these steps have been performed, control is switched back to master control 11 which directs the system through the remainder of the "fixed" program. Therefore, whenever the contemplated program steps are to be modified, it is only necessary to use the program steps recorded in the program slots of the auxiliary control memory and record the new program steps therein.

The apparatus required to perform these functions will first be described, followed by a description of functions of the apparatus integrated into the cycles of operation of the system. The apparatus is primarily included in FIG. 7 with minor additions to the other elements of the system as is hereinafter described.

The auxiliary control in FIGS. 7a, 7b, 7c and 7d is used to control the mechanical arm 10 through the modifiable steps of its sequence of operation. These modifiable program steps are stored in a memory and are sequentially read and used to direct subordinate controls to perform desired operations. The auxiliary memory in FIG. 7a includes a magnetic auxiliary drum A20 similar to master drum 20 of FIG. 2a. Auxiliary drum A20 includes point-to-point instruction recordings and recordings for special functions. Reading heads R similar to reading heads RH of FIG. 2a, are disposed opposite tracks of auxiliary drum A20 for reading recordings thereon. Another series of heads, writing heads W, are disposed opposite all but the left-most track of the magnetic drum A20. The read heads R and the write heads W may include conventional signal amplifiers if required.

The tracks are divided in the following manner. The track opposite the reading head RHP has permanently recorded thereon a single magnetic spot which when sensed results in the generation of an AFMD signal to indicate a home position for the auxiliary drum A20. The track opposite the reading head RE contains recordings of EBR pulses which will indicate when control is to be returned to master drum 20 from the auxiliary control.

The tracks opposite the reading heads R1 to R5 inclusive form a band ADOF1 of tracks associated with the radial actuator 10c. The four tracks opposite reading heads R1 to R4 inclusive are provided to store digitally (in binary form or in Gray code, for example) the coded representation of a coordinate to which the mechanical arm 10 is to move radially. The coded combination of spots causes the generation of coded combinations of AX1A to AX1D signals by the read heads R1 to R4. The track opposite the reading head R5 has recorded thereon point-to-point control signals APPD1 to indicate that whenever such a signal is read, the radial movement to be performed by actuator 10c is directly to a given point indicated by the coordinate represented by the then present signals AX1A to AX1D. The next band of tracks, i.e., tracks associated with reading heads R6 to R10 inclusive is channel ADOF2 which is similar to channel ADOF1 and is associated with sweep actuator 10e. The third band of tracks or channel ADOF3 is similar to the other bands except that it is associated with swivel actuator 10d.

The auxiliary drum A20 is connected via shaft A22 to step device A24 which is similar to step drive A20 of FIG. 2a. Step drive A24, when energized, will cause the auxiliary drum A20 to step to the next slot. If the step drive A24 is continuously energized, the auxiliary drum A20 will rotate, step-by-step, until the energization is terminated. If, however, the step drive A24 is energized by a pulse, the auxiliary drum A20 will be only driven to the next step. Step drive A24 is energized via amplifier A26 which receives signals from the "or" circuit B70.

The first input to "or" circuit B70 is the AMSD signal line connected to the output of "and" circuit G78 having one input connected to the MS signal line, i.e., the output of step switch SSW (FIG. 2a) and a second input connected to the TCHA signal line, i.e., the "1" output of flip-flop FFA9. Whenever information is to be recorded in program slots of auxiliary drum A20, flip-flop FFA9 will be set and the TCHA signal will permit MS pulses to pass through "and" circuit G78 to become AMSD pulses. Flip-flop FFA9 has its set input connected to the output of "or" circuit B72 which has a first input connected to the RBR signal line and its second input connected to the output of "and" circuit G73. The inputs to "and" circuit G73 are the BR and CHA signal lines respectively. The reset input of flip-flop FFA9 is the REBR signal line connected via switches SW2 and EBSW to voltage source B3. The flip-flop FFA9 generally controls onto which of the drums control information is to be recorded.

The second and third inputs of "or" circuit B70 are the AOPS and AERSP signal lines. The fourth input is connected to switch EBSW. The last input of "or" circuit B70 is the AHPD signal line connected to the "1" output of flip-flop FFA8. Flip-flop FFA8 generally controls the stepping of the auxiliary drum A20 to its home position. The set input of flip-flop FFA8 is connected to the output of "or" circuit B77 having one input connected to the output of "and" circuit G79a and its other input to the output of "and" circuit G79d. Each of these "and" circuits has an input connected to the RCYD signal line. It will be recalled that this signal is employed to initiate stepping the drums back to the home position. During all routines except a pallet loading routine as is hereinafter described, the PL' inhibiting signal is absent and "and" circuit G79d passes the RCYD pulses. During pallet loading routines "and" circuit G79a must be employed. The second input to "and" circuit G79a is the output of "or" circuit B76 having inputs connected to switch ASW and the read head RA. The roles of these two inputs is described along with the operation of a pallet loading routine. Flip-flop FFA10 has a set input connected to the output of read head RA and its reset input connected to the AFMD signal line.

The flip-flop FFA10 has its "0" output connected to one input of "and" circuit G79c whose other input is the PL signal line. The output of "and" circuit G79c supplies pseudo-home position signals to one input of "or" circuit B76 during a pallet-loading routine. The AFMD signal line feeds the second input of "or" circuit B76 whose output transmits FMDA signals to "and" circuit G20 (FIG. 2a) to permit recycling of the system during any type of workpiece transfer routine.

Included in the auxiliary control is a modify switch CHSW (FIG. 7b). Switch CHSW is of the double-pole, single-throw type. The ganged moving contacts K1 and K2 are respectively connected to opposite terminals of a voltage source B4. The fixed contact F1 is connected via resistor R8 to the same terminal as moving contact K2; and fixed contact F2 is connected via resistor R9 to the same terminal as moving contact K1. The circuitry merely provides two signals which interchange polarity as the switch is opened and closed. When the switch is closed, it generates the CHA signal which alerts the system during the "operate" mode of that portion of the program to be modified. The function of the CHA signal is hereinafter more fully described. The switch PS is identical to switch CHSW and is used for pallet loading routines.

The circuits feeding the write heads W (FIG. 7a) will now be described. Each of the write heads W is connected to a movable contact of a single-pole, double-throw relay contact set AEWRC of relay AEWRL (FIG. 7d). All the left-hand contacts AEWRCN, as shown in FIG. 7a (i.e., the normally open contacts), are connected to a high-frequency erase source AHFE. When relay AEWRL is energized, the movable contacts engage the respective left-hand contacts and erase current is fed to all the write heads W. When new information is to be recorded, relay AEWRL is not energized and the movable contacts engage the right-hand fixed contacts.

In particular, the write head WE associated with the track restoring transfer of control back to master control signals is connected via the REBR signal line to the switch EBSW.

The write heads W1 to W4 inclusive are respectively connected via normally closed contacts AEWRCC of relay AEWRL to outputs of "and" circuits G74a to G74d inclusive, whose first inputs are connected to the AMSD signal line and whose second inputs are respectively connected to the SP1A to SP1D signal lines. It will be recalled that the SP1A to SP1D signals are a binary coded representation of the actual radial coordinates of the mechanical arm 10 at every instant of time. The write head W5 is connected to the output of "and" circuit G74e whose first input is connected to the AMSD signal line and whose second input is connected to the fixed contact 2 of the ATCSW1 switch. Said contact 2 is connected via "hold down" resistor R10 to ground. When a point-to-point control pulse is to be recorded, the moving contact is connected to fixed contact 2 of switch ATCSW1 which also generates the APP1 signal in addition to causing the recording of a point-to-point control pulse. The moving contact of switch ATCSW1 is connected to the negative terminal of voltage source B11.

The circuitry including the contact sets of the erase-write relay contacts EWRC associated with the write heads W1 to W5, the "and" circuits G74a and G74e, and the switch ATCSW1 comprise the auxiliary access unit AAU1 for the first degree of freedom, that is, for the radial movement of the mechanical arm 10. Auxiliary access unit AAU2 associated with the second degree of freedom (sweep movement of the mechanical arm 10) includes similar circuitry as does the auxiliary access unit AAU3 of the third digitally controlled degree of freedom.

The next major element of auxiliary control unit centers around the circuitry feeding the conventional one-shot multivibrator AMV (FIG. 7c) which when triggered transmits an auxiliary drum-indexing pulse via the AOPS line. This pulse is used to energize the step drive A24 upon completion of a program step generally during the operate mode. The input of the one-shot multivibrator AMV is "or" circuit B71 having one input connected to the output of "and" circuit G71 which transmits a signal at the end of each program step involving the auxiliary drum A20 during the operate mode. The second and third inputs to "or" gate B71 are the AERSO signal line and the BR signal line via differentiating capacitor AC8.

The inputs to the "and" circuit G71 are from the "0" outputs of the flip-flops FFA1 to FFA3 inclusive. Accordingly, the "and" circuit G71 will only transmit a signal after the last of these flip-flops has been unset during the operate mode for insuring that the auxiliary drum advances, and a new program step is read from the auxiliary drum A20, only after all the different types of control operations have been performed for the previous program step. The flip-flop FFA1 is concerned with a point-to-point control of the first degree of freedom. Flip-flop FFA1 is set by a signal from gate G70a by a signal on the APPD1 signal line at one input of "and" gate G70a when the TCHA' signal is not present in the second input of "and" circuit G70a; and unset by the MEP1 signal. The flip-flop FFA2, concerned with the second degree of freedom, is set by a signal from the output of "and" circuit G70b when it receives an APPD2 signal during the absence of the inhibiting TCHA' signal; and is unset by the MEP2 signal. The flip-flop FFA3 associated with the third degree of freedom is set by a signal from the output of "and" circuit G70c which receives the APPD3 signal; and is unset by the MEP3 signal.

The circuitry of FIG. 7d is similar to the circuitry of FIG. 2d and controls erase-write relay AEWRL. The circuitry will be further described when the operation of this aspect of the system is related.

There are three modes of operation to be considered for the auxiliary control: teach, operate and modify. Each will be considered in detail with appropriate references being made to the heretofore discussed apparatus and operations. For the sake of concreteness, it may be assumed that the setup man knows that during a production run the first group of the workpieces are to be available at a point B (FIG. 1) and that the next group are to be available at a point B' (not shown) to the left of point B. The setup man can first teach the system in the routine previously described for the first part of the run; when this part of the run is finished, teach a new routine which is almost the same as the first routine, the only difference being the point-to-point control for the path AB' and the continuous path control for the path B'C; and when this part of the run is finished reteach it the first routine. Obviously, such an approach is inefficient.

Instead, the setup man will use the auxiliary control to handle the modifiable portions of the program. In particular, the setup man will initially record in the first program slot of the main drum 20 (FIG. 2a) a transfer-of-control pulse which when read transfers control to the auxiliary control. In the first program slot of auxiliary drum A20 he records point-to-point control indicia directing the jaws 10a to point B. In the second program slot of the auxiliary drum A20 he records a transfer-of-control pulse which when read transfers control back to the main control. The remainder of the teach mode is identical with that previously described. When the second portion of the run is to take place, i.e., that portion wherein the workpiece availability point is point B', the setup man need only: "erase" the program slots of auxiliary drum A20; record in the first program slot of auxiliary drum A20 point-to-point control indicia directing jaws 10a to point B'; record in the second program slot of auxiliary drum A20 point-to-point control indicia directing the jaws 10a to point B; and record in the third program slot of auxiliary drum A20 a transfer of control pulse which when read transfers control back to the main control. This is a modify mode. When this portion of the run is finished, the setup man again "erases" auxiliary drum A20; records point-to-point control indicia in the first program slot of auxiliary drum A20; and records the transfer of control pulse in the second program slot of auxiliary drum A20. This is also a modify mode. By a modify mode is meant the changing of only a portion of the entire program.

Several observations should be made at this point. Although during the first modify mode additional motion has been introduced, i.e., paths AB', B'B, BC, etc., instead of the more direct motion AB', B'C, etc., it should be noted that the path from points B' to B to point C are complex and more difficult to teach than a pure point-to-point path. Hence, if the intermediate portion of the production run is relatively small such a procedure is more practical. Furthermore, where point-to-point paths bracket a point-to-point path it is only necessary to modify the control indicia for the bracketed point-to-point path and no additional motion is introduced.

Returning to the above discussion, the operation of the apparatus for the proposed example will now be described. Initially new discs are placed on the drive shafts such as drive shaft 73a (FIG. 4) by the setup man. The teach-operate switch TOSW (FIG. 2b) is adjusted to the teach position and the erase-write switch EWSW (FIG. 2d) is momentarily closed. The EWSWO signal passes through "and" circuit G203 (the inhibiting CHA' signal is not present) to set flip-flop FF10 and unset flip-flop FF9. The ERSP signal generated by flip-flop FF10 energizes erase-write relay EWRL and is fed via "or" circuit B20 to energize step drive 24 (FIG. 2a) as long as it is present. The contacts EWRCN connect the write heads WH to the source of erase current HFE and the contacts EWRC3 operate to record the "home" pulse on discs 72 (FIG. 4) as previously described. When master drum 20 (FIG. 2a) reaches the home position the FMD pulse is read by read head RHO and transmitted to the erase-write control where it sets flip-flop FF9. When master drum 20 again reaches the "home" program slot, the FMD pulse is again generated and is transmitted to the erase-write control to unset flip-flop FF9 which unsets flip-flop FF10. Accordingly, the ERSP signal terminates ending continuous stepping by stepdrive 24 and erase-write relay EWRL is deenergized ending the erase operation on master drum 20. The "0" output of flip-flop FF10 (FIG. 2d) transmits an ERSO pulse signal via capacitor C1 and "or" circuit B291 (FIG. 2c) to trigger one-shot multivibrator MV which generates an OPS pulse. The OPS pulse passes through "or" circuit B20 (FIG. 2a) causing step drive 24 to move master drum 20 to the first operative program slot.

At the same time the EWSWO pulse from switch EWSW passes through "or" circuit B73 (FIG. 7d) to set flip-flop FFA5 and unset flip-flop FFA4. The "1" output of flip-flop FFA5 starts generating the AERSP signal which energizes erase-write relay AEWRL and which is fed via "or" circuit B70 and amplifier A26 to step drive A24. Auxiliary drum A20 starts rotating while the contacts AEWRCN connect the write heads W to source of erase current AHFE. When auxiliary drum A20 reaches its home position the AFMD pulse is transmitted by read head RHP (FIG. 7a). The AFMD pulse sets flip-flop FFA4. The auxiliary drum A20 continues to step and when the home position is reached a second time the AFMD pulse unsets flip-flop FFA4 which unsets flip-flop FFA5. The AERSP signal terminates ending the continuous stepping action of step drive A24, the relay AEWRL is deenergized ending the erase operation and an AERSO pulse is transmitted via differentiating capacitor AC1 and "or" circuit B71 (FIG. 7c) to trigger one shot multivibrator AMV which generates an AOPS pulse. The AOPS pulse is fed via "or" circuit B20 to step drive A24 causing auxiliary drum A20 to step to the first slot past the home slot.

At this point all the program slots of master drum 20 and auxiliary drum A20 have been erased, both drums are at rest at their first program slots after the "home" slot, and a "home" pulse has been recorded on each of the discs 72.

The setup man closes the transfer-of-control switch BRSW (FIG. 2a), momentarily closes the step switch SSW and opens the switch BRSW. The MS pulse generated by switch SSW passes through "and" circuit G279 to become the MSD pulse which passes through switch BRSW to become the RBR signal that is recorded by write head WHB in the first program slot of master drum 20. The RBR signal passing via "or" circuit B72 (FIG. 7a) sets flip-flop FFA9 which starts generating the TCHA signal alerting "and" circuit G78 to pass MS pulses, and an inhibiting signal on the TCHA' signal line which prevents "and" circuit G279 from passing MS pulses. The pulse also passes via "or" circuit B20 to step drive 24 and main drum 20 steps to the next program slot. It should be noted that when flip-flop FFA9 was set, access to master drum 20 was blocked and access to auxiliary drum A20 was opened.

The setup man positions the type of control switches such as ATCSW1 (FIG. 7a) to position 2, and then by means of controls (such as manual control 59, FIG. 4, for the first degree of freedom) moves jaws 10a to position B (FIG. 1). When he is satisfied with the positioning in all degrees of freedom, he momentarily depresses step switch SSW (FIG. 2a) which generates the MS pulse. The MS pulse passes through "and" circuit G78 (FIG. 7a) to become the AMSD pulse that is fed to inputs of "and" circuits G74 to gate the SP1, SP2 and SP3 signals representing digitally the actual coordinates of mechanical arm 10 to the write heads W for recording in the first program slot of auxiliary drum A20. The APP1 signal at "and" circuit G74e gates the AMSD pulse into write head W5 for recording as a point-to-point control pulse. The AMSD pulse is also fed via "or" circuit B70 to step drive A24 to step auxiliary drum A20 to the second program slot.

The setup man then depresses the switch EBSW (FIG. 7a) causing the generation of the REBR signal which is recorded by write head WE for later indicating a return of control to master drum 20. The REBR signal through normally closed switch SW2 unsets flip-flop FFA9 terminating the TCHA signal and the inhibiting signal on line TCHA'. Access is again opened to master drum 20 and closed to auxiliary drum A20. The remainder of the program is carried out and it is recorded on the master drum 20, as previously described.

It will be recalled that the last manipulation performed by the setup man during the teach mode is the depression of the RSW switch (FIG. 2a) which causes the recording of the end of program slot on the master drum 20 and the setting of flip-flop FF8'. Flip-flop FF8' starts generating the IH' inhibiting signal. The write heads of master drum 20 are opposite the program slot containing the end of program control spot and none of the flip-flops FF1 to FF6' (FIG. 2c) are set. The write heads W of auxiliary drum A20 are at an empty program slot, and none of the flip-flops FFA1 to FFA3 are set. Therefore, no movement is possible for mechanical arm 10 when the setup man moves the teach-operate switch TOSW (FIG. 2b) to the operate position. It should be noted that in spite of the fact that the OPR signal is now present at an input to "and" circuit G23 (FIG. 2a) the inhibiting signal IH' from flip-flop FF8' still blocks "and" circuit G23 and the "and" circuit G23a to G23u remains blocked, and the inhibiting signal IH' still blocks "and" circuit G75 (FIG. 7a) and the "and" circuits G76a to G76o remain blocked. Accordingly, none of the flip-flops FF1 to FF6' or FFA1 to FFA3 are set or can be set until the IH' terminates and no control signals are generated which can activate relays such as relays PPRL and CPRL (FIG. 4) which control current flow in torque motor 54.

When the flip-flop FF8' (FIG. 2a) set, it generated the RCYD pulse for setting flip-flops FF8 (FIG. 2a) and FFA8 (FIG. 7a) which respectively generates the HPD and AHPD signals. The HPD signal is fed via "and" circuit B20 to step drive 24 which starts continuous stepping of master drum 20 (FIG. 2a); and the AHPD signal is fed via "and" circuit B70 to step drive A24 (FIG. 7a) which starts continuous stepping of auxiliary drum A20. The HPD signal also sets flip-flop FF30 (FIG. 4) which moves discs 72 to their home position. As each disc reaches its home position it generates an FMC1 or FMC2 signal which unsets its associated flip-flop FF30 and which is fed to an input of "and" circuit G230 (FIG. 2a). When all are generated, "and" circuit G230 transmits an FMC signal. When the auxiliary drum A20 reaches its "home" slot, read head RHP (FIG. 7a) generates an AFMD signal that unsets flip-flop FFA8 and step drive A24 is deenergized. Auxiliary drum A20 stops with its otherwise blank "home" slot opposite the read heads R. The AFMD signal is also fed via "or" circuit B76 to become the FMDA signal that is fed to an input of "and" circuit G20 (FIG. 2a). When the master drum 20 reaches its "home" slot, read head RHO generates an FMD signal which: cooperates with the AFDM signal from "or" circuit B19' at "and" circuit G5 to unset flip-flop FF8' which opens "and" circuits G75 (FIG. 7a) and G23 (FIG. 2a); unsets flip-flop FF8 terminating the HPD and the operation of step drive 24; and is fed to an input of "and" circuit G20 which can now transmit an ADS signal when a PSP signal is received from photocell (FIG. 1). At that time, the ADS signal is fed via "or" circuit B20 to step drive 24 for stepping master drum 20 to the first program slot after the "home" slot. When master drum 20 steps off the "home" slot, the FMD signal terminates.

At this time the read heads R of auxiliary drum 20 are opposite the "home" slot. Even if they were opposite a slot containing control information, "and" circuits G76 (FIG. 7a) are blocked because no BR signal is present at an input to "and" circuit G75. Discs 72 (FIG. 4) are at their home position. Master drum 20 (FIG. 2a) is opposite the first program slot after the "home" slot and "and" circuits G23 are open, since the OPR signal is present and the inhibition on the IH' and BR' inputs to "and" circuit G23 are absent.

It will be recalled that the first program slot of master drum 20 contained only a transfer of control pulse which is now transferred to read head RHB via "and" circuit G23b to the BRD signal line. The BRD signal sets flip-flop FF6' (FIG. 2c) which generates the BR signal and an inhibiting signal on the BR' signal line. The inhibiting signal BR' now blocks "and" circuit G23 (FIG. 2a). The BR signal fed to "and" circuit G75 opens "and" circuits G76 (FIG. 7a). The BR signal also passes, via differentiating capacitor AC8, "or" circuit B71 to trigger one shot multivibrator AMV (FIG. 7c) which generates an AOPS pulse that is fed via "or" circuit B70 to step drive A24. Auxiliary drum A20 steps to its first program slot.

It will be recalled that the first program slot contained the coordinates of the point B and a point-to-point control pulse. The point-to-point control pulse is read by read head R5 and passes via the "and" circuit G76f as the APPD1 signal which is fed to circuit G70a (FIG. 7c) to set flip-flop FFA1. This causes signal APPC1 to be generated, and it passes via "or" circuit B50 to amplifier A30 (FIG. 4) for energizing the PPRL relay and is fed to comparator 58 to render it operative. Read heads R1 to R4 read the coded combination of pulses representing the coordinate and feed them via the "and" circuits G76b to G76e, respectively (FIG. 7a), the signal lines AX1A to AX1D, respectively, the "or" circuits B23a to B23d, respectively, and the lines X1A to X1D (FIG. 2a) respectively to the comparator 58. Comparator 58 operates in the previously described manner to move mechanical arm 10a to the point B and to generate the MEP1 pulse upon its arrival.

The MEP1 signal unsets flip-flop FFA1, accordingly, causing "and" circuit G71 to pass a signal for triggering one shot multivibrator AMV which generates the AOPS pulse that passes via "or" circuit B70, causing step drive A24 to step auxiliary drum A20 to the second program slot.

The second program slot of auxiliary drum A20 contains only a return of control pulse which is read by read head RE and passes via the "and" circuit G76a to the EBR signal line (FIG. 7a). The EBR signal passes via "or" circuit B23 to unset flip-flop FF6' (FIG. 2c). The termination of the BR signal blocks "and" circuit G75 (FIG. 7a) and all control by auxiliary drum A20 ends. The termination of the inhibiting signal on line BR' alerts "and" circuit G23 (FIG. 2a) and master drum 20 resumes control.

When flip-flop FF6' unsets it transmits a signal via "and" circuit G24 and "or" circuit B291 (FIG. 2c) which triggers one-shot multivibrator MV to generate the OPS signal. The OPS pulse performs its usual functions and the program proceeds as heretofore described until the program slot on the master drum 20 containing the end pulse is reached.

This pulse is read by read head RHE (FIG. 2a) and the RSD signal passes via "and" circuit G23a, "or" circuit B19 and differentiating capacitor C9 to become the RCYD which initiates a new cycle.

When the program is to be modified, the setup man merely closes the switch CHSW (FIG. 7b) which generates the CHA signal that is fed to an input of "and" circuit G73 (FIG. 7a). The next time the apparatus reaches the first program slot of the master drum 20 which results in the generation of the BR signal characteristic of transfer of control to auxiliary drum A20, flip-flop FFA9 is set by the cooperation of the BR and CHA signals at "and" circuit G73. After this, the setup man can open switch CHSW. The TCHA signal generated by flip-flop FFA9 alerts "and" circuit G78 (FIG. 7a) and cooperates with the OPR signal at "and" circuit G79 (FIG. 7d) to initiate the above-described erase routine for auxiliary drum A20. The inhibiting signal now on the TCHA' signal line blocks "and" circuits G70 to prevent the spurious setting of flip-flops FFA1 to FFA3 (FIG. 7c). This inhibiting signal also blocks "and" circuit G279 (FIG. 2a). Hence, any MS pulses generated by step switch SSW are operative in the circuitry associated with auxiliary drum A20.

At this point the read heads RH of the master drum 20 are opposite the first program slot. Flip-flop FF6' is set and generating the BR signal. The auxiliary drum A20 has been completely erased and its write heads W are opposite the first program slot. Flip-flop FFA9 is set and generating the TCHA signal.

The setup man positions the mechanical arm 10 to the point B', adjusts the switch ATCSW1 (FIG. 7a) to position 2 and momentarily depresses the step switch SSW (FIG. 2a). The MS pulse so generated passes through "and" circuit G78 as the AMSD to inputs of "and" circuits G74. The coded combination of SP1A to SP1D, etc. signals representing the coordinates and that APP1 signal indication point-to-point control pass through the "and" circuits G74 and are recorded by the write heads W. The AMSD pulse steps the auxiliary drum A20 in the usual manner. The setup man then records the point-to-point control to point B (FIG. 1) as previously described and the auxiliary drum A20 steps to the third program slot in the usual manner.

In the third program slot the setup man records the return of control to the master drum pulse by momentarily closing the EBSW switch (FIG. 7a). The REBR signal so generated is recorded by write head WE. The REBR signal also unsets flip-flop FFA9 and is fed via "or" circuit B23 (FIG. 2c) to unset flip-flop FF6'. Control is now in master drub 20 and the remainder of the cycle is automatically stepped through in the usual manner. Henceforth, mechanical arm 10 will go to point B' to obtain workpieces 12.

At any later time the program can again be modified by following the above-described procedure.

In addition to the example given above the semi-permanent pattern of motions can be motions involved in the loading or unloading of a series of articles on a pallet at regularly spaced, standardized positions, while the other portion of the program, controlling what is done with each article, may be changed frequently.

For example, assume that the conveyor belt 16 is replaced by the pallet 16' illustrated in FIG. 1a. The position of the pallet 16' is shown with respect to the same point E as in the previous program. Also, the standardized positions on the pallet are shown by points XY. The semi-permanent pattern of motions will be motions for a point such as point E to the points XY respectively.

The frequently changed program will be the pattern controlling motions via points such as points A, B, C, D and E.

The heretofore described apparatus can perform the desired programs when minor additional elements are added which will be pointed out in connection with the description of the various modes of operation of this feature of the invention.

Consider first the teach mode. This is exactly the same as the previously described teach modes until after the program slot on master drum 20 which directed the jaw 10a to point E is reached. Accordingly this portion of the program will not be described again in detail. It should be recalled that successive program slots of master drum 20 have been recorded with control spots directing point-to-point control from point A to point B; jaw control at point B; continuous control from point B to point C; jaw control at point C; point-to-point control from point C to point D; spraying control; point-to-point control from point D to point C; and continuous control from point C to point E. Now instead of recording the jaw control at point E, the setup man opens normally closed switch SW2 (FIG. 7a), breaking the path from switch EBSW to the REBR signal line. He then momentarily depresses switch BRSW (FIG. 2a) and switch SSW causing the generation of an RBR signal which is recorded in the then available program slot of master drum 20 in the usual manner. The RBR signal is also fed via "or" circuit B72 to set flip-flop FFA9 opening access to auxiliary drum A20 and closing access to master drum 20. He now directs the jaws 10a in the usual manner to, say the point $X_1Y_1$ on pallet 16' and momentarily closes switch SSW (FIG. 2a). The coordinates, represented by signals SP1A, SP1B, etc. are recorded in the first program slot of auxiliary drum A20. He next momentarily closes the EBSW switch (FIG. 7a) causing the recording of a transfer of control back to master drum 20 control spot by write head WE, and causing the stepping of auxiliary drum A20 to its next program slot. It should be noted that since switch SW2 is open, no REBR signal is generated which would open access to master drum 20 and close access to auxiliary drum A20. The setup man now directs jaws 10a to, say point $X_1Y_2$ on pallet 16' and momentarily closes switch SSW (FIG. 2a). The coordinates of this point are recorded and auxiliary drum A20 steps to the next program slot. The setup man then again closes the switch EBSW to record another transfer-of-control spot. These sets of manipulations, i.e., positioning the jaws 10a, momentarily depressing the switch SSW and then momentarily depressing switch EBSW, are performed for each of the coordinates XY on pallet 16' except the last one. It should be noted that a pair of program slots is associated with each movement, one containing final coordinates and the other a transfer of control spot. For the last one, say $X_4Y_4$, the setup man positions the jaws to this point and momentarily depresses the switch SSW. The coordinates are recorded and the auxiliary drum A20 steps to the next program slot. Now the setup man returns switch SW2 (FIG. 2a) to its usually closed position; closes the usually open switch ASW and momentarily closes switch EBSW. Write head WE records control spots into the available program slot of auxiliary drum A20 for transferring control back to master drum 20, write head WA records the full-pallet control spot. The voltage from source B3 passes via switch ASW and "or" circuit B76 to one input of "and" circuit G79a alerting the latter to pass RCYD pulses when received from master control 11 (FIG. 2a). It should be noted for the pallet loading routine "and" circuit G79a has been interposed between the set input of flip-flop FFA8 and the RCYD signal line. For a non-pallet loading routine, as previously described, the RCYD signal is fed via "and" circuit G79d to the set input of flip-flop FFA8. Since switch SW2 is now closed, the REBR signal was generated when the switch EBSW was momentarily closed. Accordingly, flip-flop FFA9 (FIG. 7a) is unset, opening access to master drum 20 and closing access to auxiliary drum A20.

The setup man now momentarily closes switches BSW and SSW (FIG. 2a), causing the recording of a jaw open control spot in the available program slot of master drum 20, in the usual manner. He then directs the jaws 10a to the point A, depresses the switch SSW and the coordinates of point A are recorded. Finally, after the master drum 20 has stepped to the next available program slot, he depresses the switch RSW which causes the recording of the end of program spot and also sets flip-flop FF8' initiating the return of both drums to their home positions as previously described. It should be noted that the usual RCYD signal transferred via differentiating capacitor C9 (FIG. 2a) in response to the signal passed by "or" circuit B19 from flip-flop FF8' passes through alerted "and" circuit G79a (FIG. 7a). "And" circuit 79a was altered by a signal via "or" circuit B76 from closed switch ASW which the setup man now opens. The setup man switches the teach-operate switch TOSW (FIG. 2b) to the operate position, initiating the operate mode. He also closes the PS switch (FIG. 7a) which starts generating the PL signal and the PL' inhibiting signal characteristic of a pallet loading routine.

During the operate mode, the workpieces 12 are moved in the previously described manner until they reach point E. Point E is a "check point" or a "jumping off" point for pallet loading.

When the first workpiece reaches point E, the available program slot of the auxiliary drum A20 is the home slot and the available program slot of main drum 20 contains a control recording that transfers control to auxiliary drum A20. Accordingly, the BRD signal is transferred from read head RH1 (FIG. 2a) to set flip-flop FF6' (FIG. 2c) which generates the BR signal and the BR' inhibiting signal which blocks "and" circuits G23 (FIG. 2a). The BR signal is fed via differentiataing capacitor AC8, and "or" circuit B71 to trigger auxiliary multivibrator AMV which generates an AOPS pulse. This pulse passes through "or" circuit B70 to step auxiliary drum A20 to the first program slot which contains point-to-point control coordinates of point $X_1Y_1$. The BR signal is also fed to "and" circuit G75 (FIG. 7a) which opens "and" circuits G76. The contents of the first program slot of anxiliary drum A20 are read out and direct point-to-point movement of jaws 10a to point $X_1Y_1$ of pallet 16' in the usual manner. When the jaws 10a reach the point $X_1Y_1$, the equality signals MEP1 and MEP2 from comparators 58 are generated and are fed to the reset inputs of flip-flops FFA1 and FFA2 (FIG. 7c). Accordingly, an AOPS pulse is generated by multivibrator AMV. The AOPS pulse passes via "or" circuit B70 causing the stepping of auxiliary drum A20 to the next program slot. This slot only contains an EBR control spot which is fed via read head R1 (FIG. 7a), "and" circuit G76a, and "or" circuit B23 (FIG. 2c) to unset flip-flop FF6'. The disappearance of the BR signal blocks "and" circuit G75 (FIG. 7a), preventing further reading from auxiliary drum A20; and the disappearance of the BR' signal opens the "and" circuits G23 (FIG. 2a). Control is now in master drum 20. The control spot in the program slot of drum 20 in effect causes jaws 10a to open, depositing the workpiece 12 at point $X_1Y_1$. The next program slot directs the jaws 10a to move to point A, and the following program slot contains the end-of-program control spot. This spot results in the transmission of an RSD pulse from read head RHE (FIG. 2a) via "and" circuit G23a and "or" circuit B19 to differentiating capacitor C9. The output of capacitor C9 is the RCYD pulse which sets flip-flop FF8 (FIG. 2a) to cause master drum 20 to return to the home position. Heretofore, the RCYD pulse would also set flip-flop FFA8 (FIG. 7a) to step auxiliary drum A20 to the home position, however, this drum should only be stepped home when the last pallet space is loaded with a workpiece. The PL' inhibiting signal blocks "and" circuit G79d and there is no output from "or" circuit B76. Both "and" circuits G79a and G79d are blocked. Therefore, flip-flop FFA8 cannot be set and auxiliary drum A20 remains at the third program slot.

When master drum 20 (FIG. 2a) reaches the home position, the FMD signal unsets flip-flop FF8 in the usual manner. When all memories reach their home positions, "and" circuit G20 is alerted for a PSP pulse. It should be noted that the FMDA signal is present, since the PL signal cooperates with the absence of an inhibiting signal from flip-flop FFA10 (FIG. 7a) at "and" circuit G79c to pass a FMDA signal from "or" circuit B76.

The second workpiece 12 (FIG. 1) is controllably transferred to point E in the usual manner. The third program slot is available in auxiliary drum A20. Therefore, when control is transferred to auxiliary drum A20, the jaws 10a are directed by a point-to-point control recording to point $X_1Y_2$, when this point is reached auxiliary drum A20 is stepped to the fourth program slot in the usual manner. The fourth program slot, and in fact all even numbered program slots, merely contains a recording that directs transfer of control back to master drum 20. The next available program slot on master drum 20 calls for the usual jaw-opening operation, and the following one calls for point-to-point control to point A. This is followed by the end of program slot. The procedure continues in this manner until a workpiece 12 is positioned at point $X_4Y_4$ of pallet 16'. When this control is carried out, auxiliary drum A20 steps to the last recorded program slot. In this program slot, in addition to the usual transfer-of-control control spot, there is an end of pallet control spot. The usual transfer of control is performed. At the same time, the end of pallet control spot is read by read head RA (FIG. 7a). The signal from the read head RA sets flip-flop FFA10 and also passes via "or" circuit B76 to alert "and" circuit G79a. Auxiliary drum A20 has been prepared to be stepped to the home position. When this workpiece transfer cycle is complete, the usual RSD signal is generated. The RSD signal (FIG. 2a) causes the generation of the RCYD pulse which sets flip-flop FF8 which starts generating the HPD signal. Master drum 20 is stepped to the home position. The RCYD signal now passes through "and" circuit G79a and "or" circuit B77 to set flip-flop FFA8 which generates the AHPD signal. Auxiliary drum A20 is stepped to its home position. At this time the "0" output of flip-flop FFA10 blocks "and" circuit G79c. Therefore, no FMDA signal is generated until the true home pulse AFMD is transmitted by read head RHP. The AFMD signal unsets flip-flop FFA10 and causes the transmission of an FMDA signal to "and" circuit G20 (FIG. 2a). The AFMD signal also unsets flip-flop FFA8 terminating stepping of auxiliary drum A20. At the same time, master drum 20 is being stepped to its home position by the HPD signal (FIG. 2a). When all memories reach their home positions, "and" circuit G20 is alerted to pass a PSP pulse and a new pallet can be loaded.

A new routine can be recorded on main drum 20 without in any way disturbing the auxiliary drum recordings of the pallet coordinates. Any point in the new routine can serve as the checkpoint at which to shift to the pallet-loading (or unloading) routine. To change the routine of the main drum 20 for transferring work pieces to a point such as point E, drum 20 is advanced to its home position. Although it is possible to have a partially loaded pallet and add switching to cycle the auxiliary drum to its home position, it will be assumed that auxiliary drum A20 is also at its home position.

With the system in this state, the setup man opens the usually closed switch SW3 (FIG. 7d); moves the teach-operate switch TOSW (FIG. 2b) to the operate position; and momentarily closes the erase switch EWSW (FIG. 2d). A normal erase routine is carried out by master drum 20. Since switch SW3 is open, no erase routine is performed by auxiliary drum A20. The system is then taught the desired transfer routine, including a transfer of control program spot at the desired point in the program. At the end of the master-drum routine, the flip-flop FF8' is set by the closing of switch RSW (FIG. 2a) and the master drum 20 steps to its home position in the usual manner. The setup man then closes switch SW3 (FIG. 7d) and positions the teach-operate switch TOSW (FIG. 2b) to the operate position. The workpiece transfer routines will start whenever a workpiece 12 (FIG. 1) intercepts the light beam causing the generation of a PSP pulse.

The control system of FIG. 2a and of related figures has been described in connection with the apparatus of FIG. 4 that includes a digital servo in achieving point-to-point control and a contour-tracer for continuous-path control. FIG. 8 illustrates a conventional hydraulic servo that is equipped with digital input control means and with continuous-path control means different from the curve-tracer of FIG. 4. Where apparatus as in FIG. 8 is used, it is ordinarily incorporated in each of the various degrees of freedom in the apparatus of FIG. 1, controlled by the system of FIGS. 2a, 7a and the related control circuits, the apparatus of FIG. 8 basically replacing that in FIGS. 4 and 6. The digital control apparatus in FIG. 8 is of a form that is disclosed and claimed in copending application Serial No. 226,203, and while programmed control information is provided in digital form in FIG. 8, it can also be provided mechanically as a succession of analogue settings as shown in that application. The digital apparatus of FIG. 8 omits the digital feedback feature of the point-to-point control in FIG. 4, thus demonstrating one broad aspect of the invention, and the contour type of continuous control in FIG. 4 is replaced in FIG. 8 by continuous control provided by a continuously advanced control recording.

FIGURE 8 shows an alternate embodiment of the radial control 10c and includes hydraulic actuator 118, comprising a cylinder 118a supported in the arm 114 and a piston 118b from which a usual guided shaft projects, in this case the guided shaft being jaw support 10f'. In the form illustrated, cylinder 118a is relatively stationary, and mechanical work is obtained from jaw support 10f'. Piston 118b and jaw support 10f' are moved to the right and the left by means of hydraulic fluid admitted under pressure to the respective ends of cylinder 118a, in usual fashion, this fluid being supplied by hydraulic lines 134a and 134b. The master valve 122 for controlling the operation of actuator 118 consists of a body 122a that is slidably mounted on a fixed guide rail 122b which has a square cross-section. Valve 122 includes a so-called spool 122c that is appropriately shaped with respect to apertures provided in the body 122a to deliver hydraulic pressure to either one of the hydraulic actuator lines 134a and 134b, or to maintain the fluid supply to both of these lines equal when the hydraulic actuator is to remain stationary. Lines 134a and 134b are flexible where they are connected to actuator 118 and to reciprocating body 122a of the control valve. Hydraulic fluid under pressure is supplied to valve 122 from the high pressure end of a supply of pressurized hydraulic fluid (not shown) by a supply line 122d. Hydraulic fluid from the low-pressure side of actuator piston 118b is returned by the corresponding line 134a or 134b to valve 122, and this fluid is returned to the hydraulic supply by lines 122e and 122f. The arrows in the drawing represent the supply and discharge directions of flow of the fluid. Appropriate hydraulic servo valves and systems for this apparatus are commonly available and are disclosed, for example, in Sec. 13 of "Control Engineers' Handbook," 1st ed., edited by John G. Truxall and published 1958 by McGraw-Hill Book Company. Also, while a simple master servo valve is shown diagrammatically, it will be understood that the master-valve part of the servo may include a pilot valve and a control valve. Lines 134a and 134b contain chambers 232 and 234 having diaphragms 236 and 238 connected to each other and to pivoted T-shaped member 240 by a rod 242. A stationary double-ended contact element 244 is engaged by pivoted contact elements 246 and 248 that are biased toward each other by tension spring 250, but are electrically insulated from this spring.

In the balanced condition of the actuator, both lines 134a and 134b have equal pressure. This may be the exhaust pressure or it may conceivably be some higher pressure due to the nature of the control valve 122. In any event, when piston 118b comes to rest there are equal pressures at its opposite sides. With this pressure equality, member 240 is centered and both elements 246 and 248 are in contact with the ends of element 244. If there is any imbalance of pressures, energy presumably is being supplied to actuator 118 and in that condition of the servo, member 240 moves one or the other element 246 or 248 out of contact with element 244. The member 240 and elements 246 and 248 constitute a pressure switch means which is sensitive to a difference in pressure in lines 134a and 134b. The arrangement of the pressure switch means does not depend upon disappearance of pressure in both lines as an indication that the actuator has attained its balanced condition. Instead, the balanced condition of diaphragm 236 and 238 will provide the representation of balance that exists even if the particular hydraulic system used should trap fluid under pressure when balanced. The element 246 is electrically connected to the negative terminal of a source of potential while the element 248 is electrically connected to the MEP1 signal line and via a resistor to the positive terminal of the source of potential. Accordingly, when the system is balanced indicating the actuator has reached the desired position, the MEP1 signal is generated. In other words the assembly functionally replaces comparator 58 of FIGURES 4 and 6.

There is a feed-back connection between the master or control valve 122 and the actuator 118, so as to constitute a servo system. This feed-back system includes a clamp 140 that is adjustable along shaft 10f' and may be fixed in place at a desired location. The cable 120 extends around fixed pulley 144 and around the large-diameter portion of stepped pulley 146 and then to a tension spring 148. Another cable 150 extends from valve body 122, around a small-diameter portion of stepped pulley 146, and around other pulleys to the opposite end of valve body 122, and it is maintained taut by tension spring 152. Pulley 146 has a number of different small-diameter portions and a number of different large-diameter portions, so that the travel of cable 120 may bear any desired ratio to the much smaller travel of cable 150. Because of this ratio, body 122a of the master valve need move through only a short stroke in achieving a long-stroke mechanical output of the hydraulic actuator 118. The hydraulic servo involving valve 122 and actuator 118 with the feed-back coupling system as described, can be controlled for operation through any portion of its operating range by mechanical input to spool 122a. The starting position of the mechanical output element is controlled by adjustment of the feed-back coupling clamp 140 along shaft 10f'. The small-diameter portion of pulley 146 is also made readily adjustable in relation to the large diameter portion to permit an alternative starting point adjustment. Cables 120 and 150 are shown wrapped around nearly 360° of the pulley; and if this does not provide sufficiently positive coupling between the two, the cables can be appropriately formed with bumps, teeth or links for mesh with a correspondingly formed pulley in order to completely avoid slip and creep.

For the purpose of providing mechanical point-to-point control input to the hydraulic servo, the apparatus of FIGURE 8 includes binary control apparatus. The binary control apparatus comprises a cascade of hydraulic actuators 261, 262, 263, etc., arranged in line and slidably supported in line with sensing tip 176 touching the left-hand hydraulic actuator. Sensing tip 176 is telescopically received in a tube 178 carried by shaft 180a which extends from one side of master valve spool 122c. A spring 122g within the valve normally moves spindle 122c to the left. Another spring 182 within tube 178 normally biases sensing tip 176 to the extended position illustrated, limited by abutting portions of the tube 178 and the sensing tip 176 as shown.

An electromagnetic brake 184 is shown, having a spring-biased movable portion which suitably engages the external extension of valve spool 122c, including tube 178 and shaft 180a, to hold the valve spool in a fixed position when the brake is deenergized. When the brake 184 is energized, the brake is released. Actuator 261 includes a cylinder 261a and a piston 261b that extends outside cylinder 261a and bears against the cylinder end of unit 262. Piston 261b has an accurately established clearance in cylinder 261a so that, when hydraulic fluid enters the left-hand end of the cylinder, the piston moves through a stroke "A." Unit 262 has an internal clearance between its piston and its cylinder such that it effects a stroke "2A" when actuated, that is, twice the stroke of unit 261. Likewise, unit 263 is proportioned to provide a stroke 4A, and so on, all of the additional units having successively doubled strokes in sequence. The number of units and their strokes are chosen to fit the requirements for maximum length of stroke and maximum permissible error between the stroke that the apparatus can make and the stroke desired. The maximum error will necessarily be "A/2."

Valves 271, 272, 273, etc., and their related operating electromagnets 271a, 272a, 273a, etc., are operable to deliver when energized hydraulic fluid under pressure to units 261, 262, 263, etc., or, when deenergized, to discharge fluid from these units into the exhaust part of the hydraulic system. Electromagnet 271a has its input connected to the X1A signal line, electromagnet 272a has its input connected to the X1B signal line, etc. The returns of the electromagnets are coupled via diode X1 and "or" circuit B80 to the PPC1' and APPC1' signal lines. Such an arrangement insures that the valves 271, 272, 273, etc. are only energizable during a point-to-point control step. Accordingly, at all other times, the cascade of hydraulic actuators 261, 262, 263, etc. are retracted to the leftmost position as viewed in FIGURE 8.

Generally, the point-to-point control information is fed to the hydraulic actuators 261, 262, 263, etc. while the brake 184 is deeenergized so that they can establish their desired states before the servo starts operating to prevent any hunting due to differences in the operating time of the actuators. This is accomplished by feeding the PPC1 signal characteristic of point-to-point control via a suitable delay means, and "or" circuit B81 to amplifier A80 which energizes brake 184. When part 178 is released by brake 184 it assumes a new setting in accordance with the states of the units 261, 262, 263, etc. as determined by the combination of the X1A, X1B, X1C, etc. signals fed to electromagnets 271a, 272a, 273a, etc. respectively.

The operation of the apparatus thus far described may be reviewed at this point:

It may be assumed that sensing tip 176 has been set in accordance with the desired position to be assumed by jaw support 10f' of the hydraulic servo actuator and that brake 184 has just been energized and releases shaft 180a which assumes the position indicated by sensing tip 176. Under these conditions, hydraulic fluid is delivered by one hydraulic line 134a or 134b to hydraulic actuator 118. This flow continues until jaw support 10f' reaches the position required by the instruction represented by the coded combination of X1A, X1B, X1C, etc. signals from master drum 20 in control 11 (FIG. 1). This is achieved when valve body 122a has been shifted by the servo feed-back coupling including cable 120 and cable 150 to the place where hydraulic fluid is no longer delivered to the hydraulic actuator, that is, until valve body 122a has shifted to the "off" or balanced position relative to the spool 122c of the valve. Where the servo system utilized is a hydraulic type of servo as shown, then the approach of the mechanical output member to its required end position is reached in a fast motion that is decelerated automatically as the valve approaches its "off" or balanced condition. This deceleration is highly desirable and is here achieved without resort to additional complicating control apparatus.

When the balanced condition is reached, member 240 is centered and a signal passes on the MEP1 signal line to the sequence controls (FIG. 2c): terminating the PPC1 signal which causes brake 184 to again grip shaft 180a; stepping master drum 20 to the next program slot; and causing the generation of the PPC1' signal which deenergizes valves 271, 272, 273, etc.

The next program instruction may or may not be another point-to-point control. If it is not, then units 261, 262, 263, etc. remain retracted. If this next program instruction does not call for radial movement then brake 184 is not energized and still grips shaft 180a. If, however, another point-to-point control is called for then a new combination of X1A, X1B, X1C, etc. signals are generated. Depending on this new combination the shaft 180a is to remain stationary or to be moved either to the right or to the left. If the shaft is to be moved to the right, the tip 176 is moved to the right and in so doing it compresses spring 182. Thereafter, when brake 184 is subsequently released, spring 182 expands fully and element 180 is moved to the right until the abutting portions of sensing tip 176 and tube 178 engage one another. If the shaft 180a is to be moved to the left, the pistons of pressure units 261, 262, 263, etc. move to the left, while tip 176 remains engaged against the abutting portions of tube 178. When the brake 184 is thereafter released, spring 122g urges the shaft 180a, with the tube 178 and the tip 176 therewith to the left until tip 176 once again is in contact with the extended piston of units 261, 262, 263, etc.

When the actuator 118 has completed the stroke required by the position of shaft 180a, the pressure balance switch will be centered and elements 246 and 248 will be in contact with element 244 and an MEP1 signal is generated. This initiates a new cycle of operation.

For providing continuous path operation of actuator 118, spool 122c is provided with a shaft 180b which includes a rack 180c driven by a pinion 181. Pinion 181 is connected via solenoid operated clutch 183 to a synchro receiver 185 which receives three phases of control voltages. The three phases of control voltages cause the output shaft of synchro receiver 185 to rotate. With clutch 183 energized, the shaft 187 of synchro receiver 185 causes shaft 188 of pinion 181 to rotate which results in spool 122c being displaced either to the left or right. Accordingly, actuator 118 operates in the manner previously described for point-to-point control.

There are two possible sources of the phased control voltages: synchro transmitter 189, during the teach mode; and continuous control element 190 during the operate mode. The synchro transmitter 189 which is connected during the teach mode via the relay contacts RC8, RC9 and RC10 of the teach-operate relay TORL to the synchro receiver 185 has its input shaft 189a rotated by the setup man to control movement of jaw support 10f'. The conventional interaction of a synchro transmitter and synchro receiver takes place with the rotation of output shaft 187 of synchro receiver 185 following the rotation of the input shaft 189a of synchro transmitter 189.

The continuous control element 190 includes a magnetic tape loop 191 with three tracks opposite read-write heads TH1, TH2, TH3. When, during the operate mode, tape loop 191 is driven by tape drive 192 including reels 193 and 194 and pinch roller 196, driven by tape drive motor 195, previously recorded magnetic patterns are sensed by read-write heads TH1, TH2 and TH3 to produce phased voltages which are fed via amplifiers A81, A82 and A83, and relay contacts RC5, RC6, and RC7 of the teach-operate relay TORL' to synchro receiver 185. During the teach mode, a previously erased tape loop 191 which is being driven by tape drive 192 has the representations of the phased control voltages recorded thereon. In particular, while synchro transmitter 189 is feeding phased control voltages via relay contacts RC8, RC9 and RC10 of the teach-operate relay TORL to synchro receiver 185, they are also fed via "and" circuits G80, G81, G82 (if a continuous-path control is to be recorded) to read-write heads TH1, TH2 and TH3, respectively.

Also included on tape loop 191 are control tracks, including a control track upon which are controllably recorded pulses indicating the end of a continuous-control path. A magnetic read-write head TH4 is disposed opposite a control track of tape loop 191. Read-write head TH4 is normally connected to the moving contact of the contact RC11 of the teach-operate relay TORL. During the teach mode, the moving contact is against the normally open contact which is connected to the output of "and" circuit G83 whose inputs are connected to the MSD and CP1 signal lines so that whenever a pulse is generated at the end of a continuous control recording during the teach mode, a control mark is recorded on the control track. During the operate mode, the previously recorded pulses are fed via the amplifier A85 whose input is connected via the normally closed contact of contact RC11 to the ECP1 signal line.

The operation of the tape drive motor 195 is controlled by the relay 195b which, when energized, causes power to be applied to said motor. Relay 195b is energized by flip-flop FF80 which has its "1" output connected to the input of said relay. Whenever flip-flop FF80 is set, it energizes relay 195b. The set input of flip-flop FF80 is connected via a differentiating capacitor to the output of "or" circuit B82. The signal inputs to "or" circuit B82 indicate when the flip-flop is to be set. The CP1 signal associated with the recording of continuous path control areas for the radial-movement degree of freedom during the teach mode will start the motor 195 so that a continuous path can be recorded on a magnetic tape loop 191. Each degree of freedom which is subject to continuous control will have a tape loop similar to tape loop similar to tape loop 191. All the tape loops have drives that are synchronized, as by means of separate synchronous motors and on-off control relays such as relay 195b with a common A.-C. power source so that the control voltages for all the degrees of freedom are functionally related to each other. The CPC1 signal (FIGURE 2c) derived from previously recorded continuous path control pulses associated with the first degree of freedom can set the flip-flop FF80 during the operate mode. The HPD signal will set the flip-flop FF80 at the end of a program so that the tape loops can be driven to the home or start position. With flip-flop FF80 set, relay 195b is energized and tape drive motor 195 operates. To unset flip-flop FF80, a signal is required from the output of the "or" circuit B83. The MSD signal at one input of the "or" circuit B83 is used to unset the flip-flop during the teach mode after each program step has been recorded. The FMC1a signal fed to the second input of "or" circuit B83 will unset the flip-flop when the tape loop reaches its home position. The last input of the "or" circuit B83 is the signal CPC1' from flip-flop FF1 in its reset state.

Whenever the program is to be changed, the tape loops 191 are demagnetized (by means not shown) or replaced by magnetically neutral tape loops and the old tape loops are stored in a library for possible use at a later time.

A separate control track on each of the tape loops is used to indicate the start of a program. Opposite this control track on tape 191 is a magnetic read head TH5 which will sense a pre-recorded indicating the home point or the start of the program. Whenever this pulse is sensed, it is amplified by amplifier A86 which transmits an FMC1a pulse.

The operations for driving shaft 180b will now be summarized. During the teach mode, the characteristic TCH signal is present and the TORL relay is also energized. Accordingly, relay contacts RC5, RC6 and RC7 open and relay contacts RC8, RC9 and RC10 close. In addition, the TCH signal passes via "or" circuit B81 and amplifier A80 to energize brake 184 which releases its grip on shaft 180a. The TCH signal also passes via "or" circuit B84 to amplifier A84 which energizes clutch 183 connecting shaft 187 to shaft 188; and which energizes brake 180d which frictionally engages shaft 180b just sufficiently to only nullify any action of spring 122g. Accordingly, spool 122c can now be driven by synchro receiver 185.

It should be noted that during the modify mode the TCHA signal performs the same functions of the TCH signal at "or" circuits B81 and B84.

If a point-to-point movement is to be recorded, then as the setup man rotates shaft 189a, actuator 118 follows and drives position encoder 56A and the final coordinate is recorded in the usual manner. In particular, the position encoder 56 of FIGS. 2a and 4 is mechanically connected to the jaw support 10f'. The tracks 56a to 56e thereof are in fixed relation to the cylinder 118a. Each track includes coded combinations of segments wherein, for example, the darkened segments carry a negative voltage and the other segments are insulated. The coding of the segments 56a to 56d represent digitally the position of the jaw support 10f at each point in its range. Although four coded tracks are shown, usually a much larger number are used. The track 56e is used to provide the sampling signals required during the operate mode. Disposed opposite each of the tracks 56a to 56e inclusive are the contact brushes 56a' to 56e'. These brush contacts are mechanically coupled together and to jaw support 10f. They are driven in unison over their respective tracks as the jaw support 10f' is moved. The movement of the brushes can either correspond to or be proportional to the movement of jaw support 10f'. Each of the brushes 56a to 56d' is connected to one of the signal line SP1A to SP1D, respectively. Consequently, these signals lines carry coded combinations of voltages representing the radial position of the jaws 10a. In other words, these lines carry a digital representation of the radial coordinate of the arm 10a. These coded combinations of SP1A to SP1D signals are fed to master control 11 and when the setup man has directed jaws 10a to the desired position he momentarily depresses the switch SSW (FIG. 2a). The MS signal so generated passes through "and" circuit G279 to become the MSD signal which gates the SP1A to SP1D signals via "and" circuits G22c to G22f to write heads WH3 to WH6.

If, however, a continuous path control movement is to be recorded, it will be recalled that the CP1 signal will be present by virtue of the setting of the TCSW1 switch (FIG. 2a). The CP1 signal opens "and" circuits G80, G81 and G82, alerts "and" circuit G83, and sets flip-flop FF80 via "or" circuits B82 which energizes tape drive 192. The tape loop 191 starts moving and as synchro transmitter 189 sends phased control voltages to synchro receiver 185 to move actuator 118, they are also fed via "and" circuits G80, G81 and G82 to be recorded by read-write heads TH1, TH2 and TH3. When the setup man pushes the step switch SSW (FIG. 2a) to end the continuous path control step recording and to step the master drum 20 in the usual manner, MSD signal passes via "or" circuit B83 to unset flip-flop FF80 halting tape drive 192, and passes via "and" circuit G83 and relay contacts RC11 to be recorded by read-write head TH4 as an end of continuous path control pulse.

During the operate mode, a continuous path control instruction is indicated by the generation of the CPC1 signal by the sequence control (FIG. 2c). The CPC1 signal at an input to "or" circuit B81 energizes brake 184, at an input to "or" circuit B84, energizes clutch 183 and brake 180d, and at an input to "or" circuit B82, energizes tape drive 192. Spool 122c is capable of being driven and the tape loop 191 starts moving past the read-write heads TH. The phased control signals induced in read-write heads TH1, TH2 and TH3 are fed vie amplifiers A81, A82 and A83 and now closed relay contacts RC5, RC6 and RC7 to synchro receiver 185, and spool 122c moves and is followed by actuator 118. When the end of continuous path control pulse is read by read-write head TH4, it is fed via relay contacts RC11 and amplifier A85 to the ECP1 signal line. Sequence control (FIG. 2c) in response thereto stops generating the CPC1 signal and starts generating the CPC1' signal. The CPC1' signal at an input of "or" circuit B83 unsets flip-flop 80, deenergizing tape drive 192. The disappearance of the CPC1 signal at an input of "or" circuit B81 causes deenergization of brake 184 which now grips shaft 180a. The disappearance of the CPC1 signal at an input of "or" circuit B84 causes deenergization of clutch 183 and brake 180d, releasing spool 122c from drive input from shaft 180b. Brake 180b is provided to nullify any action of spring 122g while the top loop 191 comes up to speed.

It should be noted that, while conventional synchro transmitters and receivers are shown, two-phase motors could be employed wherein only a single phase control voltage is recorded on tape loop 191 to supply a control A.-C. phase voltage while the A.-C. voltage that drives tape drive motor 195 supplies the other or reference A.-C. phase voltage. Similarly, the motors may be of the type that rotates a step at a time, and the recordings may take the form of a sequence of impulses together with direction-control recordings on the tape. These continuous-path types of control are well known per se.

Furthermore, instead of using a tape loop 191, ordinary reels of tape may be used such as are used in magnetic sound recorders, and a conventional reversing mechanism should then be employed in tape feed 192, to operate at the end of the recorded program.

It will be noted that in the disclosed embodiment, the tape stopped after each continuous path control movement to allow for a point-to-point check. It is equally possible to keep the tape moving with no phased control voltages recorded in sections and to perform the point-to-point corrections or checks during the times when these blank sections of tape are fed past heads TH1, TH2 and TH3.

In addition, it is possible to record the desired point-to-point coordinates on parallel channels of the same tape instead of on the master drum 20, using additional read-write heads of appropriate design.

The apparatus described can be used in various other ways, with important advantages resulting. The continuous-path motion may be the usual operation except that at critical points along the program, where more precise orientation is needed, a digital instruction may be introduced. Thus, the continuous-path controlled motions may be accurate to ¼ inch in a given apparatus, and it may be important to increase the precision to ¹⁄₃₂ inch. At each such point, the apparatus is programmed to execute the refined positioning digitally, to resume continuous-path controlled motion thereafter. The same procedure is of great importance, too, in guarding against the possibility of the continuous-control sensing head becoming out of range or out of step relative to the control recording. Interposed digital checks enforce reorientation. This procedure may be of relatively minor significance in connection with the recorded-contour type of continuous-control of FIG. 4 described above. In the controlled-phase system of synchro control in FIG. 8, one rotation follows after another under tape control, and operation of the drive motors continues only so long as the tape drive is maintained. Any momentary failure of power could cause the various degrees of freedom to drop out of coordination. Errors that tend to occur in such continuous-path control systems can be corrected by the periodic digital checks described above. The actuators are thereby restored to the originally intended relationships to the control recordings, and cumulative errors are eliminated.

In the illustrative sequence of operations described, the program involved executing a point-to-point error-correcting operation following each continuous-path programmed pattern of motion. It was also shown that a sequence of point-to-point motions can be executed without intervention of continuous-path control. If it were always desired to execute continuous-path motions in all degrees of freedom, alternating with digital-coordinate checks at intervals, the digital slots for all the read heads in each degree of freedom could be incorporated directly on the same record medium as that of the continuous-path traces 72a and 72b, in tracks additional to those of heads TH4 and TH5 in FIG. 8, and this is a specialized form that is contemplated as a feature of the invention. Correspondingly digital slots can be provided on discs 72 for this kind of periodic digital checks.

Referring to FIG. 2c, it will be recalled that the end-of-path pulses ECP1 and ECP2 caused an automatic digital check of positioning of the radial and sweep actuators 10c and 10e by setting flip-flops FF2 and FF4. If this were not desired, then of course such input connection of the ECP signals to the point-to-point flip-flops should be broken, and delay lines D1 and D2 should be by-passed, using switches S1 and S2 for this purpose. It should be noted, however, that the ECP signals are effective by unsetting flip-flops FF1 and FF3 to restore drum 20 in control. Thus, each program device 20 and 72 (or 191) carries not only motion-control record portions, but also function-control recordings. Upon completion of each pattern of motions under control of one of the described program devices 20 or 72 (or 191), there is a recording on that program device that has the effect of transferring control to the other program device.

The article transfer mechanism of FIG. 1 has been treated in broad outline, both when operated with the control apparatus of FIGS. 2–7, inclusive, and when operated with the control apparatus of FIGS. 2a, b, c, d, 3 and 8, since the details of the article-transfer mechanism per se do not constitute features of the present invention and since various forms of article transfer mechanism having program control means are well known to those skilled in the art. Nevertheless, it may serve a useful purpose to include here a more detailed description of a known form of program-controlled article transfer apparatus incorporating the control features in accordance with the present invention. Such apparatus is shown in FIGS. 9–12 equipped with the control means of FIGS. 2–7, inclusive.

Base 200 of the article transfer unit in FIGS. 9–12 rotatably supports vertical post 202 within stationary tube 204 on suitable bearings. Dual drive chains 206 extend around sprockets on post 202 and to a rotary drive motor in base 200.

At the top of post 202 there is a pivotal connection 208 to arm 210. An outer tubular shell 212 fixed to post 202 provides support for the lower end of hydraulic actuator 214 whose rod 216 operates arm 210 in up-and-down swinging strokes about the horizontal axis of pivotal connection 208. Actuator 214, shell 212 and arm 210 move as a unit about the axis of post 202.

Arm 210 carries a head 218 that supports gripper 220. Head 218 is operable along arm 210 to extend and retract gripper 220 to various positions displaced radially from the axis of post 202. For this purpose, a hydraulic actuator is incorporated in arm 210 represented by the piston 222 and rod 224, head 218 being supported on tubes 226 and 226a received in bores in arm 210. Operation of actuator 222, 224 moves head 218 in and out radially.

Head 218 includes a housing 228 providing bearings for shaft 230. Sub-housing 232 is secured to shaft 230 for "wrist-bend" motion about the axis of shaft 230. Frame 234 is rotatable about an axis along rod 224 to provide for twist movement of jaws 220.

Wrist-bend actuation of the jaws 220 carried by sub-housing 232 is accomplished by the following drive mechanism. Secured to shaft 230 is a driven bevel gear 236 that meshes with a drive bevel gear 238. An operating rod for gear 238 is received in tube 226 and extends along arm 210 via an internal splined telescopic connection to a bevel gear 240 at the opposite end of arm 210. Bevel gear 242 fixed to shaft 244 meshes with gear 240 and is driven by a double sprocket-and-chain connection 246 to a pair of hydraulic actuators 248. The chain interconnects these actuators, each actuator having one hydraulic pressure line for operating the chain connection in tension only. These actuators maintain the drive chain taut while one actuator or the other develops greater pull to rotate shaft 244 and thereby to drive gears 242, 240, 238 and 236, and to effect the wrist-bend operation of sub-housing 232.

Twisting motion of the article gripper is accomplished by the following mechanism. To the inner end of frame 234 there is secured to bevel gear 250. A back-to-back couple of bevel-gears 252 to form a unit rotatably supported on shaft 230 and they provide a drive connection to gear 250 from drive bevel gear 254. The latter is operated by a rod within tube 226a and this rod has a telescopic splined connection to another rod that is secured to another bevel gear 256 at the opposite end of arm 210. Bevel gear 258 meshes with gear 256, and gear 258 is fixed to shaft 260 that is rotated by a sprocket-and-chain drive 262, and dual hydraulic actuators 264. In all respects the latter are like actuators 248 except that they are designed and pressured to produce a weaker operating force at the head 218 than that of the wrist-bend operating means. Operation of hydraulic actuators 264 transmits twist-motion drive to frame 234 via chain drive 262, bevel gears 258 and 256, via internal telescopic drive rods to bevel gears 254, 252 and 250.

When the wrist-bend motion of jaws 220 takes place, bevel gear 250 travels about the axis of shaft 230. Inasmuch as bevel gearing 252, 254, etc., is constrained by its drive means, there is a tendency of frame 234 to execute a twist motion incidental to each wrist-bend operation. If no such twist motion is desired, a compensating or reverse-drive operation of the twist actuating drive train is executed during such operation of the wrist-bend drive means.

Jaws 220 are pivoted to frame 232. At their operating ends, jaws 220 have pivoted links 266 which in turn are pivotally connected to the outer extremity of a piston unit 268 forming part of a pneumatic jaw actuator contained in frame 234 and suitably supplied with operating air pressure to close jaws 220 in gripping an article, via passage 269.

The position of head 218 is represented by the following digital encoding means. Cable 270 has one end 272 fixed to arm 210 and extends around freely rotatable pulley 274 to an internally tensioned wind-up reel 276. Pulley 274 is secured to rod 224 and moves in and out (like shaft 10f) in accordance with the movements of head 218. A pinion-and-gear connection 277, 278 couples reel 276 to a digital shaft-position encoder 280 corresponding to encoder 56 in FIGS. 2a and 4, ordinarily having a much larger number of code elements than the four (A, B, C and D) of encoder 56. Further, the continuous magnetic program disc 72, drive 73 and sensing head 74 of FIG. 4 finds its counterpart in drum 282 of magnetizable material, drive 284 and sensing head 286. The latter is carried along the surface of drum 282 and parallel to the drum axis by a coupling chain 288 that extends around idler sprocket 282 and around sprocket 290 fixed to gear 278 of encoder 280. A pair of combined at-rest sensing recording heads 294 and 296 are disposed adjacent one end of drum 282, beyond the end of the operating range of head 286. Radial in-and-out operation and control of head 218 is effected under control of the apparatus fully discussed above in connection with FIGS. 2–7 and need not be repeated here.

Additional digital encoders are provided for program-control of the other motions of the illustrated unit. Thus, a digital shaft-position encoder 298 on shaft 260 furnishes digitally coded output and represents unit 56 of FIGS. 2a and 4 for the "twist" degree of freedom. Correspondingly, a like encoder (not shown) on shaft 244 furnishes digital output for a control system as in FIGS. 2–7 for the wrist-bend degree of freedom; and another encoder 300 mounted on post 202 is coupled by pinion 302 and gear sector 304 that is fixed to arm 210, for providing digital output in a further programmed control system as in FIGS. 2–7 for the up-and-down swinging motion of arm 210.

Still further, a digital encoder 306 is mounted on the stationary tube 204 and coupled by gears 308 and 310 to post 202 for providing digital output like unit 56 in program-controlled operation of arm 210 around the vertical axis of post 202. Further, slidably guided rack member 310, in mesh with gear 308, carries a combined recording and pick-up head 312. Drum 314 cooperates with head 312 for providing continuous-path magnetic-contour control corresponding to head 74 and disc 72 in FIG. 4. Combined at-rest recording and sensing heads 318 and 320 correspond to heads 91 and 96 of FIG. 4. Drive 316 for drum 314 corresponds to drive means 73 of FIG. 4. Drives 316 and 284 are operated in synchronism, as described in connection with the operation of the control operation of the apparatus in FIG. 4. A further magnetic-profile control (not shown) like that involving drums 282 and 314 is contemplated for the up-and-down continuous-path control of arm 210, to be mounted on tubular shell 212 and coupled to gear sector 304.

In considering further the comparison of the transfer mechanism of FIGS. 9–10 with that of F. 1, jaw-operating solenoid 10b finds its counterpart in pneumatic actuator 268. Jaws 220 are normally biased open but are closed pneumatically by controlling a solenoid valve (not shown) under the same control provided for solenoid 10b as described in connection with FIG. 2a. Magnetic-contour control is not normally needed for controlling the twist motion and the wrist-bend of the head unit 218.

The operation of the transfer mechanism of FIGS. 9–12 will be understood without review of the operation of the coordinated controls as set forth in connection with the discussion of FIGS. 2–7 inclusive. By like token, it is believed unnecessary to illustrate the application of the control means of FIG. 8 to the article transfer unit of FIGS. 9–12. In that application, the digital encoders and magnetic contour controls in FIGS. 9–12 are to be omitted. Instead, the master valve 122 of FIG. 8 is to be mounted on the same support as that which carries the hydraulic actuator, for each point-to-point and continuous-path program-controlled degree of freedom, together with the control devices 261, 262, 263, etc., and the synchro receiver apparatus (FIG. 8) associated with the master valve.

The program drums, tapes and the coordinating circuit apparatus described in connection with FIGS. 1–8 are not part of the mechanically moved parts of the transfer unit of FIGS. 9–12 and are conveniently contained in based 200; and all appropriate hydraulic and pneumatic pressure sources for the described actuators will ordinarily be mounted on the stationary part of the unit. Such equipment has been deliberately omitted from the drawings and the description as being unnecessary to an understanding of the invention.

What is claimed is:

1. Apparatus comprising a work member and actuating means therefor, first control means including continuous-control program means for said actuating means for producing a prescribed path of movement by said work member, second control means including point-to-point program means for said actuating means for producing a stroke of movement by said work member from a first position to a second position, and operation-controlling detector means for rendering said first and second control means selectively operable.

2. Program-controlled apparatus including a work member operable in various degrees of freedom, an actuator for operating the work member in one of said degrees of freedom and programmed control means for said actuator including continuous-control program means, point-to-point program means, and program-controlled means for rendering a selected one of said control means effective to control said actuator at any given time and in selected sequence.

3. Apparatus comprising a work member, multiple actuators for operating said work member in multiple degrees of freedom, respectively, control means for said actuators including for each of at least two of said actuators continuous-control program means and point-to-point program means, and selective means for rendering either said continuous-control program means of said two actuators or said point-to-point program means of said two actuators effective concurrently, said selective means including automatic operation-controlling means for determining whether said two continuous-control program means or said two point-to-point program means are to control the operation of said two actuators following at least certain operations of said actuators in a programmed sequence of operations.

4. Article handling apparatus, including an article-holder and operating means for causing said article-holder to engage and release an article, multiple actuators for operating said article-holder in multiple degrees of freedom, respectively, coordinated control means for said article-holder operating means and said actuators including program means for said article-holder operating means and program means for each of said actuators, the latter program means for each of at least two of said actuators including a continuous-control program means and a point-to-point program means, and master program means for rendering said continuous-control program means and said point-to-point program means selectively effective in producing coordinated motions of the article-holder in its various degrees of fredom and in effecting successive motions of the article-holder and operations of the article-holder to seize and release articles under control of said program means as selected by the master program means.

5. Apparatus comprising a work member, multiple actuators for operating said work member in multiple degrees of freedom, respectively, control means for said actuators including, for at least two of said actuators, magnetic-contour tracking means having a magnetic-contour recording and means for sensing said recording coupled to a respective one of said actuators for proportional operation of the work member, said control means for at least two of said actuators including point-to-point program means, and programmed control means for rendering said magnetic-contour tracking means and said point-to-point program means selectively effective concurrently and sequentially.

6. Apparatus comprising a work member, multiple actuators for operating said work member in multiple degrees of freedom, respectively, control means for said actuators including, for each of at least two such actuators, first continuous-control program means and second program means including recordings of the co-ordinates of a succession of positions to be assumed by said work member in the related degrees of freedom and sensing means for said recordings, and said work member having for each of said two actuators a position encoder and comparison means for the encoder and the second program means related to each actuator, respectively, means providing a control signal evidencing match between each said encoder and the corresponding position recording, and program control means for selecting said first and said second program means for respective degrees of freedom for concurrent and successive operation.

7. Apparatus comprising a work member, multiple actuators for operating said work member in respective degrees of freedom, respectively, control means for said actuators including, for each of at least two of said actuators, continuous-control program means and point-to-point program means, master program means for selecting which of the program means for each said actuator is to be effective at any particular time, signalling means coordinated with said continuous-control program means for providing an end-of-path signal, second signalling means for providing an end-of-stroke signal during times when said point-to-point program means has been selected, and control connections from said signalling means to said master program means for advancing the master program means to its next control condition.

8. Teachable apparatus, including a work member, actuating means therefor, manual control means for said actuating means, first recording means for producing a record representing continuous paths of motion of the work member when operated under manual control, second recording means for registering a program of control entries representing successive positions assumed by said work member, selective means for rendering said recording means effective, control means for said actuating means and master program means for rendering said control means operable selectively and sequentially under control of said continuous-path record and said position-representing program entries.

9. Teachable apparatus, including a work member, actuating means therefor, control means for said actuating means including a manual control therefor, first recording means for producing recordings representing continuous paths of motion of the work member when operated under manual control and for producing end-of-path control records representing the end of each continuous-path motion, second recording means for producing control records representing successive positions assumed by said work member, means for rendering said recording means effective selectively, master program means for rendering said control means operable selectively and sequentially under control of said continuous-path recordings and said position-representing records and means for sensing said end-of-path control records for advancing said master program means.

10. Apparatus including a work member, and actuating means and control means therefor, first and second program controllers for said control means, each of said program controllers including a sequence of motion-control portions, sensing means cooperating with the motion control portions of each said program controllers, drive means for relatively advancing the respective control portions past the related sensing means, programmed means for rendering said program controllers effective selectively, and means signalling the completion of each controlled motion for subjecting said control means to the succeeding control conditions of said program controllers.

11. Apparatus comprising a work member, multiple actuators for operating said work member in multiple degrees of freedom, respectively, control means for said actuators including, for each of at least two of said actuators, continuous-control program means and point-to-point program means, programmed control means for rendering selected ones of said program means effective concurrently and in sequence and means signalling the completion of an operation by all operating actuators for advancing said programmed control means to effect subsequent program selections.

12. Program-controlled apparatus, including a work member, first and second actuators for operating said work member through movements in first and second degrees of freedom, and program-controlled means for effecting such movements, said program-controlled means for each of said actuators including a continuous-path recording, sensing means therefor, a digital recording and sensing means therefor, drive means for advancing said recordings including means for advancing said continuous-path recording progressively, and means responsive to discrete recordings on said continuous-path recording for rendering said digital recording and its sensing means effective to control said actuators.

13. Program-controlled apparatus, including a work member, first and second actuators for operating said work member through movements in first and second degrees of freedom, and program-controlled means for effecting such movements, said program-controlled means for each of said actuators including a continuous-path recording, sensing means therefor, a digital recording and sensing means therefor, and means responsive to completion of each controlled movement of said actuators for rendering said recordings effective in selected sequence for controlling said actuators.

14. Program-controlled apparatus, including a work member, a first actuator and a second actuator for operating the work member in first and second degrees of freedom respectively, and program-controlled means of said actuators, including a first program control means for each of said actuators, a second program control means for each of said actuators, master program means for selectively rendering respective ones of said program control means effective, and means for advancing said master control means to successive control positions for selectively rendering respective ones of said first program control means and said second program means effective in programmed succession.

15. Program-controlled apparatus, including a work member, a first actuator and a second actuator for operating the work member in first and second degrees of freedom respectively, and program-controlled means for effecting predetermined movements of said actuators, including a first program control means for each of said actuators, a second program control means for each of said actuators, means signalling completion of each program-controlled movement under control of said first program control means, and means controlled by said signalling means for rendering said second program control means effective to control a respective actuator.

16. Program-controlled apparatus, including a work member, a first actuator and a second actuator for operating the work member in first and second degrees of freedom respectively, and program-controlled means for effecting predetermined movements of said actuators, including a first program control means for each of said actuators, a second program control means for each of said actuators, master control means effective to render selected ones of said control means effective to produce first program-controlled movements, and means responsive to completion of program-controlled movements when under control of said first program control means for subjecting the corresponding actuators to control by said second program control means independent of said master control means.

17. Program-controlled apparatus, including actuating means and means for controlling said actuating means including multiple program controllers each having a sequence of motion-control portions, sensing means cooperating therewith and drive means for relatively advancing said control portions past the related sensing means, and master program means for rendering said program controllers effective in selected sequence.

18. Program-controlled apparatus, including actuating means and means for controlling said actuating means including multiple program controllers each having a sequence of motion-control portions, sensing means cooperating therewith and drive means for relatively advancing said control portions past the related sensing means, and each program controller having control means for transferring control of said actuating means to another of said program controllers so that said actuating means executes predetermined operations under control of said program controllers in sequence.

19. Apparatus comprising a work member, multiple actuators for operating said work member in multiple degrees of freedom, respectively, control means for said actuators including, for each of at least two of said actuators, means for generating phased signals representative of continuously controlled paths of motion of said work member, said generating means including a recording of corresponding phased signals and means for sensing said recording, said control means for at least said two of said actuators also including point-to-point programmed control means, and program control means for rendering either said phased signal generating means or said point-to-point programmed means of any one degree of freedom selectively effective and for coordinately rendering effective the control means in the other degrees of freedom in any coordinated operation of all said actuators and in a sequence of such coordinated operations.

20. Program-controlled apparatus comprising a work member, multiple actuators for operating said work member in multiple degrees of freedom, respectively, respective control means for said actuators, and coordinating means for effecting concurrent and sequential programmed operation of said respective control means, said control means for said actuators including, for each of at least two of said actuators, a continuous-path control and a point-to-point control, said continuous-path control including a recording of phased signals representing desired motions, sensing means cooperating therewith for generating phased control signals, and an actuator control respective to the generated control signals, said point-to-point control including a point-to-point stored program and sensing means cooperating therewith, said coordinating means including selective means for rendering effective either the point-to-point control or the continuous path control in each degree of freedom provided with such controls.

21. Apparatus in accordance with claim 20, wherein said point-to-point stored program is represented by a sequence of digital combination codes and wherein said control means includes means representing in digital combination code form the position of the related actuator, and said control means further including means for comparing the digital codes of said stored program and the digital codes of said position representing means to indicate coincidence when the codes agree.

22. Apparatus in accordance with claim 20, wherein said control means for said two actuators includes a common master control device for each said actuator controlled both by said continuous-path control and by said phase control, wherein said stored program is represented by a sequence of digital codes, and wherein said point-to-point control includes a digital-code-to-position converter for determining the adjustment of said common master control when said point-to-point control has been rendered effective.

23. Apparatus comprising a work member, multiple actuators for operating said work member in multiple degrees of freedom, respectively, control means for said actuators including, for each of at least two of said actuators, means for generating phased control signals representative of continuously controlled paths of motion of said work member, said generating means including a recording of corresponding phased signals and means for sensing said recording, said control means for at least said two of said actuators including point-to-point programmed control means, and program coordinating means for rendering said phased control signal generating means effective, and said phased control signal generating means including means for rendering said point-to-point program means of the corresponding actuator effective at the end of each controlled continuous-path motion.

24. Teachable apparatus, including a work member, actuating means therefor, manual control means for said actuating means, first means for recording a phased control signal representing continuous paths of motion of the work member when operated under manual control, additional means for establishing a point-to-point program representing successive positions assumed by said work member, selective means for rendering either said additional means or said recording means effective to store representations of a sequence of manually controlled motions of said actuating means, control means for said actuating means and master program means for rendering said control means operable selectively and sequentially under control of said phased control signal recording and said position-representing program.

25. Apparatus comprising a work member and actuating means therefor, a plurality of program controllers for storing digital representations of given positions of said work member, at least one of said program controllers having transfer of control indicia and sensing means therefor, control means for said actuating means, selective means for rendering said control means responsive to one of said program controllers for producing a stroke of movement to the position represented by the digital indicia thereof, and means responsive to said transfer of control indicia for controlling said selective means.

26. Program-controlled apparatus comprising a work member and multiple actuators therefor in a corresponding plurality of degrees of freedom, a master program controller and an auxiliary program controller, each of said program controllers having a sequence of motion-control representations and transfer indicia, control means for said actuators responsive to the motion-control representations of said program controllers for executing prescribed motions in succession, and selective means responsive to said transfer indicia for shifting control of said actuator control means from the program control means bearing such transfer indicia to the other of said program controllers.

27. Programmed apparatus for handling an article and either loading or unloading a pallet with such articles, which includes an article holder, means for actuating said article holder to engage and release articles, multiple actuators operative to move said article holder through a sequence of positions in multiple degrees of freedom, a master program controller for said actuators having a sequence of motion-controlling portions for executing a cycle of article-transporting motions, an auxiliary program controller for said actuators having a sequence of pallet-spotting portions for causing operation of said multiple actuators to a pattern of pallet locations, said master controller having means effective at a predetermined part of its cycle to transfer control of said multiple actuators to said auxiliary controller and having homing means for repeating the cycle thereof, said auxiliary controller having means associated with each of said pallet-spotting portions for effecting transfer of control of said actuators to said master controller, and said program controllers including means for causing operation of said article-holder actuating means once during each cycle of said master program controller and once at each pallet-spotting location of the auxiliary controller so as to load or unload the pallet with articles, as may be desired, and to transport such articles through a sequence of motions.

28. Apparatus comprising a work member, at least two actuators for operating said work member in a corresponding number of degrees of freedom, respectively, a first pair of program means for controlling said two actuators to effect a prescribed series of motions thereof, at least one further pair of program means for controlling said two actuators to effect at least one further prescribed series of motions thereof, and automatic means including a detector responsive to a prescribed control condition for changing the operation of said two actuators from control by one of said pairs of program means to control thereof by another said pair of program means.

29. Apparatus comprising a work member, at least two actuators for operating said work member in a corresponding number of degrees of freedom, respectively, a first pair of program means for controlling said two actuators to effect a prescribed series of motions thereof, at least one further pair of program means for controlling said two actuators to effect at least one further prescribed series of motions thereof, and detector means responsive to successive control conditions occurring in the course of operation of the apparatus for automatically rendering a selected pair of said program means effective to control the operation of said two actuators ensuing after each detection of a control condition.

30. Apparatus in accordance with claim 26, wherein said work member is an article-holder having means controlled by one of said program controllers to seize and release an article, and wherein one of said program controllers contains motion-control representations for causing the article-holder to execute a routine of motions and wherein the other of said program controllers contains motion-control representations to cause the article-holder to move to a succession of article-spotting locations of a pallet, said program controllers comprising means for causing repetitions of said routine of motions in alternation with successive motions of the article-holder to different ones of said article-spotting locations.

References Cited by the Examiner

UNITED STATES PATENTS

| | | | |
|---|---|---|---|
| 2,590,091 | 3/1952 | Devol | 318—28 |
| 3,003,629 | 10/1961 | Henderson | 209—74 |
| 3,073,998 | 1/1963 | Bower | 318—20 |
| 3,086,154 | 4/1963 | Lowther | 90—13 X |

FOREIGN PATENTS

| | | |
|---|---|---|
| 781,465 | 8/1957 | Great Britain. |

MARVIN A. CHAMPION, *Primary Examiner.*